US011825330B2

(12) United States Patent
Paladugu et al.

(10) Patent No.: US 11,825,330 B2
(45) Date of Patent: Nov. 21, 2023

(54) TECHNIQUES FOR QUALITY OF SERVICE SUPPORT IN SIDELINK COMMUNICATIONS

(71) Applicant: QUALCOMM Incorporated, San Diego, CA (US)

(72) Inventors: Karthika Paladugu, San Diego, CA (US); Hong Cheng, Basking Ridge, NJ (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 224 days.

(21) Appl. No.: 17/199,263

(22) Filed: Mar. 11, 2021

(65) Prior Publication Data

US 2021/0289392 A1 Sep. 16, 2021

Related U.S. Application Data

(60) Provisional application No. 62/989,579, filed on Mar. 13, 2020.

(51) Int. Cl.
*H04W 28/02* (2009.01)
*H04W 28/24* (2009.01)
(Continued)

(52) U.S. Cl.
CPC ....... *H04W 28/0268* (2013.01); *H04W 28/24* (2013.01); *H04W 60/00* (2013.01); *H04W 88/04* (2013.01); *H04W 92/18* (2013.01)

(58) Field of Classification Search
CPC . H04W 28/0268; H04W 28/24; H04W 60/00; H04W 88/04; H04W 92/18
See application file for complete search history.

(56) References Cited

U.S. PATENT DOCUMENTS 8,107,436 B2 1/2012 Schiff
10,341,009 B2 7/2019 Hwang et al.
(Continued)

FOREIGN PATENT DOCUMENTS

WO WO-2017146710 A1 8/2017
WO WO-2018016882 A1 1/2018
(Continued)

OTHER PUBLICATIONS

International Search Report and Written Opinion—PCT/US2021/022142—ISA/EPO—dated Jun. 17, 2021.
(Continued)

*Primary Examiner* — Ajay Cattungal
(74) *Attorney, Agent, or Firm* — Sevan Savsa; Holland & Hart LLP

(57) ABSTRACT

Methods, systems, and devices for wireless communications are described. A first user equipment (UE) (e.g., a remote UE) may establish a relay connection for communicating with a network entity (e.g., a base station or a network device) via a second UE (e.g., a relay UE). The relay connection may include a sidelink connection and an access link connection. The remote UE may transmit a request to the network entity via the relay UE. The request may include a relay service code associated with the sidelink connection, as well as a request for quality of service (QoS) support for the relay connection. Based on the request, the network entity may determine a QoS configuration for the relay connection. The network entity may indicate the QoS configuration to the UEs via the relay connection. The UEs may adjust parameters of the relay connection to meet the specifications of the QoS configuration.

30 Claims, 25 Drawing Sheets

(51) Int. Cl.
*H04W 60/00* (2009.01)
*H04W 88/04* (2009.01)
*H04W 92/18* (2009.01)

(56) References Cited

U.S. PATENT DOCUMENTS

| | | | |
|---|---|---|---|
| 10,904,933 B2 | 1/2021 | Bangolae et al. | |
| 11,197,180 B2 | 12/2021 | Uchiyama et al. | |
| 11,297,524 B2 | 4/2022 | Na et al. | |
| 2013/0143569 A1 | 6/2013 | Kapoor et al. | |
| 2016/0295494 A1 | 10/2016 | Gulati et al. | |
| 2016/0381720 A1* | 12/2016 | Baek | H04W 8/14 |
| | | | 370/329 |
| 2018/0054237 A1* | 2/2018 | Tseng | H04W 72/085 |
| 2018/0139682 A1 | 5/2018 | Xu et al. | |
| 2018/0234163 A1 | 8/2018 | Yasukawa et al. | |
| 2018/0234524 A1 | 8/2018 | Cheng et al. | |
| 2018/0242381 A1 | 8/2018 | Wei et al. | |
| 2019/0053215 A1 | 2/2019 | Yu et al. | |
| 2019/0335332 A1 | 10/2019 | Ying et al. | |
| 2019/0387446 A1 | 12/2019 | Xu et al. | |
| 2020/0128447 A1 | 4/2020 | Ying | |
| 2020/0221298 A1 | 7/2020 | Pan et al. | |
| 2020/0287615 A1 | 9/2020 | Zhu et al. | |
| 2020/0329419 A1 | 10/2020 | Tang et al. | |
| 2020/0396789 A1 | 12/2020 | Hori et al. | |
| 2021/0051758 A1 | 2/2021 | Xu et al. | |
| 2021/0105863 A1 | 4/2021 | Martin et al. | |
| 2021/0144606 A1 | 5/2021 | Xu et al. | |
| 2021/0144641 A1 | 5/2021 | Sun et al. | |
| 2021/0144783 A1 | 5/2021 | Yang | |
| 2021/0153063 A1 | 5/2021 | Zhang et al. | |
| 2021/0160956 A1 | 5/2021 | Wang et al. | |
| 2021/0176820 A1 | 6/2021 | Zhang et al. | |
| 2021/0282195 A1 | 9/2021 | Paladugu et al. | |
| 2021/0289391 A1 | 9/2021 | Paladugu | |
| 2021/0368417 A1 | 11/2021 | Luo et al. | |
| 2022/0053584 A1 | 2/2022 | Xu et al. | |
| 2022/0110025 A1 | 4/2022 | Liu et al. | |
| 2022/0141898 A1* | 5/2022 | Kim | H04W 76/14 |
| | | | 370/315 |
| 2022/0295375 A1 | 9/2022 | Wang | |
| 2022/0345879 A1* | 10/2022 | Park | H04W 8/245 |

FOREIGN PATENT DOCUMENTS

| | | |
|---|---|---|
| WO | WO-2018085568 A1 | 5/2018 |
| WO | WO-2021082715 A1 | 5/2021 |

OTHER PUBLICATIONS

Nokia Networks: "Providing QoS in UE-to-NW Relay Scenario," 3GPP Draft, SA WG2 Meeting #110AH, S2-152864 Was 152838_(RELAYQOS_DISC)V6, 3rd Generation Partnership Project (3GPP), Mobile Competence Centre; 650, Route Des Lucioles; F-06921, Sophia-Antipolis Cedex; France, vol. SA WG2, No. Sophia Antipolis, France; Aug. 31, 2015-Sep. 3, 2015, Sep. 3, 2015 (Sep. 3, 2015), XP051043093, 10 pages, Retrieved from the Internet: URL: http://www.3gpp.org/ftp/tsg_sa/WG2_Arch/TSGS2_110AH_Sophia/Docs/ [retrieved on-Sep. 3, 2015], the whole document.

ZTE Corporation: "Priority in UE-to-Network Relay," 3GPP Draft, 3GPP TSG-RAN WG2 Meeting #91, R2-153770—Priority in UE to NW Relay, 3rd Generation Partnership Project (3GPP), Mobile Competence Centre; 650, Route Des Lucioles; F-06921, Sophia-Antipolis Cedex; France, vol. RAN WG2, No. Beijing, Aug. 24, 2015-Aug. 28, 2015, Aug. 15, 2015 (Aug. 15, 2015), XP050994149, 3 pages, Retrieved from the Internet: URL: http://www.3gpp.org/ftp/tsg_ran/WG2_RL2/TSGR2_91/Docs/ [retrieved on Aug. 15, 2015] the whole document.

* cited by examiner

TECHNIQUES FOR QUALITY OF SERVICE SUPPORT IN SIDELINK COMMUNICATIONS

CROSS REFERENCE

The present Application for Patent claims the benefit of U.S. Provisional Patent Application No. 62/989,579 by PALADUGU et al., entitled "TECHNIQUES FOR QUALITY OF SERVICE SUPPORT IN SIDELINK COMMUNICATIONS," filed Mar. 13, 2020, assigned to the assignee hereof, and expressly incorporated by reference herein.

INTRODUCTION

The following relates generally to wireless communications and more specifically to sidelink communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method of wireless communications at a first UE is described. The method may include establishing a first connection between the first UE and a second UE, the first connection associated with a relay service code. The method may further include transmitting, to a base station, a request including the relay service code and an indication of a relay connection via the second UE, the relay connection including the first connection between the first UE and the second UE and a second connection between the second UE and the base station. The method may further include receiving a configuration message in response to transmitting the request, the configuration message including a first configuration associated with a first interface of the first connection and a second configuration associated with a second interface of the first connection. The method may further include determining a quality of service (QoS) configuration based on the first configuration and the second configuration. The method may further include communicating with the base station via the relay connection based on the QoS configuration.

An apparatus for wireless communications at a first UE is described. The apparatus may include a processor and memory coupled to the processor. The processor and memory may be configured to establish a first connection between the first UE and a second UE, the first connection associated with a relay service code. The processor and memory may be further configured to transmit, to a base station, a request including the relay service code and an indication of a relay connection via the second UE, the relay connection including the first connection between the first UE and the second UE and a second connection between the second UE and the base station. The processor and memory may be further configured to receive a configuration message in response to transmitting the request, the configuration message including a first configuration associated with a first interface of the first connection and a second configuration associated with a second interface of the first connection. The processor and memory may be further configured to determine a QoS configuration based on the first configuration and the second configuration. The processor and memory may be further configured to communicate with the base station via the relay connection based on the QoS configuration.

Another apparatus for wireless communications at a first UE is described. The apparatus may include means for establishing a first connection between the first UE and a second UE, the first connection associated with a relay service code. The apparatus may further include means for transmitting, to a base station, a request including the relay service code and an indication of a relay connection via the second UE, the relay connection including the first connection between the first UE and the second UE and a second connection between the second UE and the base station. The apparatus may further include means for receiving a configuration message in response to transmitting the request, the configuration message including a first configuration associated with a first interface of the first connection and a second configuration associated with a second interface of the first connection. The apparatus may further include means for determining a QoS configuration based on the first configuration and the second configuration. The apparatus may further include means for communicating with the base station via the relay connection based on the QoS configuration.

A non-transitory computer-readable medium storing code for wireless communications at a first UE is described. The code may include instructions executable by a processor to establish a first connection between the first UE and a second UE, the first connection associated with a relay service code. The code may further include instructions executable by a processor to transmit, to a base station, a request including the relay service code and an indication of a relay connection via the second UE, the relay connection including the first connection between the first UE and the second UE and a second connection between the second UE and the base station. The code may further include instructions executable by a processor to receive a configuration message in response to transmitting the request, the configuration message including a first configuration associated with a first interface of the first connection and a second configuration associated with a second interface of the first connection. The code may further include instructions executable by a processor to determine a QoS configuration based on the first configuration and the second configuration. The code may further include instructions executable by a processor to communicate with the base station via the relay connection based on the QoS configuration.

Some examples of the method, apparatuses, and non-transitory computer-readable medium described herein may further include operations, features, means, or instructions for transmitting, to the base station, a registration message including a second indication of a non access stratum connection, and establishing the non access stratum connection via the relay connection based on the registration message, where transmitting the request may be based on establishing the non access stratum connection.

Some examples of the method, apparatuses, and non-transitory computer-readable medium described herein may further include operations, features, means, or instructions for exchanging one or more second configuration messages with the second UE based on the QoS configuration, determining one or more channel parameters associated with the first connection based on exchanging the second configuration messages, and communicating with the second UE based on the determined channel parameters.

Some examples of the method, apparatuses, and non-transitory computer-readable medium described herein may further include operations, features, means, or instructions for transmitting a quality report associated with the first connection, the quality report including a first identifier associated with the first interface and a second identifier associated with the second interface, receiving a second configuration message in response to transmitting the quality report, the second configuration message including a third configuration associated with the first connection, and updating the QoS configuration based on the third configuration, where communicating with the base station may be based on the updated QoS configuration.

Some examples of the method, apparatuses, and non-transitory computer-readable medium described herein may further include operations, features, means, or instructions for determining a change in one or more parameters of the first connection, where the quality report further includes an indication of the parameters of the first connection, and where the quality report may be transmitted based on determining the change.

In some examples of the method, apparatuses, and non-transitory computer-readable medium described herein, the quality report may be transmitted periodically.

In some examples of the method, apparatuses, and non-transitory computer-readable medium described herein, the quality report may be transmitted via the relay connection.

In some examples of the method, apparatuses, and non-transitory computer-readable medium described herein, the quality report may be transmitted in a sidelink UE assistance information message.

In some examples of the method, apparatuses, and non-transitory computer-readable medium described herein, the quality report may be transmitted in a message associated with the first interface or the second interface.

Some examples of the method, apparatuses, and non-transitory computer-readable medium described herein may further include operations, features, means, or instructions for identifying, in the second configuration message a timer associated with an activation of the third configuration, and applying the third configuration after the timer expires.

Some examples of the method, apparatuses, and non-transitory computer-readable medium described herein may further include operations, features, means, or instructions for receiving signaling from the second UE, the signaling indicating an activation of the third configuration associated with the first connection, applying the third configuration based on receiving the signaling, determining one or more channel parameters associated with the first connection based on the third configuration, and communicating with the second UE based on the determined channel parameters.

In some examples of the method, apparatuses, and non-transitory computer-readable medium described herein, the first identifier associated with the first interface includes a PC5 logic channel identifier (LCID), and the second identifier associated with the second interface includes a Uu data radio bearer (DRB) identifier.

In some examples of the method, apparatuses, and non-transitory computer-readable medium described herein, the first interface includes a PC5 interface, and the second interface includes a Uu interface.

Some examples of the method, apparatuses, and non-transitory computer-readable medium described herein may further include operations, features, means, or instructions for refraining from establishing a unicast link with the second UE, where the relay connection may be established based on refraining from establishing the unicast link.

Some examples of the method, apparatuses, and non-transitory computer-readable medium described herein may further include operations, features, means, or instructions for establishing a unicast link with the second UE, where the relay connection may be established based on establishing the unicast link.

In some examples of the method, apparatuses, and non-transitory computer-readable medium described herein, the request includes a protocol data unit (PDU) session establishment request or a PDU session modification request.

In some examples of the method, apparatuses, and non-transitory computer-readable medium described herein, the configuration message includes a Radio Resource Control (RRC) reconfiguration message.

A method of wireless communications at a base station is described. The method may include receiving, from a first UE, a request including a relay service code associated with a first connection between the first UE and a second UE and an indication of a relay connection via the second UE, the relay connection including the first connection between the first UE and the second UE and a second connection between the second UE and the base station. The method may further include determining a QoS configuration for the relay connection, the QoS configuration including a first configuration associated with a first interface of the first connection and a second configuration associated with a second interface of the first connection. The method may further include transmitting a configuration message based on determining the QoS configuration, the configuration message including the first configuration and the second configuration. The method may further include communicating with the first UE via the relay connection based on the determined QoS configuration.

An apparatus for wireless communications at a base station is described. The apparatus may include a processor and memory coupled to the processor. The processor and memory may be configured to receive, from a first UE, a request including a relay service code associated with a first connection between the first UE and a second UE and an indication of a relay connection via the second UE, the relay connection including the first connection between the first UE and the second UE and a second connection between the second UE and the base station. The processor and memory may be further configured to determine a QoS configuration for the relay connection, the QoS configuration including a first configuration associated with a first interface of the first connection and a second configuration associated with a second interface of the first connection. The processor and memory may be further configured to transmit a configuration message based on determining the QoS configuration, the configuration message including the first configuration and the second configuration. The processor and memory may be further configured to communicate with the first UE via the relay connection based on the determined QoS configuration.

Another apparatus for wireless communications at a base station is described. The apparatus may include means for receiving, from a first UE, a request including a relay service code associated with a first connection between the first UE and a second UE and an indication of a relay connection via the second UE, the relay connection including the first connection between the first UE and the second UE and a second connection between the second UE and the base station. The apparatus may further include means for determining a QoS configuration for the relay connection, the QoS configuration including a first configuration associated with a first interface of the first connection and a second configuration associated with a second interface of the first connection. The apparatus may further include means for transmitting a configuration message based on determining the QoS configuration, the configuration message including the first configuration and the second configuration. The apparatus may further include means for communicating with the first UE via the relay connection based on the determined QoS configuration.

A non-transitory computer-readable medium storing code for wireless communications at a base station is described. The code may include instructions executable by a processor to receive, from a first UE, a request including a relay service code associated with a first connection between the first UE and a second UE and an indication of a relay connection via the second UE, the relay connection including the first connection between the first UE and the second UE and a second connection between the second UE and the base station. The code may further include instructions executable by a processor to determine a QoS configuration for the relay connection, the QoS configuration including a first configuration associated with a first interface of the first connection and a second configuration associated with a second interface of the first connection. The code may further include instructions executable by a processor to transmit a configuration message based on determining the QoS configuration, the configuration message including the first configuration and the second configuration. The code may further include instructions executable by a processor to communicate with the first UE via the relay connection based on the determined QoS configuration.

Some examples of the method, apparatuses, and non-transitory computer-readable medium described herein may further include operations, features, means, or instructions for receiving a registration message including a second indication of a non access stratum connection, determining that the first UE may be registered via the relay connection based on the registration message, and establishing the non access stratum connection via the relay connection based on the determining, where receiving the request may be based on establishing the non access stratum connection.

Some examples of the method, apparatuses, and non-transitory computer-readable medium described herein may further include operations, features, means, or instructions for transmitting one or more messages to an access and mobility management function (AMF) based on receiving the request, and receiving a session request from the AMF in response to transmitting the messages, where determining the QoS configuration for the relay connection may be based on the session request.

Some examples of the method, apparatuses, and non-transitory computer-readable medium described herein may further include operations, features, means, or instructions for receiving a quality report associated with the first connection, the quality report including a first identifier associated with the first interface and a second identifier associated with the second interface, updating the QoS configuration for the relay connection, the updated QoS configuration including a third configuration associated with the first connection, and transmitting a second configuration message based on updating the QoS configuration, the configuration message including the third configuration, where communicating with the first UE may be based on the updated QoS configuration.

In some examples of the method, apparatuses, and non-transitory computer-readable medium described herein, the quality report further includes an indication of a change in one or more parameters of the first connection.

In some examples of the method, apparatuses, and non-transitory computer-readable medium described herein, the quality report may be received periodically.

In some examples of the method, apparatuses, and non-transitory computer-readable medium described herein, the quality report may be received via the relay connection.

In some examples of the method, apparatuses, and non-transitory computer-readable medium described herein, the quality report may be received in a sidelink UE assistance information message.

In some examples of the method, apparatuses, and non-transitory computer-readable medium described herein, the quality report may be received in a message associated with the first interface or the second interface.

In some examples of the method, apparatuses, and non-transitory computer-readable medium described herein, the second configuration message further includes a timer associated with an activation of the third configuration.

Some examples of the method, apparatuses, and non-transitory computer-readable medium described herein may further include operations, features, means, or instructions for transmitting signaling to the second UE, the signaling including a first activation of the third configuration associated with the first connection, a second activation of a fourth configuration associated with the second connection, and forwarding instructions associated with the first activation.

In some examples of the method, apparatuses, and non-transitory computer-readable medium described herein, the first identifier associated with the first interface includes a PC5 LCID, and the second identifier associated with the second interface includes a Uu DRB identifier.

In some examples of the method, apparatuses, and non-transitory computer-readable medium described herein, the first interface includes a PC5 interface, and the second interface includes a Uu interface.

In some examples of the method, apparatuses, and non-transitory computer-readable medium described herein, the request includes a PDU session establishment request or a PDU session modification request.

In some examples of the method, apparatuses, and non-transitory computer-readable medium described herein, the configuration message includes an RRC reconfiguration message.

A method of wireless communications at a first UE is described. The method may include transmitting, to a network entity, a request including a relay service code and an indication of a relay connection via a second UE, the relay connection including a first connection between the first UE and the second UE and a second connection between the second UE and the network entity, the first connection associated with the relay service code. The method may further include receiving a configuration message in response to transmitting the request, the configuration message including a first configuration associated with a first interface of the first connection, a second configuration associated with a second interface of the first connection, and a quality of service (QoS) configuration based on the first configuration and the second configuration. The method may further include communicating with the network entity via the relay connection based on the QoS configuration that is based on the first configuration and the second configuration.

An apparatus for wireless communications at a first UE is described. The apparatus may include a processor and memory coupled to the processor. The processor and memory may be configured to transmit, to a network entity, a request including a relay service code and an indication of a relay connection via a second UE, the relay connection including a first connection between the first UE and the second UE and a second connection between the second UE and the network entity, the first connection associated with the relay service code. The processor and memory may be further configured to receive a configuration message in response to transmitting the request, the configuration message including a first configuration associated with a first interface of the first connection, a second configuration associated with a second interface of the first connection, and a QoS configuration based on the first configuration and the second configuration. The processor and memory may be further configured to communicate with the network entity via the relay connection based on a QoS configuration that is based on the first configuration and the second configuration.

Another apparatus for wireless communications at a first UE is described. The apparatus may include means for transmitting, to a network entity, a request including a relay service code and an indication of a relay connection via a second UE, the relay connection including a first connection between the first UE and the second UE and a second connection between the second UE and the network entity, the first connection associated with the relay service code. The apparatus may further include means for receiving a configuration message in response to transmitting the request, the configuration message including a first configuration associated with a first interface of the first connection, a second configuration associated with a second interface of the first connection, and a QoS configuration based on the first configuration and the second configuration. The apparatus may further include means for communicating with the network entity via the relay connection based on the QoS configuration that is based on the first configuration and the second configuration.

A non-transitory computer-readable medium storing code for wireless communications at a first UE is described. The code may include instructions executable by a processor to transmit, to a network entity, a request including a relay service code and an indication of a relay connection via a second UE, the relay connection including a first connection between the first UE and the second UE and a second connection between the second UE and the network entity, the first connection associated with the relay service code. The code may further include instructions executable by a processor to receive a configuration message in response to transmitting the request, the configuration message including a first configuration associated with a first interface of the first connection, a second configuration associated with a second interface of the first connection, and a QoS configuration based on the first configuration and the second configuration. The code may further include instructions executable by a processor to communicate with the network entity via the relay connection based on a QoS configuration that is based on the first configuration and the second configuration.

Some examples of the method, apparatuses, and non-transitory computer-readable medium described herein may further include operations, features, means, or instructions for transmitting, to the network entity, a registration message including a second indication of a non access stratum connection, and establishing the non access stratum connection via the relay connection based on the registration message, where transmitting the request may be based on establishing the non access stratum connection.

Some examples of the method, apparatuses, and non-transitory computer-readable medium described herein may further include operations, features, means, or instructions for exchanging one or more second configuration messages with the second UE based on the QoS configuration, determining one or more channel parameters associated with the first connection based on exchanging the one or more second configuration messages, and communicating with the second UE based on the determined channel parameters.

Some examples of the method, apparatuses, and non-transitory computer-readable medium described herein may further include operations, features, means, or instructions for transmitting a quality report associated with the first connection, the quality report including a first identifier associated with the first interface and a second identifier associated with the second interface, receiving a second configuration message in response to transmitting the quality report, the second configuration message including a third configuration associated with the first connection, and updating the QoS configuration based on the third configuration, where communicating with the network entity may be based on the updated QoS configuration.

Some examples of the method, apparatuses, and non-transitory computer-readable medium described herein may further include operations, features, means, or instructions for determining a change in one or more parameters of the first connection, where the quality report further includes an indication of the parameters of the first connection, and where the quality report may be transmitted based on determining the change.

In some examples of the method, apparatuses, and non-transitory computer-readable medium described herein, the quality report may be transmitted periodically.

In some examples of the method, apparatuses, and non-transitory computer-readable medium described herein, the quality report may be transmitted via the relay connection.

In some examples of the method, apparatuses, and non-transitory computer-readable medium described herein, the quality report may be transmitted in a sidelink UE assistance information message.

In some examples of the method, apparatuses, and non-transitory computer-readable medium described herein, the quality report may be transmitted in a message associated with the first interface or the second interface.

Some examples of the method, apparatuses, and non-transitory computer-readable medium described herein may further include operations, features, means, or instructions for identifying, in the second configuration message a timer associated with an activation of the third configuration, and applying the third configuration after the timer expires.

Some examples of the method, apparatuses, and non-transitory computer-readable medium described herein may further include operations, features, means, or instructions for receiving signaling from the second UE, the signaling indicating an activation of the third configuration associated with the first connection, applying the third configuration based on receiving the signaling, determining one or more channel parameters associated with the first connection based on the third configuration, and communicating with the second UE based on the determined channel parameters.

In some examples of the method, apparatuses, and non-transitory computer-readable medium described herein, the first identifier associated with the first interface includes a PC5 logic channel identifier (LCID), and the second identifier associated with the second interface includes a Uu data radio bearer (DRB) identifier.

In some examples of the method, apparatuses, and non-transitory computer-readable medium described herein, the first interface includes a PC5 interface, and the second interface includes a Uu interface.

Some examples of the method, apparatuses, and non-transitory computer-readable medium described herein may further include operations, features, means, or instructions for refraining from establishing a unicast link with the second UE, where the relay connection may be established based on refraining from establishing the unicast link.

Some examples of the method, apparatuses, and non-transitory computer-readable medium described herein may further include operations, features, means, or instructions for establishing a unicast link with the second UE, where the relay connection may be established based on establishing the unicast link.

In some examples of the method, apparatuses, and non-transitory computer-readable medium described herein, the request includes a protocol data unit (PDU) session establishment request or a PDU session modification request.

In some examples of the method, apparatuses, and non-transitory computer-readable medium described herein, the configuration message includes a Radio Resource Control (RRC) reconfiguration message.

A method of wireless communications at a network entity is described. The method may include receiving, from a first UE, a request including a relay service code associated with a first connection between the first UE and a second UE and an indication of a relay connection via the second UE, the relay connection including the first connection between the first UE and the second UE and a second connection between the second UE and the network entity. The method may further include transmitting a configuration message based on a QoS configuration for the relay connection, the QoS configuration including a first configuration associated with a first interface of the first connection and a second configuration associated with a second interface of the first connection, and the configuration message including the first configuration, the second configuration, and the QoS configuration. The method may further include communicating with the first UE via the relay connection based on the QoS configuration.

An apparatus for wireless communications at a network entity is described. The apparatus may include a processor and memory coupled to the processor. The processor and memory may be configured to receive, from a first UE, a request including a relay service code associated with a first connection between the first UE and a second UE and an indication of a relay connection via the second UE, the relay connection including the first connection between the first UE and the second UE and a second connection between the second UE and the network entity. The processor and memory may be further configured to transmit a configuration message based on a QoS configuration for the relay connection, the QoS configuration including a first configuration associated with a first interface of the first connection and a second configuration associated with a second interface of the first connection, and the configuration message including the first configuration, the second configuration, and the QoS configuration. The processor and memory may be further configured to communicate with the first UE via the relay connection based on the determined QoS configuration.

Another apparatus for wireless communications at a network entity is described. The apparatus may include means for receiving, from a first UE, a request including a relay service code associated with a first connection between the first UE and a second UE and an indication of a relay connection via the second UE, the relay connection including the first connection between the first UE and the second UE and a second connection between the second UE and the network entity. The apparatus may further include means for transmitting a configuration message based on a QoS configuration for the relay connection, the QoS configuration including a first configuration associated with a first interface of the first connection and a second configuration associated with a second interface of the first connection, and the configuration message including the first configuration, the second configuration, and the QoS configuration. The apparatus may further include means for communicating with the first UE via the relay connection based on the QoS configuration.

A non-transitory computer-readable medium storing code for wireless communications at a network entity is described. The code may include instructions executable by a processor to receive, from a first UE, a request including a relay service code associated with a first connection between the first UE and a second UE and an indication of a relay connection via the second UE, the relay connection including the first connection between the first UE and the second UE and a second connection between the second UE and the network entity. The code may further include instructions executable by a processor to transmit a configuration message based on a QoS configuration for the relay connection, the QoS configuration including a first configuration associated with a first interface of the first connection and a second configuration associated with a second interface of the first connection, and the configuration message including the first configuration, the second configuration, and the QoS configuration. The code may further include instructions executable by a processor to communicate with the first UE via the relay connection based on the determined QoS configuration.

Some examples of the method, apparatuses, and non-transitory computer-readable medium described herein may further include operations, features, means, or instructions for receiving a registration message including a second indication of a non access stratum connection, determining that the first UE may be registered via the relay connection based on the registration message, and establishing the non access stratum connection via the relay connection based on the determining, where receiving the request may be based on establishing the non access stratum connection.

Some examples of the method, apparatuses, and non-transitory computer-readable medium described herein may further include operations, features, means, or instructions for transmitting one or more messages to an access and mobility management function (AMF) based on receiving the request, and receiving a session request from the AMF in response to transmitting the messages, where determining the QoS configuration for the relay connection may be based on the session request.

Some examples of the method, apparatuses, and non-transitory computer-readable medium described herein may further include operations, features, means, or instructions for receiving a quality report associated with the first connection, the quality report including a first identifier associated with the first interface and a second identifier associated with the second interface, updating the QoS configuration for the relay connection, the updated QoS configuration including a third configuration associated with the first connection, and transmitting a second configuration message based on updating the QoS configuration, the second configuration message including the third configuration, where communicating with the first UE may be based on the updated QoS configuration.

In some examples of the method, apparatuses, and non-transitory computer-readable medium described herein, the quality report further includes an indication of a change in one or more parameters of the first connection.

In some examples of the method, apparatuses, and non-transitory computer-readable medium described herein, the quality report may be received periodically.

In some examples of the method, apparatuses, and non-transitory computer-readable medium described herein, the quality report may be received via the relay connection.

In some examples of the method, apparatuses, and non-transitory computer-readable medium described herein, the quality report may be received in a sidelink UE assistance information message.

In some examples of the method, apparatuses, and non-transitory computer-readable medium described herein, the quality report may be received in a message associated with the first interface or the second interface.

In some examples of the method, apparatuses, and non-transitory computer-readable medium described herein, the second configuration message further includes a timer associated with an activation of the third configuration.

Some examples of the method, apparatuses, and non-transitory computer-readable medium described herein may further include operations, features, means, or instructions for transmitting signaling to the second UE, the signaling including a first activation of the third configuration associated with the first connection, a second activation of a fourth configuration associated with the second connection, and forwarding instructions associated with the first activation.

In some examples of the method, apparatuses, and non-transitory computer-readable medium described herein, the first identifier associated with the first interface includes a PC5 LCID, and the second identifier associated with the second interface includes a Uu DRB identifier.

In some examples of the method, apparatuses, and non-transitory computer-readable medium described herein, the first interface includes a PC5 interface, and the second interface includes a Uu interface.

In some examples of the method, apparatuses, and non-transitory computer-readable medium described herein, the request includes a PDU session establishment request or a PDU session modification request.

In some examples of the method, apparatuses, and non-transitory computer-readable medium described herein, the configuration message includes an RRC reconfiguration message.

In some examples of the method, apparatuses, and non-transitory computer-readable medium described herein, the configuration message is transmitted to the first user equipment and the second user equipment, and the configuration message configures one or more entities corresponding to one or more layers of the first connection or the second connection of the relay connection.

DETAILED DESCRIPTION

Figure 1:
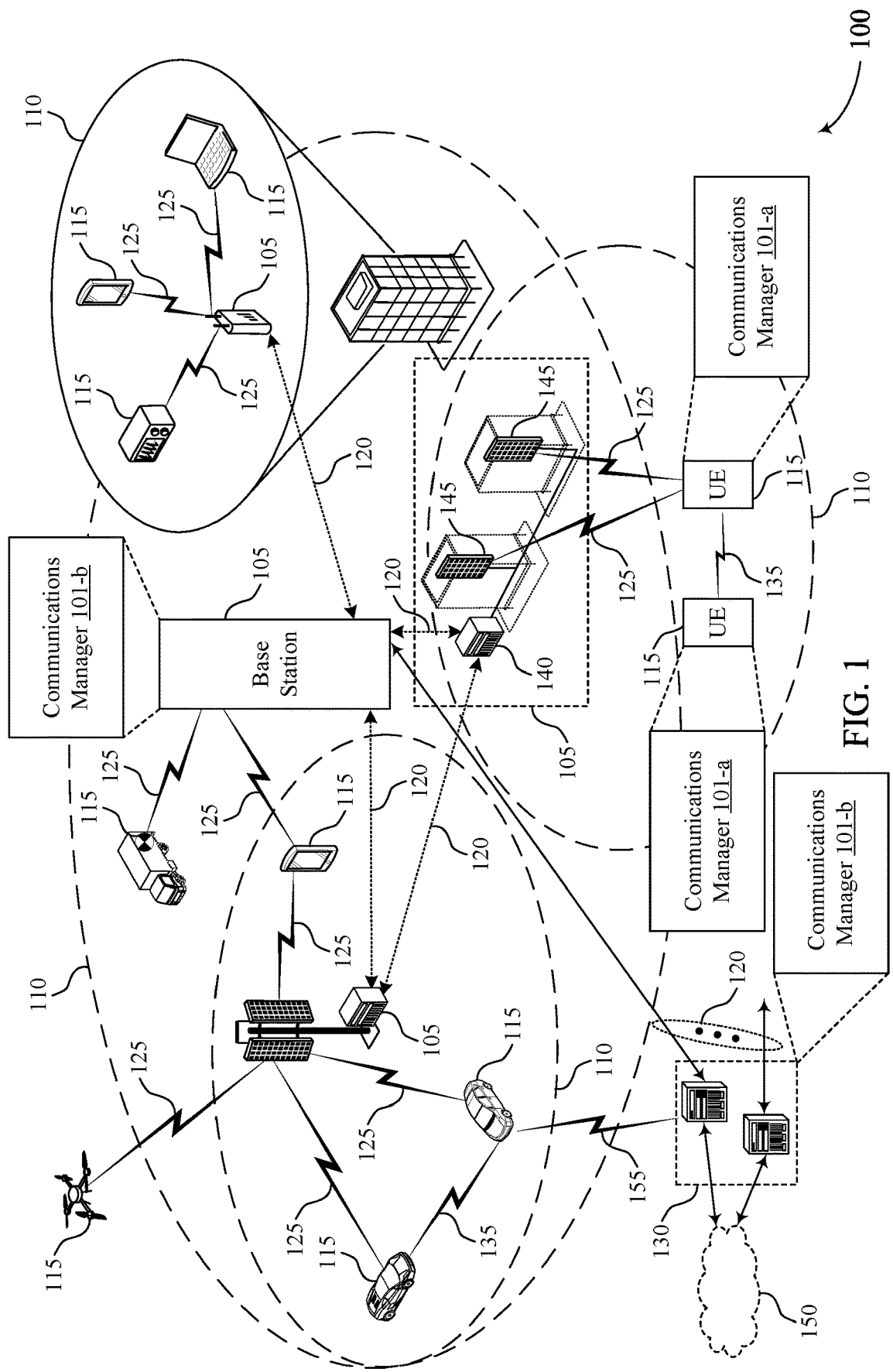
FIGS. 1 and 2 illustrate examples of a wireless communications system that supports techniques for quality of service support in sidelink communications in accordance with one or more aspects of the present disclosure.

Some wireless communication systems may have one or more UEs and one or more network entities (e.g., a base station or a network device as part of a core network, which may be a 5G core network (5GC)) that may support one or more multiple radio access technologies including 4G systems such as LTE systems and 5G systems which may be referred to as NR systems. According to one or more of these example radio access technologies, one or more UEs may communicate directly with one another in sidelink communication channels without transmitting through a network entity or through a relay point. A sidelink communication may be an example of device-to-device (D2D) communication, vehicle-to-everything (V2X) communication, or another example of sidelink communication in a wireless communications system.

A first UE may communicate with a network entity via a second UE. In some examples, the first UE may be referred to as a remote UE, and the second UE may be referred to as a relay UE. As used herein, the descriptor "remote UE" relates to a UE that communicates with a network entity via another UE, and the descriptor "relay UE" relates to a UE which relays communications between a network entity and a remote UE. The remote UE may communicate with the relay UE via a sidelink connection established over a sidelink interface, which in some examples may be referred to as a PC5 interface. The relay UE may relay transmissions from the remote UE to the network entity via an access link connection established over an access link interface, which may be referred to as a Uu interface. The connection between the remote UE and a 5GC (e.g., including the sidelink connection and the access link connection) may be referred to as a relay connection. In some examples, the relay connection may include a relay PDU session between the relay UE and the 5GC (e.g., via the Uu interface).

In some cases, the relay connection between the remote UE and a network entity of the 5GC may be a Layer 2 (L2) relay connection. An L2 relay connection may include the remote UE communicating user data to the network entity via the relay UE while communicating control data with the network entity on a control plane configured by the network entity. That is, the remote UE may not establish the control plane on the sidelink interface (e.g., PC5 interface) with the relay UE. The remote UE may maintain access stratum and non access stratum connections with the network entity. The network entity may control the sidelink connection between the remote UE and the relay UE via Radio Resource Control (RRC) messaging. An adaptation layer at the relay UE may support multiplexing traffic from multiple remote UEs on an interface (e.g., a Uu interface) between the relay UE and the network entity.

In some cases, the relay connection between the remote UE and a network entity of the 5GC may be an L2' relay connection. An L2' relay connection may include the remote UE communicating user data to the network entity via the relay UE while communicating control data with the network entity on a control plane configured by the network entity as well as a control plane on the sidelink interface (e.g., PC5 interface) with the relay UE. The network entity may support access stratum and non access stratum connections with the remote UE. A Radio Link Control (RLC) layer on the sidelink interface (e.g., PC5 interface) may support operation with a Packet Data Convergence Protocol (PDCP) layer on an interface (e.g., Uu interface) with the network entity. An adaptation layer at the relay UE may support multiplexing traffic from multiple remote UEs on signal radio bearers (SRBs) of an interface (e.g., a Uu interface) between the relay UE and the network entity.

When establishing a relay connection, a UE may transmit information requesting a QoS flow for the connection, where the requested QoS flow may be associated with a 5G QoS identifier (5QI). The 5QI may define one or more characteristics of the QoS flow, such as a resource type (e.g., a guaranteed bit rate (GBR), a delay critical GBR, a non-GBR, etc.), a priority level, a packet delay budget, a packet error rate, an averaging window, a maximum data burst volume, or any combination thereof. In some examples, a sidelink connection (e.g., a PC5 unicast link) may be associated with a sidelink QoS identifier, such as a PC5 specific QoS identifier (PQI). Similar to the 5QI, the sidelink QoS identifier may define one or more characteristics of the QoS flow for the sidelink connection.

In some examples, in response to a request from a remote UE for a QoS flow for a relay connection, a sidelink QoS flow with a sidelink QoS identifier (e.g., a PQI) may be established for a sidelink connection (e.g., a PC5 QoS flow for a PC5 unicast link) between the relay UE and the remote UE, and a separate access link QoS flow with a 5QI may be established for the Uu interface between the relay UE and the base station. The sidelink QoS identifier and the 5QI may be established independently and may fail to satisfy an end-to-end QoS flow for the relay connection (e.g., from the remote UE to the 5GC). For example, a remote UE may request a total packet delay budget (e.g., 100 milliseconds (ms)) for the relay connection. The sidelink QoS identifier may specify a first packet delay budget, and the 5QI may specify a second packet delay budget. Because the sidelink QoS identifier and the 5QI are established independently, the sum of the first and second packet delay budgets may be greater than the requested total packet delay budget, which may impact communications reliability and efficiency over the relay connection.

In accordance with techniques described herein, a network entity may determine an end-to-end QoS configuration when establishing a relay connection between a remote UE and the 5GC. In some examples, the QoS configuration may be associated with a QoS identifier, such as a 5QI or a PQI, or both. The QoS configuration may define a QoS flow for a sidelink interface (e.g., PC5 interface) between the remote UE and a relay UE, as well as a QoS flow for an additional interface (e.g., a Uu interface) between the relay UE and the network entity.

A remote UE may establish a sidelink connection with a relay UE using a sidelink discovery procedure. The sidelink connection may be associated with a relay service code, which may specify one or more characteristics of the sidelink connection. For example, the relay service code may identify one or more connectivity services the relay UE provides. The remote UE may also establish a relay connection between the network entity and the remote UE via the relay UE. In some examples, such as when setting up a relay connection of a first type (e.g., an L2 relay connection), the remote UE may establish the relay connection without first setting up a sidelink unicast link (e.g., a PC5 unicast link) with the relay UE. Alternatively, when setting up a relay connection of a second type (e.g., an L2' relay connection), the remote UE may first set up a sidelink unicast link (e.g., a PC5 unicast link with the relay UE prior to establishing the relay connection.

The remote UE may transmit a request to a network entity via the relay UE. The request may include the relay service code, as well as a request for QoS support for a relay connection between the network entity and the remote UE via the relay UE. In some examples, the request may be a PDU session establishment request or a PDU session modification request.

Based on the request from the remote UE, the network entity may determine a QoS configuration for the relay connection. The QoS configuration may define QoS characteristics for the sidelink connection and for the access link connection between the relay UE and the network entity. The QoS configuration may further include configurations for the sidelink connection interface (e.g., PC5 interface) and for an additional interface (e.g., a Uu interface, such as a virtual Uu interface) of the sidelink connection. The network entity may transmit a configuration message via the relay connection indicating the configurations and the QoS characteristics. In some examples, the configuration message may be included in an RRC reconfiguration message.

Based on the configuration message, the relay UE and the remote UE may adjust parameters of the sidelink connection and the access link connection to meet the specifications of the QoS configuration. For example, the relay UE may configure an access stratum (AS) entity for the Uu interface between the relay UE and the network entity and for the PC5 interface between the relay UE and the remote UE. Each AS entity may include a configuration for an RLC layer, a Medium Access Control (MAC) layer, and a physical (PHY)

layer. The remote UE may also configure one or more DRBs for the Uu interface of the relay connection. In some examples, the relay UE may create a mapping between an LCID of the PC5 interface and an LCID of the Uu interface of the access link connection to enable the relay UE to relay messages from the remote UE on the Uu interface. Based on the QoS configuration, the remote UE may communicate with the network entity over the relay connection.

In some examples, the remote UE may detect a change in channel conditions for the sidelink connection which may impact the QoS configuration. For example, based on a mobility of the remote UE or the relay UE, the remote UE may determine that the QoS (e.g., the packet delay budget, the packet error rate, etc.) that can be supported on the sidelink connection has changed. The remote UE may generate and transmit a link quality report identifying the change in channel conditions. In some examples, the remote UE may be configured to transmit the link quality report periodically. Additionally or alternatively, the remote UE may be configured to transmit the link quality report based on a triggering event, such as a QoS parameter changing such that the QoS parameter is above or below a threshold. The link quality report may include a DRB identifier for the Uu interface of the relay connection and the LCID of the PC5 interface, along with one or more additional QoS metrics, to indicate for which bearer and which QoS configuration the remote UE requests modification.

In some examples (e.g., in an L2 relay connection), the remote UE may transmit the link quality report in a message to the network entity via the relay UE. Additionally or alternatively (e.g., in an L2' relay connection), the remote UE may transmit the link quality report to the relay UE, and the relay UE may transmit a message to the network entity. In some examples, the network entity may receive the link quality report via the relay connection in a SidelinkUEAssistanceInformation message. Based on the link quality report, the network entity may update the QoS configuration, which may include determining an updated set of QoS characteristics for the sidelink connection. The network entity may transmit a configuration message indicating the updated QoS configuration to the relay UE and the remote UE, and the relay UE and the remote UE may apply the updated QoS configuration for communicating over the relay connection.

Particular aspects of the subject matter described in this disclosure may be implemented to realize lower end-to-end delays, higher reliability, power savings, and increased battery life. In some examples, a first device (e.g., a remote UE) may communicate with a network entity (e.g., a base station) via an additional device (e.g., a relay UE), and the first device may determine an end-to-end QoS configuration (e.g., based on signaling from the network entity) for a relay connection to improve reliability of transmissions based on the end-to-end QoS configuration.

One or more aspects of the disclosure are initially described in the context of wireless communications systems. One or more aspects of the disclosure are further illustrated by and described with reference to process flows, apparatus diagrams, system diagrams, and flowcharts that relate to techniques for QoS support in sidelink communications.

FIG. 1 illustrates an example of a wireless communications system 100 that supports techniques for QoS support in sidelink communications in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1. In some examples, a UE 115 may communicate with the core network 130 through a communication link 155.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 ms). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a D2D communication link 135 (e.g., using a peer-to-peer (P2P) or D2D protocol). In some cases, a communication link 135 may be referred to as a sidelink communication link and may be used for sidelink communications between UEs 115. One or more UEs 115 utilizing D2D or sidelink communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D or sidelink communications may utilize a one-to-many (1:M) system in which each UE 115 transmits to every other UE 115 in the group. In some examples, a base station 105 facilitates the scheduling of resources for D2D or sidelink communications. In other cases, D2D or sidelink communications are carried out between the UEs 115 without the involvement of a base station 105.

In some systems, the D2D or sidelink communication link 135 may be an example of a communication channel, such as a sidelink communication channel, between vehicles (e.g., UEs 115). In some examples, vehicles may communicate using V2X communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both. In some cases, sidelink communications may implement or use a PC5 interface. Additionally or alternatively, the D2D or sidelink communication link 135 may be used for additional services, such as interactive gaming or data sharing between variable kinds of terminals (e.g., mobile phones, robots, augmented reality (AR)/virtual reality (VR) devices like headsets/glasses or smart tablets, etc.).

The core network 130 may provide user authentication, access authorization, tracking, Internet Protocol (IP) connectivity, and other access, routing, or mobility functions. The core network 130 may be an evolved packet core (EPC) or 5GC, which may include at least one control plane entity that manages access and mobility (e.g., a mobility management entity (MME), an AMF) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In various examples, a communication manager 101 may be included in a device to support techniques for QoS support in sidelink communications. For example, a UE 115 may include a communications manager 101-a or a network entity (e.g., a base station 105 or a network device as part of the core network 130) may include a communications manager 101-b.

In some examples, a first UE 115 (e.g., a remote UE) may establish a relay connection for communicating with a network entity (e.g., a base station 105 or a network device as part of a core network 130) via a second UE 115 (e.g., a relay UE). For example, the relay connection may include a D2D link 135 and a communication link 125. The first UE 115 may transmit a request to the network entity via the second UE 115. The request may include a relay service code associated with the D2D link 135, as well as a request for QoS support for the relay connection. Based on the request, the network entity may determine a QoS configuration for the relay connection, for example at the communications manager 101-b. The QoS configuration may define QoS characteristics for the D2D link 135 and for the communication link 125. The QoS configuration may further include configurations for a PC5 interface of the D2D link 135 and for a Uu interface (e.g., a virtual Uu interface) of the D2D link 135. The network entity may transmit a configuration message to the UEs 115 via the relay connection indicating the configurations and the QoS characteristics. Based on the configuration message, the UEs 115 may adjust parameters of the D2D link 135 and the communication link 125 to meet the specifications of the QoS configuration, for example at the communications manager 101-a.

In some examples, the first UE 115 may detect a change in channel conditions for the D2D link 135 which may impact the QoS configuration. The first UE 115 may generate and transmit a link quality report to the network entity via the relay connection. Based on the link quality report, the network entity may update the QoS configuration, which may include determining an updated set of QoS characteristics for the D2D link 135. The network entity may transmit a configuration message indicating the updated QoS configuration to the UEs 115, and the UEs 115 may apply the updated QoS configuration for communicating over the relay connection. The techniques described herein may enable improvements for QoS support over the relay connection, among other benefits.

Figure 2:
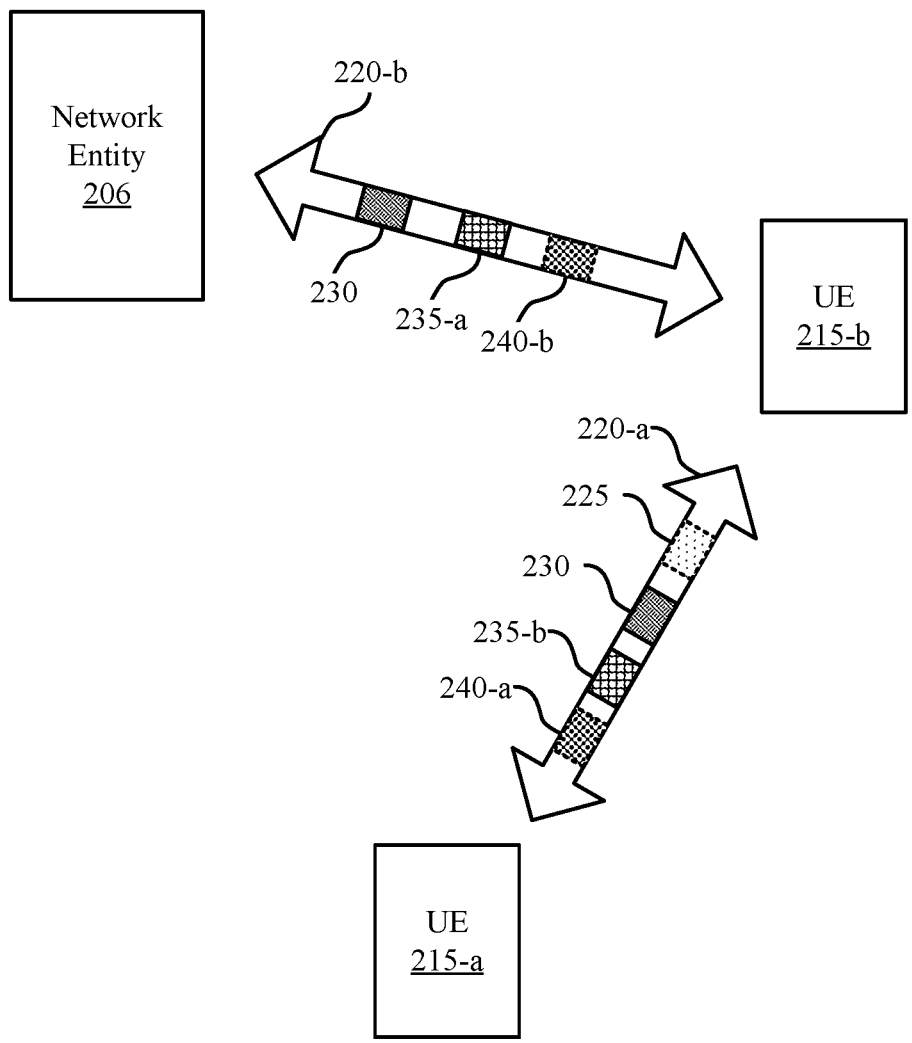
Figure 2:
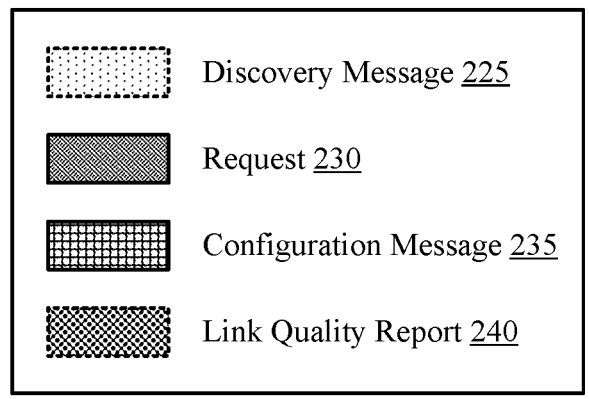

FIG. 2 illustrates an example of a wireless communications system 200 that supports techniques for QoS support in sidelink communications in accordance with one or more aspects of the present disclosure. In some examples, wireless communications system 200 may implement aspects of wireless communication system 100. For example, the wireless communications system may include a network entity 206 and UEs 215, which may be examples of the corresponding devices described with reference to FIG. 1.

A UE 215-a and a UE 215-b may establish a connection 220-a for sidelink communications. In some examples, the UE 215-a may be referred to as a remote UE and the UE 215-b may be referred to as a relay UE. In some examples, the UE 215-a and the UE 215-b may establish the connection 220-a using a sidelink discovery procedure. The UE 215-a may transmit a discovery message 225. The UE 215-b may provide a relay service code in response to the discovery message 225, where the relay service code may identify the connectivity service the UE 215-b is enabled to provide (e.g., relay connectivity). Based on the relay service code of the UE 215-b and the discovery message 225, the UE 215-a and the UE 215-b may establish the connection 220-a. Separately, the UE 215-b may establish a connection 220-b between the network entity 206 and the UE 215-b.

The UE 215-a may establish a relay connection between the network entity 206 and the UE 215-a, where the relay connection may include the connections 220-a and 220-b. The connection 220-a may include a PC5 interface and a Uu interface (e.g., a virtual Uu interface) for communications via the relay connection. The UE 215-a may transmit a request 230 to the network entity 206 via the UE 215-b. The request 230 may include the relay service code, as well as a request for QoS support for the relay connection. In some examples, the request 230 may be a PDU session establishment request or a PDU session modification request. Based on the request 230, the network entity 206 may determine a QoS configuration for the relay connection. The QoS configuration may define QoS characteristics for the connections 220-*a* and 220-*b*. The QoS configuration may further include configurations for the PC5 interface and for the Uu interface of the connection 220-*a*.

The network entity 206 may transmit a configuration message 235-*a* via the relay connection indicating the configurations and the QoS characteristics. In some examples, the configuration message 235-*a* may be included in an RRC reconfiguration message. The UE 215-*b* may forward a configuration message 235-*b* to the UE 215-*a* based on the configuration message 235-*a*. Based on the configuration messages 235, the UEs 215 may adjust parameters of the connections 220 to meet the specifications of the QoS configuration. For example, the UE 215-*b* may configure a control plane entity for the Uu interface between the UE 215-*b* and the network entity 206 (e.g., in the connection 220-*b*) and for the PC5 interface between the UE 215-*b* and the UE 215-*a* (e.g., in the connection 220-*a*). The UE 215-*a* may also configure one or more DRBs for the Uu interface of the relay connection. In some examples, the UE 215-*b* may create a mapping between an LCID of the PC5 interface of the connection 220-*a* and an LCID of the Uu interface of the connection 220-*b* to enable the UE 215-*b* to relay messages from the UE 215-*a* on the Uu interface. Based on the QoS configuration, the UE 215-*a* may communicate with the network entity 206 over the relay connection.

In some examples, the UE 215-*a* may detect a change in channel conditions for the connection 220-*a* which may impact the QoS configuration. For example, based on a mobility of the UE 215-*a* or the UE 215-*b*, the UE 215-*a* may determine that the QoS (e.g., the packet delay budget, the packet error rate, etc.) that can be supported on the connection 220-*a* has changed. The UE 215-*a* may generate and transmit a link quality report 240-*a* identifying the change in channel conditions. In some examples, the UE 215-*a* may be configured to transmit the link quality report 240-*a* periodically. Additionally or alternatively, the UE 215-*a* may be configured to transmit the link quality report 240-*a* based on a triggering event, such as a QoS parameter changing such that the QoS parameter is above or below a threshold. The link quality report 240-*a* may include a DRB identifier for the Uu interface of the connection 220-*a* and the LCID of the PC5 interface of the connection 220-*a*, along with one or more additional QoS metrics, to indicate for which bearer and which QoS configuration the UE 215-*a* requests modification.

The UE 215-*a* may transmit the link quality report 240-*a* to the UE 215-*b*, and the UE 215-*b* may transmit a link quality report 240-*b* based on the link quality report 240-*a* to the network entity 206. In some examples, the network entity 206 may receive the link quality report 240-*b* via the relay connection in a SidelinkUEAssistanceInformation message. Based on the link quality report 240-*b*, the network entity 206 may update the QoS configuration, which may include determining an updated set of QoS characteristics for the connection 220-*a*. The network entity 206 may transmit a second configuration message 235-*a* indicating the updated QoS configuration to the UE 215-*b* and the UE 215-*a*, and the UE 215-*b* and the UE 215-*a* may apply the updated QoS configuration for communicating over the relay connection. The techniques described herein may enable improvements for QoS support over the relay connection, among other benefits.

Figure 3:
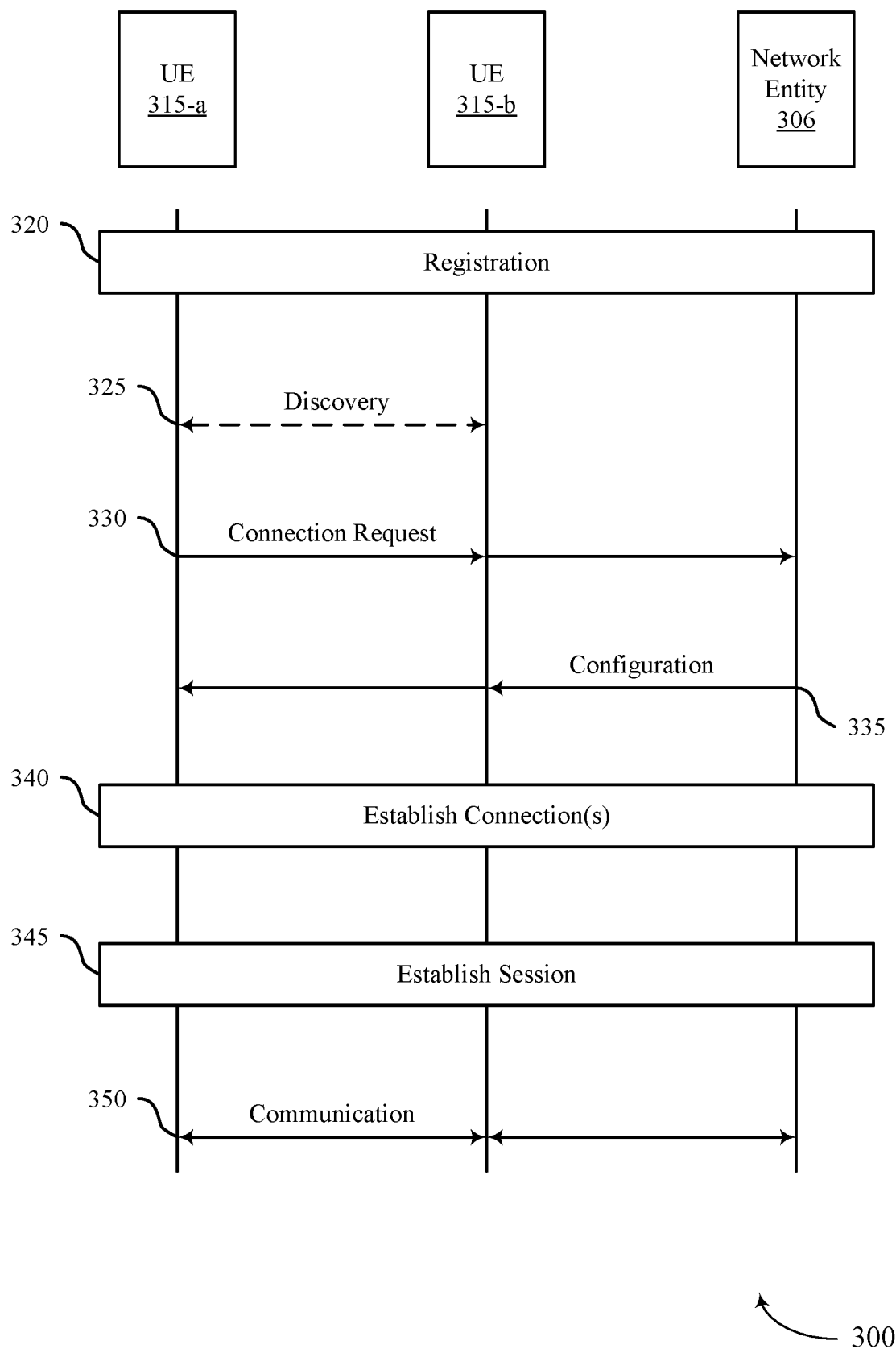
FIGS. 3 through 5 illustrate examples of process flows that support techniques for quality of service support in sidelink communications in accordance with one or more aspects of the present disclosure.

FIG. 3 illustrates an example of a process flow 300 that supports techniques for QoS support in sidelink communications in accordance with one or more aspects of the present disclosure. In some examples, the process flow 300 may implement aspects of wireless communications systems 100 and 200. For example, the process flow 300 may include example operations associated with one or more of a network entity 306 or a UE 315, which may be examples of the corresponding devices described with reference to FIGS. 1 and 2. In some examples, the UE 315-*a* may be referred to as a remote UE and the UE 315-*b* may be referred to as a relay UE. In the following description of the process flow 300, the operations between the network entity 306 and the UEs 315 may be performed in a different order than the example order shown, or the operations performed by the network entity 306 and the UEs 315 may be performed in different orders or at different times. Some operations may also be omitted from the process flow 300, and other operations may be added to the process flow 300. The operations performed by the network entity 306 and the UEs 315 may support improvement to the UE 315 QoS operations and, in some examples, may promote improvements to QoS support for the network entity 306 and the UEs 315, among other benefits.

At 320, the UEs 315 may perform a registration procedure with the network entity 306 to register the UEs 315 with the 5GC. For example, the UEs 315 may each transmit a registration message to the network entity 306. Based on the registration messages, the 5GC may authorize the UEs 315 and provision the UEs 315 with one or more policies, such as a proximity-based services (ProSe) policy. In some examples, the 315-*b* may be provisioned by the 5GC with a relay service code as part of the ProSe policy based on the connectivity service the UE 315-*b* is capable of providing (e.g., relay connectivity). A policy control function (PCF) may provision the UE 315-*b* with the relay service code. In some examples, during the registration procedure, the UEs 315 may be provisioned with one or more QoS parameters for sidelink communications, such as for a PC5 interface. The UEs 315 may additionally be provisioned with a mapping configuration mapping a service type of the sidelink communications (e.g., V2X, D2D, etc.) to the QoS parameters, or a mapping of PC5 QoS profiles to sidelink radio bearers (SLRBs), or both. In some examples, the QoS parameters may include a PQI for the PC5 interface. In some examples, the UE 315-*a* may include an indication in the registration message that a non-access stratum (NAS) connection may be set up via a relay connection.

In some examples, at 325 the UE 315-*a* and the UE 315-*b* may establish a sidelink connection using a sidelink discovery procedure. The UE 315-*a* may transmit a discovery message. The UE 315-*b* may provide the relay service code in response to the discovery message. Based on the relay service code of the UE 315-*b* and the discovery message, the UE 315-*a* and the UE 315-*b* may establish the sidelink connection. In some examples, the sidelink connection may include a PC5 interface and a Uu interface (e.g., a virtual Uu interface) for communications via a relay connection. In some examples (e.g., before establishing an L2' relay connection), the UE 315-*a* may set up a PC5 unicast link with the UE 315-*b*. In some other examples (e.g., before establishing an L2 relay connection), the UE 315-*a* may refrain from setting up the PC5 unicast link. Separately, the UE 315-*b* may establish an access link connection with the network entity 306, which may include a Uu interface.

At 330, the UE 315-*a* may transmit a connection request to establish the relay connection with the network entity 306 via the UE 315-*b*. In some examples (e.g., when requesting to establish an L2 relay connection), the UE 315-*a* may transmit the connection request in NR RRC messages on PC5 signal radio bearers (SRBs) in a sidelink broadcast control channel (SBCCH) transmission. The UE 315-*b* may relay the connection request to the network entity 306.

At 335, the network entity 306 may transmit one or more configuration messages (e.g., RRC configuration messages) to the UEs 315. The configuration messages may indicate configurations for AS connections, NAS connections, RRC connections, or any combination thereof, which may be part of the relay connection. The AS configurations may include configurations for the PC5 interface and the Uu interface. The configuration messages may also include security contexts for communications via the connections. In some examples, the network entity 306 may transmit configuration messages to the UE 315-*a* and the UE 315-*b* independently, for example via NR RRC messages. At 340, the UEs 315 and the network entity 306 may establish the relay connection (which may include one or more connections) based on the configuration messages.

At 345, the UEs 315 and the network entity 306 may establish a session for communications via the relay connection. The UE 315-*a* may transmit a request to the network entity 306 via the UE 315-*b*. The request may include the relay service code associated with the sidelink connection, as well as a request for QoS support for the relay connection. In some examples, the request may be include in a PDU session establishment or modification request. Based on the request, the network entity 306 may determine a QoS configuration for the relay connection. The network entity 306 may indicate the QoS configuration in a configuration message (e.g., an RRC reconfiguration message) to the UEs 315 via the relay connection. Based on the configuration message, the UEs 315 may adjust parameters of the relay connection to meet the specifications of the QoS configuration.

At 350, the UE 315-*a* may communicate with the network entity 306 over the relay connection based on the indicated QoS configuration. The operations performed by the network entity 306 and the UEs 315 may support improvement to the UE 315 QoS operations and, in some examples, may promote improvements to QoS support for the network entity 306 and the UEs 315, among other benefits.

Figure 4:
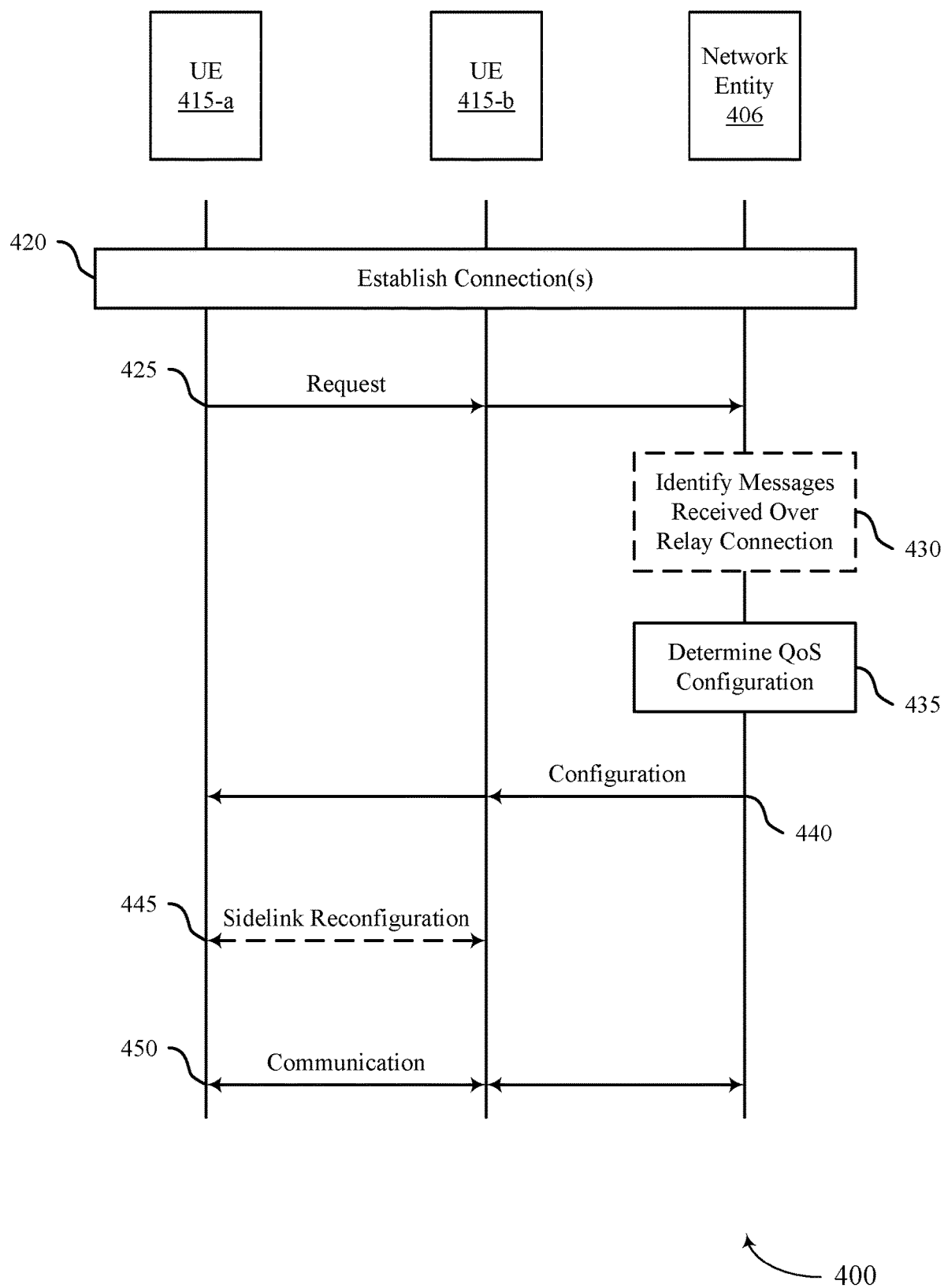

FIG. 4 illustrates an example of a process flow 400 that supports techniques for QoS support in sidelink communications in accordance with one or more aspects of the present disclosure. In some examples, the process flow 400 may implement aspects of wireless communications systems 100 and 200. For example, the process flow 400 may include example operations associated with one or more of a network entity 406 or a UE 415, which may be examples of the corresponding devices described with reference to FIGS. 1 and 2. In some examples, the UE 415-*a* may be referred to as a remote UE and the UE 415-*b* may be referred to as a relay UE. In the following description of the process flow 400, the operations between the network entity 406 and the UEs 415 may be performed in a different order than the example order shown, or the operations performed by the network entity 406 and the UEs 415 may be performed in different orders or at different times. Some operations may also be omitted from the process flow 400, and other operations may be added to the process flow 400. The operations performed by the network entity 406 and the UEs 415 may support improvement to the UE 415 QoS operations and, in some examples, may promote improvements to QoS support for the network entity 406 and the UEs 415, among other benefits.

At 420, the UEs 415 and the network entity 406 may establish a relay connection between the UE 415-*a* and the network entity 406, where messages between the UE 415-*a* and the bae station 405 may be relayed via the UE 415-*b*. The relay connection may be established according to the techniques described in FIGS. 1 through 3. The relay connection may include a sidelink connection between the UE 415-*a* and the UE 415-*b*, as well as an access link connection between the UE 415-*b* and the network entity 406. In some examples, the sidelink connection may include a PC5 interface and a Uu interface (e.g., a virtual Uu interface) for communications via the relay connection.

At 425, the UE 415-*a* may transmit a request to the network entity 406 via the UE 415-*b*. The request may include a relay service code associated with the sidelink connection, as well as a request for QoS support for the relay connection. In some examples, the request may be a PDU session establishment request or a PDU session modification request.

In some examples, at 430 the network entity 406 may identify that one or more messages from the UE 415-*a* are received (e.g., routed) over the relay connection. The messages may include RRC messages, NAS messages, or both. In some examples, the network entity 406 may identify the messages are received on SRBs or logic channels of the relay connection, and identify the messages are received over the relay connection based on the identified SRBs or logic channels. Additionally or alternatively, the network entity 406 may identify an adaptation layer header included with the routed messages. The adaptation layer may indicate information associated with the UE 415-*a*, and the network entity 406 may identify the messages are received over the relay connection based on the information indicated in the adaptation layer header.

At 435, the network entity 406 may determine a QoS configuration for the relay connection based on the received request. In some examples, the network entity 406 may determine the QoS configuration based on communicating with one or more components of the 5GC. For example, the network entity 406 may transmit one or messages to an AMF of the 5GC, for example via an N2 interface. The messages may indicate one or more parameters of the relay connection, such as a relay path, the relay service code, etc. The AMF may in turn transmit a message indicating the relay connection parameters to a session management function (SMF), for example via an Nsmf interface. The SMF may check rules of a Policy and Charging Control (PCC) architecture to verify that a relay service associated with the relay connection is authorized. The SMF may further determine a QoS configuration (e.g., from a set of QoS configurations) for the relay connection in a PDU session. The SMF and the AMF may set up a PDU session context for the UE 415-*a* based on the determined QoS configuration, and transmit a PDU session request to the network entity 406. The PDU session request may identify the relay path of the relay connection and a 5QI associated with the relay connection.

The network entity 406 may determine parameters of the QoS configuration for the relay connection based on the messages from the 5GC, including QoS characteristics for the sidelink and access link connections to meet the end-to-end QoS requested by the UE 415-*a*. For example, the network entity 406 may determine configurations for the Uu DRBs of the sidelink connection, as well as AS configurations for the PC5 interface of the sidelink connection and for the Uu interface of the access link connection.

At 440, the network entity 406 may transmit one or more configuration messages via the relay connection indicating the configurations and the QoS characteristics. In some examples, the configuration messages may be included in RRC reconfiguration messages. The UE 415-*b* may relay at least a portion of the configuration messages to the UE 415-*a*, for example in a PC5 RRC reconfiguration message. Based on the configuration messages, the UEs 415 may adjust parameters of the sidelink and access link connections to meet the specifications of the QoS configuration. For example, the UE 415-*b* may configure an AS entity for the Uu interface between the UE 415-*b* and the network entity 406 and for the PC5 interface between the UE 415-*b* and the UE 415-*a*. The UE 415-*a* may also configure one or more DRBs for the Uu interface of the relay connection. For example, the UE 415-*a* may configure DRBs for services and functions associated with an NR Service Data Adaptation Protocol (SDAP) and an NR Packet Data Convergence Protocol (PDCP) for the PDU session over the relay connection. Additionally, the UE 415-*b* may create a mapping between an LCID of the PC5 interface of the sidelink connection and an LCID of the Uu interface of the access link connection to enable the UE 415-*b* to relay messages from the UE 415-*a* on the Uu interface.

In some examples, at 445 the UE 415-*b* and the UE 415-*a* may exchange additional messages to configure the sidelink connection based on the configuration messages. The messages may include one or more PC5 RRCReconfiguration-Sidelink messages. For example, the UE 415-*b* and the UE 415-*a* may create additional logical channels for communicating messages via the relay connection. Based on the additional logical channels, the UE 415-*b* may configure (or reconfigure) the AS entity for the PC5 interface, which may include configuring the RLC, MAC, and PHY layers.

At 450, the UE 415-*a* may communicate with the network entity 406 over the relay connection based on the indicated QoS configuration. The operations performed by the network entity 406 and the UEs 415 may support improvement to the UE 415 QoS operations and, in some examples, may promote improvements to QoS support for the network entity 406 and the UEs 415, among other benefits.

Figure 5:
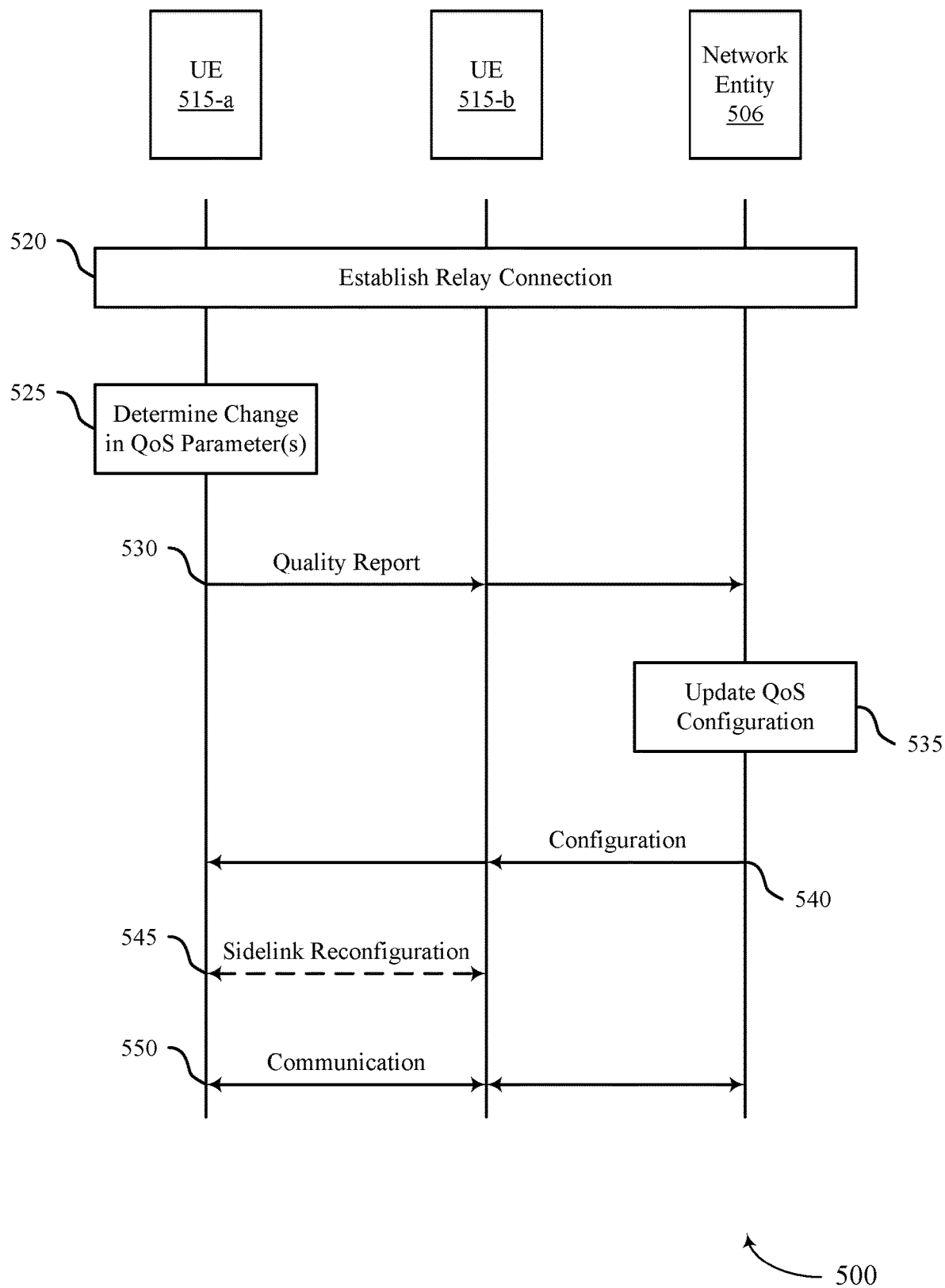

FIG. 5 illustrates an example of a process flow 500 that supports techniques for QoS support in sidelink communications in accordance with one or more aspects of the present disclosure. In some examples, the process flow 500 may implement aspects of wireless communications systems 100 and 200. For example, the process flow 500 may include example operations associated with one or more of a network entity 506 or a UE 515, which may be examples of the corresponding devices described with reference to FIGS. 1 and 2. In some examples, the UE 515-*a* may be referred to as a remote UE and the UE 515-*b* may be referred to as a relay UE. In the following description of the process flow 500, the operations between the network entity 506 and the UEs 515 may be performed in a different order than the example order shown, or the operations performed by the network entity 506 and the UEs 515 may be performed in different orders or at different times. Some operations may also be omitted from the process flow 500, and other operations may be added to the process flow 500. The operations performed by the network entity 506 and the UEs 515 may support improvement to the UE 515 QoS operations and, in some examples, may promote improvements to QoS support for the network entity 506 and the UEs 515, among other benefits.

At 520, the UEs 515 and the network entity 506 may establish a relay connection between the UE 515-*a* and the network entity 506, where messages between the UE 515-*a* and the bae station 505 may be relayed via the UE 515-*b*. The relay connection may be established according to the techniques described in FIGS. 1 through 4. The relay connection may include a sidelink connection between the UE 515-*a* and the UE 515-*b*, as well as an access link connection between the UE 515-*b* and the network entity 506. In some examples, the sidelink connection may include a PC5 interface and a Uu interface (e.g., a virtual Uu interface) for communications via the relay connection. The UE 515-*a* may communicate with the network entity 506 based on a determined QoS configuration, which may include QoS characteristics for the sidelink and access link connections to meet an end-to-end QoS requested by the UE 515-*a*. For example, the QoS configuration may include configurations for Uu DRBs of the sidelink connection, as well as AS configurations for the PC5 interface of the sidelink connection and for a Uu interface of the access link connection.

At 525, the UE 515-*a* may determine a change in QoS parameters or channel conditions for the sidelink connection, which may impact the established QoS configuration. For example, based on a mobility of the UE 515-*a* or the UE 515-*b*, the UE 515-*a* may determine that the QoS (e.g., the packet delay budget, the packet error rate, etc.) that can be supported on the sidelink connection has changed.

At 530, the UE 515-*a* may generate and transmit a link quality report identifying the change in the QoS parameters. In some examples, the UE 515-*a* may be configured to transmit the link quality report periodically, where the periodic link quality report may include any changes in the QoS parameters since a previous link quality report was transmitted. Additionally or alternatively, the UE 515-*a* may be configured to transmit the link quality report based on a triggering event, such as a QoS parameter changing such that the QoS parameter is above or below a threshold. The link quality report may include a DRB identifier for the Uu interface and the LCID of the PC5 interface of the sidelink connection, along with one or more additional QoS metrics, to indicate for which bearer and which QoS configuration the UE 515-*a* requests modification. The UE 515-*a* may transmit the link quality report to the UE 515-*b*, and the UE 515-*b* may transmit a message including the link quality report to the network entity 506. In some examples, the network entity 506 may receive the link quality report via the relay connection in a SidelinkUEAssistanceInformation message.

At 535, the network entity 506 may update the QoS configuration, which may include determining an updated set of QoS characteristics for the sidelink connection to meet the requested end-to-end QoS for the UE 515-*a*. In some examples, the network entity 506 may update the QoS configuration by communicating with components of the 5GC according to the operations of the process flow 400 as described with reference to FIG. 4.

At 540, the network entity 506 may transmit one or more configuration messages (e.g., RRC reconfiguration messages) indicating the updated QoS configuration to the UEs 515. In some examples, the configuration messages may include instructions for synchronizing the UEs 515 to concurrently apply the updated QoS configuration for the sidelink connection. For example, the configuration messages may include one or more timers associated with activating the updated QoS configuration. In some examples, a first timer associated with activation at the UE 515-*b* may be less than a second timer associated with activation at the UE 515-*a* based on transmission times. Additionally or alternatively, the network entity 506 may explicitly indicate the activation of the updated QoS configuration via signaling to the UE 515-*b* (e.g., signaling in a MAC control element (MAC-CE) or signaling at the PHY layer), and the network entity 506 may instruct the UE 515-*b* to indicate the activation to the UE 515-*a*.

In some examples, at 545 the UE 515-*b* and the UE 515-*a* may exchange additional messages to configure the sidelink connection based on the updated QoS configuration. For example, the UEs 515 may use the messages to modify the sidelink connection to satisfy the end-to-end QoS requested for the relay connection.

At 550, the UE 515-*a* may communicate with the network entity 506 over the relay connection based on the updated QoS configuration. The operations performed by the network entity 506 and the UEs 515 may support improvement to the UE 515 QoS operations and, in some examples, may promote improvements to QoS support for the network entity 506 and the UEs 515, among other benefits.

Figure 6:
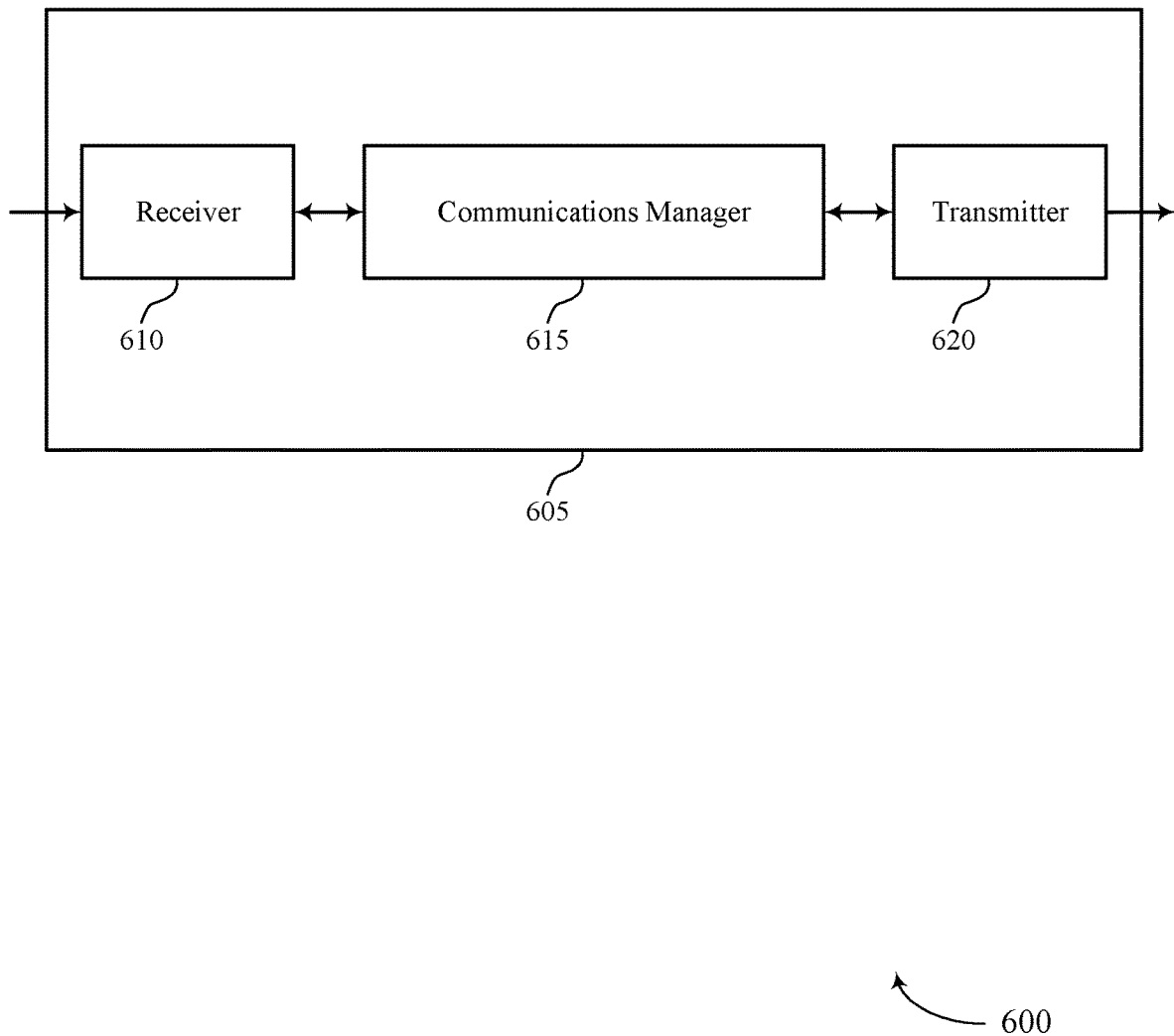
FIGS. 6 and 7 show block diagrams of devices that support techniques for quality of service support in sidelink communications in accordance with one or more aspects of the present disclosure.

FIG. 6 shows a block diagram 600 of a device 605 that supports techniques for QoS support in sidelink communications in accordance with one or more aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to techniques for QoS support in sidelink communications, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may transmit, to a network entity, a request including a relay service code and an indication of a relay connection via a second UE, the relay connection including a first connection between the device 605 and the second UE and a second connection between the second UE and the network entity, the first connection associated with the relay service code. The communications manager 615 may receive a configuration message in response to transmitting the request, the configuration message including a first configuration associated with a first interface of the first connection, a second configuration associated with a second interface of the first connection, and a QoS configuration based on the first configuration and the second configuration. The communications manager 615 may communicate with the network entity via the relay connection based on the QoS configuration that is based on the first configuration and the second configuration.

The communications manager 615 as described herein may be implemented to realize one or more potential improvements. One implementation may allow the device 605 to save power and increase battery life by communicating with a network entity (e.g., a network entity as shown in FIG. 1) more efficiently. For example, the device 605 may efficiently communicate with a network entity via another UE, as the device 605 may be able to determine an end-to-end QoS configuration for a relay connection and improve reliability of transmissions based on the QoS configuration. The communications manager 615 may be an example of aspects of the communications manager 910 described herein.

The communications manager 615 may be an example of means for performing various aspects of QoS support in sidelink communications as described herein. The communications manager 615, or its sub-components, may be implemented in hardware (e.g., in communications management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the communications manager 615, or its sub-components, may be implemented in code (e.g., as communications management software or firmware) executed by a processor, or any combination thereof. If implemented in code executed by a processor, the functions of the communications manager 615, or its sub-components may be executed by a general-purpose processor, a DSP, an ASIC, an FPGA or other programmable logic device.

In some examples, the communication manager 615 may be configured to perform various operations (e.g., receiving, determining, transmitting) using or otherwise in cooperation with the receiver 610, the transmitter 620, or both.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
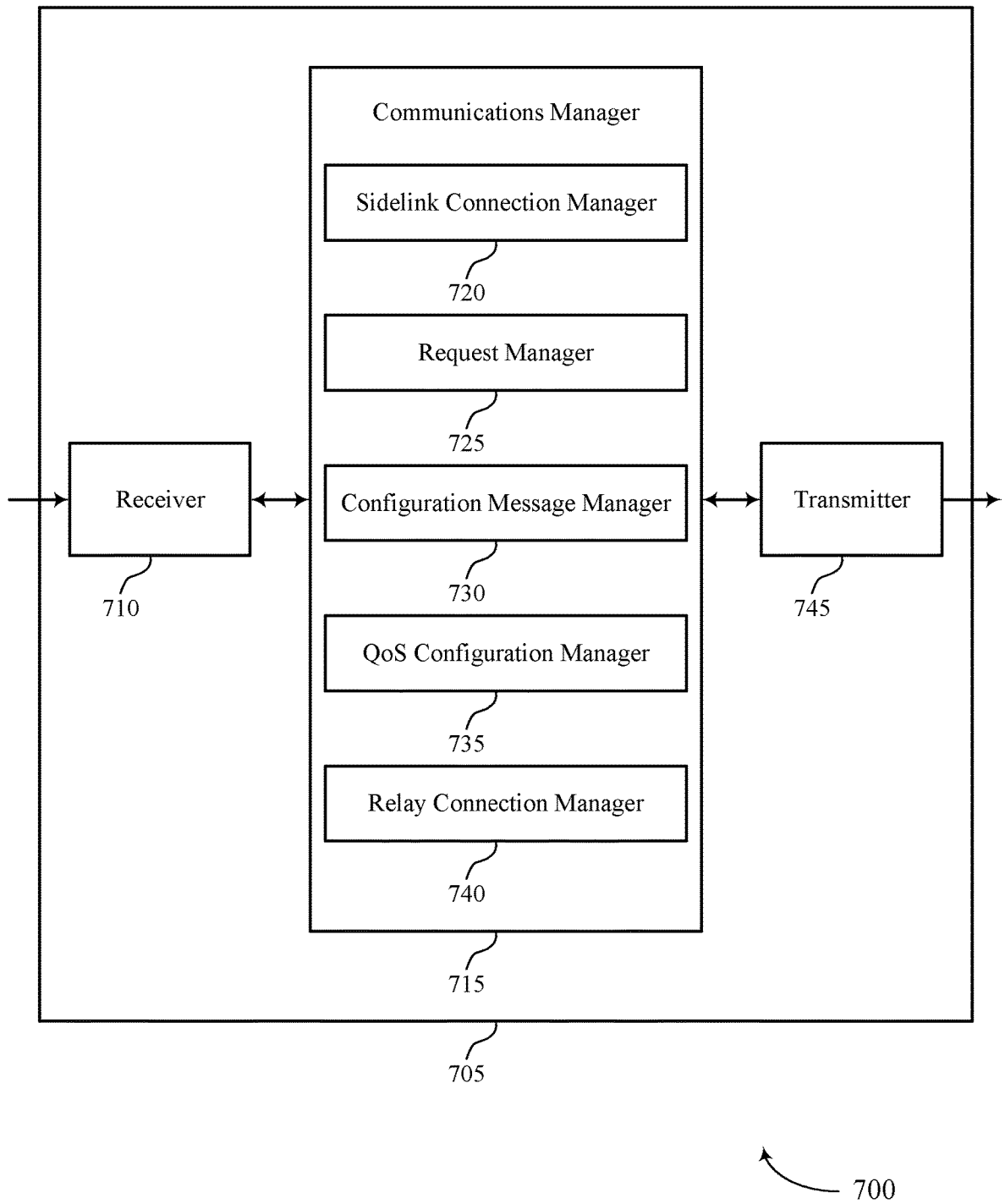

FIG. 7 shows a block diagram 700 of a device 705 that supports techniques for QoS support in sidelink communications in accordance with one or more aspects of the present disclosure. The device 705 may be an example of aspects of a device 605, or a UE 115 as described herein. The device 705 may include a receiver 710, a communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to techniques for QoS support in sidelink communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a sidelink connection manager 720, a request manager 725, a configuration message manager 730, a QoS configuration manager 735, and a relay connection manager 740. The communications manager 715 may be an example of aspects of the communications manager 910 described herein.

In some examples, the sidelink connection manager 720 may establish a first connection between the device 705 and a second UE, the first connection associated with a relay service code.

The request manager 725 may transmit, to a network entity, a request including the relay service code and an indication of a relay connection via the second UE, the relay connection including the first connection between the device 705 and the second UE and a second connection between the second UE and the network entity, the first connection associated with the relay service code.

The configuration message manager 730 may receive a configuration message in response to transmitting the request, the configuration message including a first configuration associated with a first interface of the first connection, a second configuration associated with a second interface of the first connection, and a QoS configuration based on the first configuration and the second configuration.

In some examples, the QoS configuration manager 735 may determine a QoS configuration based on the first configuration and the second configuration.

The relay connection manager 740 may communicate with the network entity via the relay connection based on the QoS configuration that is based on the first configuration and the second configuration.

The transmitter 745 may transmit signals generated by other components of the device 705. In some examples, the transmitter 745 may be collocated with a receiver 710 in a transceiver module. For example, the transmitter 745 may be an example of aspects of the transceiver 920 described with reference to FIG. 9. The transmitter 745 may utilize a single antenna or a set of antennas.

Figure 8:
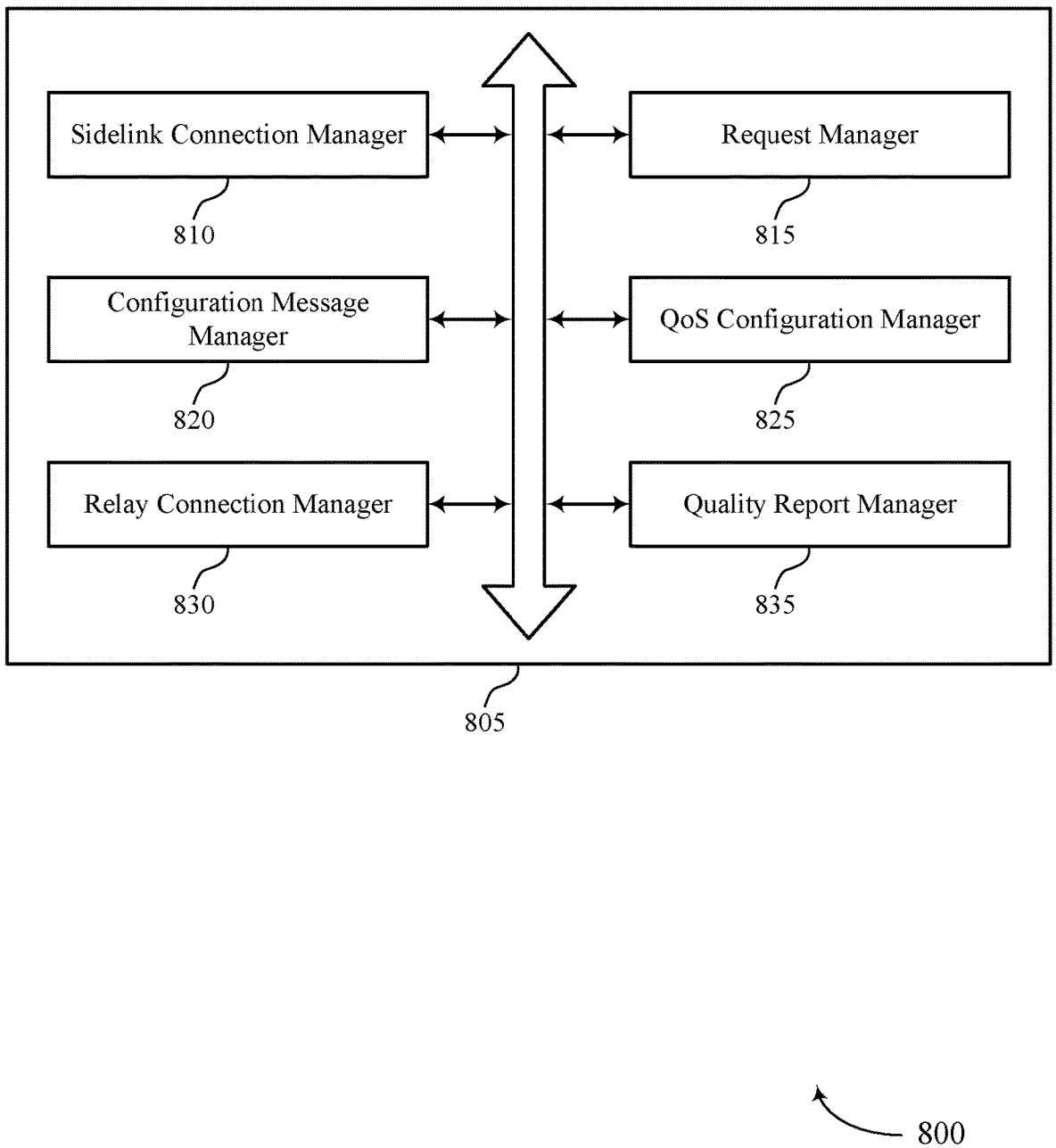
FIG. 8 shows a block diagram of a communications manager that supports techniques for quality of service support in sidelink communications in accordance with one or more aspects of the present disclosure.

FIG. 8 shows a block diagram 800 of a communications manager 805 that supports techniques for QoS support in sidelink communications in accordance with one or more aspects of the present disclosure. The communications manager 805 may be an example of aspects of a communications manager 615, a communications manager 715, or a communications manager 910 described herein. The communications manager 805 may include a sidelink connection manager 810, a request manager 815, a configuration message manager 820, a QoS configuration manager 825, a relay connection manager 830, and a quality report manager 835. Each of these modules may communicate, directly or indirectly, with one another (e.g., via one or more buses).

In some examples, the sidelink connection manager 810 may establish a first connection between a first UE and a second UE, the first connection associated with a relay service code. In some examples, the sidelink connection manager 810 may exchange one or more second configuration messages with the second UE based on the QoS configuration.

In some examples, the sidelink connection manager 810 may determine one or more channel parameters associated with the first connection based on exchanging the one or more second configuration messages. In some examples, the sidelink connection manager 810 may communicate with the second UE based on the determined channel parameters.

In some examples, the sidelink connection manager 810 may determine a change in one or more parameters of the first connection, where the quality report further includes an indication of the parameters of the first connection, and where the quality report is transmitted based on determining the change. In some examples, the sidelink connection manager 810 may determine one or more channel parameters associated with the first connection based on the third configuration.

In some examples, the sidelink connection manager 810 may refrain from establishing a unicast link with the second UE, where the relay connection is established based on refraining from establishing the unicast link. In some examples, the sidelink connection manager 810 may establish a unicast link with the second UE, where the relay connection is established based on establishing the unicast link.

The request manager 815 may transmit, to a network entity, a request including the relay service code and an indication of a relay connection via the second UE, the relay connection including the first connection between the first UE and the second UE and a second connection between the second UE and the network entity, the first connection associated with the relay service code. In some examples, the request manager 815 may transmit, to the network entity, a registration message including a second indication of a non access stratum connection. In some cases, the request includes a PDU session establishment request or a PDU session modification request.

The configuration message manager 820 may receive a configuration message in response to transmitting the request, the configuration message including a first configuration associated with a first interface of the first connection, a second configuration associated with a second interface of the first connection, and a QoS configuration based on the first configuration and the second configuration. In some examples, the configuration message manager 820 may receive a second configuration message in response to transmitting the quality report, the second configuration message including a third configuration associated with the first connection.

In some examples, the configuration message manager 820 may identify, in the second configuration message a timer associated with an activation of the third configuration. In some examples, the configuration message manager 820 may receive signaling from the second UE, the signaling indicating an activation of the third configuration associated with the first connection. In some cases, the first interface includes a PC5 interface. In some cases, the second interface includes a Uu interface. In some cases, the configuration message includes an RRC reconfiguration message.

In some examples, the QoS configuration manager 825 may determine a QoS configuration based on the first configuration and the second configuration. In some examples, the QoS configuration manager 825 may update the QoS configuration based on the third configuration, where communicating with the network entity is based on the updated QoS configuration. In some examples, the QoS configuration manager 825 may apply the third configuration after the timer expires. In some examples, the QoS configuration manager 825 may apply the third configuration based on receiving the signaling.

The relay connection manager 830 may communicate with the network entity via the relay connection based on the QoS configuration that is based on the first configuration and the second configuration. In some examples, the relay connection manager 830 may establish the non access stratum connection via the relay connection based on the registration message, where transmitting the request is based on establishing the non access stratum connection.

The quality report manager 835 may transmit a quality report associated with the first connection, the quality report including a first identifier associated with the first interface and a second identifier associated with the second interface. In some cases, the quality report is transmitted periodically. In some cases, the quality report is transmitted via the relay connection. In some cases, the quality report is transmitted in a sidelink UE assistance information message. In some cases, the quality report is transmitted in a message associated with the first interface or the second interface. In some cases, the first identifier associated with the first interface includes a PC5 LCID. In some cases, the second identifier associated with the second interface includes a Uu DRB identifier.

Figure 9:
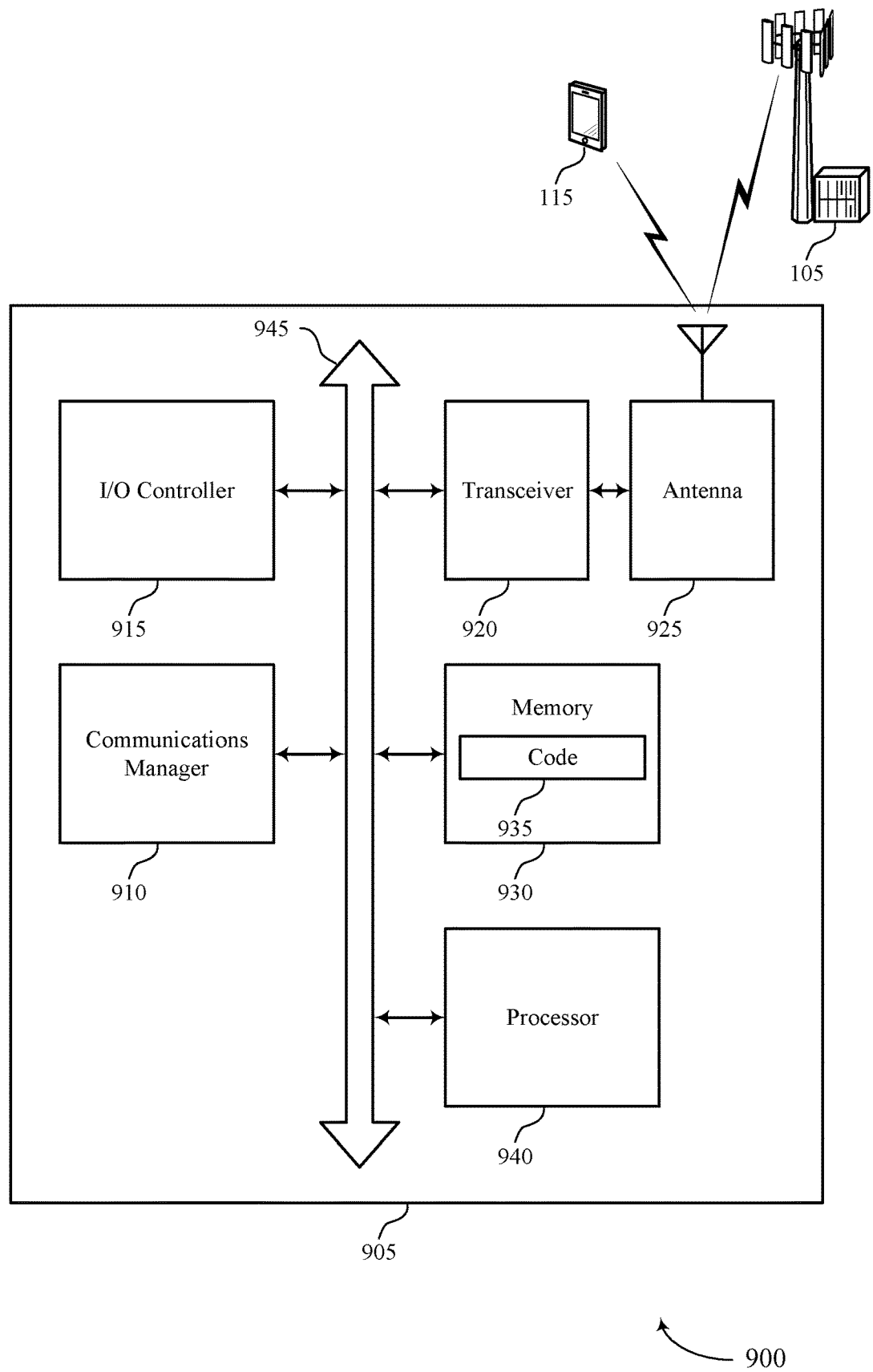
FIG. 9 shows a diagram of a system including a device that supports techniques for quality of service support in sidelink communications in accordance with one or more aspects of the present disclosure.

FIG. 9 shows a diagram of a system 900 including a device 905 that supports techniques for QoS support in sidelink communications in accordance with one or more aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 915 may transmit, to a network entity, a request including a relay service code and an indication of a relay connection via a second UE, the relay connection including a first connection between the device 905 and the second UE and a second connection between the second UE and the network entity, the first connection associated with the relay service code. The communications manager 915 may receive a configuration message in response to transmitting the request, the configuration message including a first configuration associated with a first interface of the first connection, a second configuration associated with a second interface of the first connection, and a QoS configuration based on the first configuration and the second configuration. The communications manager 915 may communicate with the network entity via the relay connection based on the QoS configuration that is based on the first configuration and the second configuration.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for QoS support in sidelink communications).

The processor 940 of the device 905 (e.g., controlling the receiver 610, the transmitter 620, or the transceiver 920) may reduce power consumption and increase communications efficiency based on applying the QoS configuration. In some examples, the processor 940 of the device 905 may reconfigure parameters for applying the QoS configuration. For example, the processor 940 of the device 905 may turn on one or more processing units for adjusting transmission parameters, increase a processing clock, or a similar mechanism within the device 905. As such, when subsequent QoS configuration indications are received, the processor 940 may be ready to respond more efficiently through the reduction of a ramp up in processing power. The improvements in power saving and QoS configuration application efficiency may further increase battery life at the device 905.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
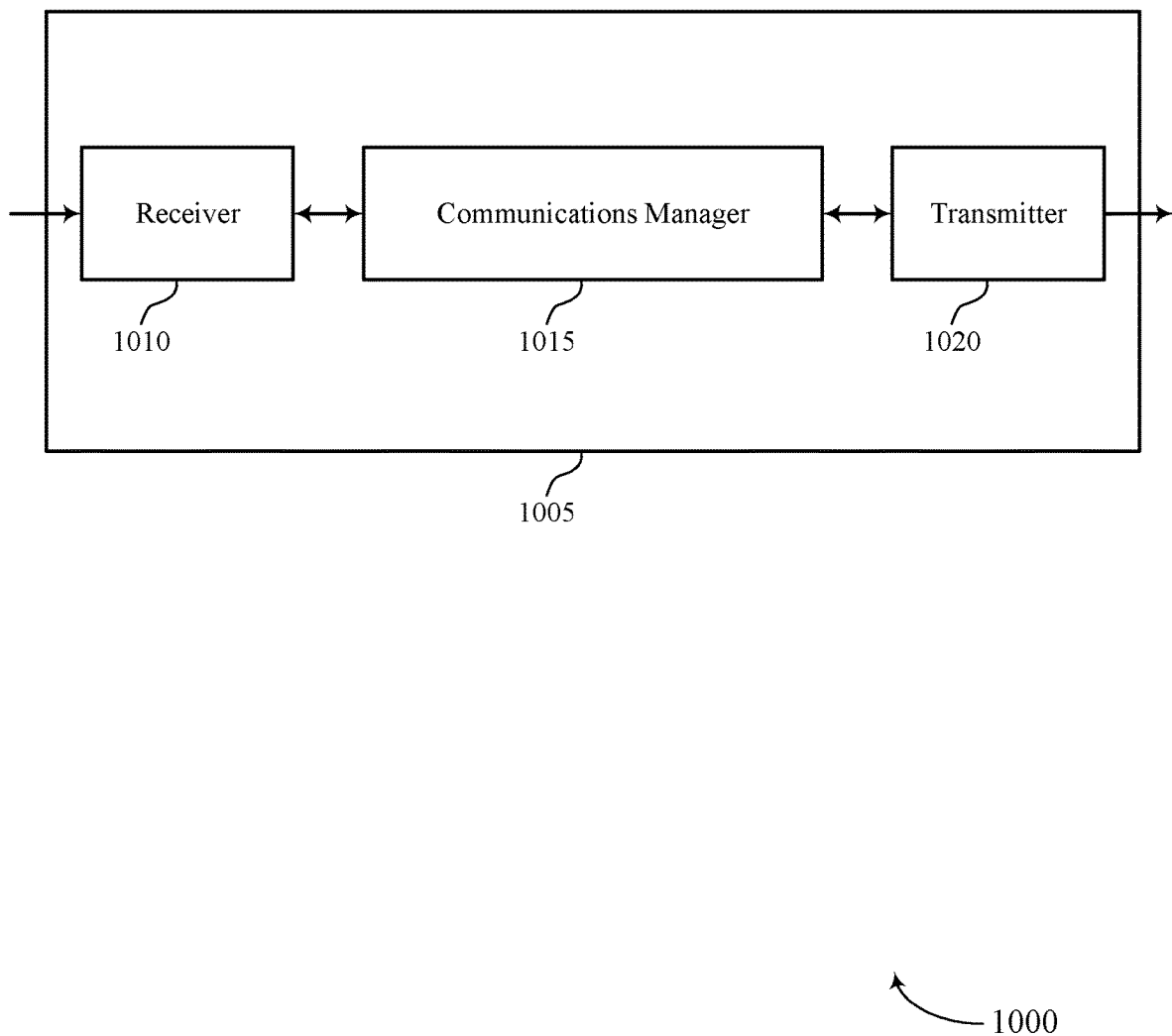
FIGS. 10 and 11 show block diagrams of devices that support techniques for quality of service support in sidelink communications in accordance with one or more aspects of the present disclosure.

FIG. 10 shows a block diagram 1000 of a device 1005 that supports techniques for QoS support in sidelink communications in accordance with one or more aspects of the present disclosure. The device 1005 may be an example of aspects of a network entity (e.g., a base station 105 or a network device as part of a core network 130) as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques for QoS support in sidelink communications, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive, from a first UE, a request including a relay service code associated with a first connection between the first UE and a second UE and an indication of a relay connection via the second UE, the relay connection including the first connection between the first UE and the second UE and a second connection between the second UE and the device 1005. The communications manager 1015 may transmit a configuration message based on a QoS configuration for the relay connection, the QoS configuration including a first configuration associated with a first interface of the first connection and a second configuration associated with a second interface of the first connection, and the configuration message including the first configuration, the second configuration, and the QoS configuration. The communications manager 1015 may communicate with the first UE via the relay connection based on the QoS configuration.

The communications manager 1015 as described herein may be implemented to realize one or more potential improvements. One implementation may allow the device 1005 to save power by communicating with a UE 115 (as shown in FIG. 1) more efficiently. For example, the device 1005 may improve reliability in communications with a UE 115, as the device 1005 may be able to indicate to the UE 115 an end-to-end QoS configuration for the relay connection and communicate with the UE 115 accordingly. Additionally, the device 1005 may be able to identify when a QoS configuration is applied at the UE 115 and adjust communications accordingly. The communications manager 1015 may be an example of aspects of the communications manager 1310 described herein.

The communications manager 1015 may be an example of means for performing various aspects of QoS support in sidelink communications as described herein. The communications manager 1015, or its sub-components, may be implemented in hardware (e.g., in communications management circuitry). The circuitry may comprise of processor, DSP, an ASIC, an FPGA or other programmable logic device, discrete gate or transistor logic, discrete hardware components, or any combination thereof designed to perform the functions described in the present disclosure.

In another implementation, the communications manager 1015, or its sub-components, may be implemented in code (e.g., as communications management software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device.

In some examples, the communication manager 1015 may be configured to perform various operations (e.g., receiving, determining, transmitting) using or otherwise in cooperation with the receiver 1010, the transmitter 1020, or both.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
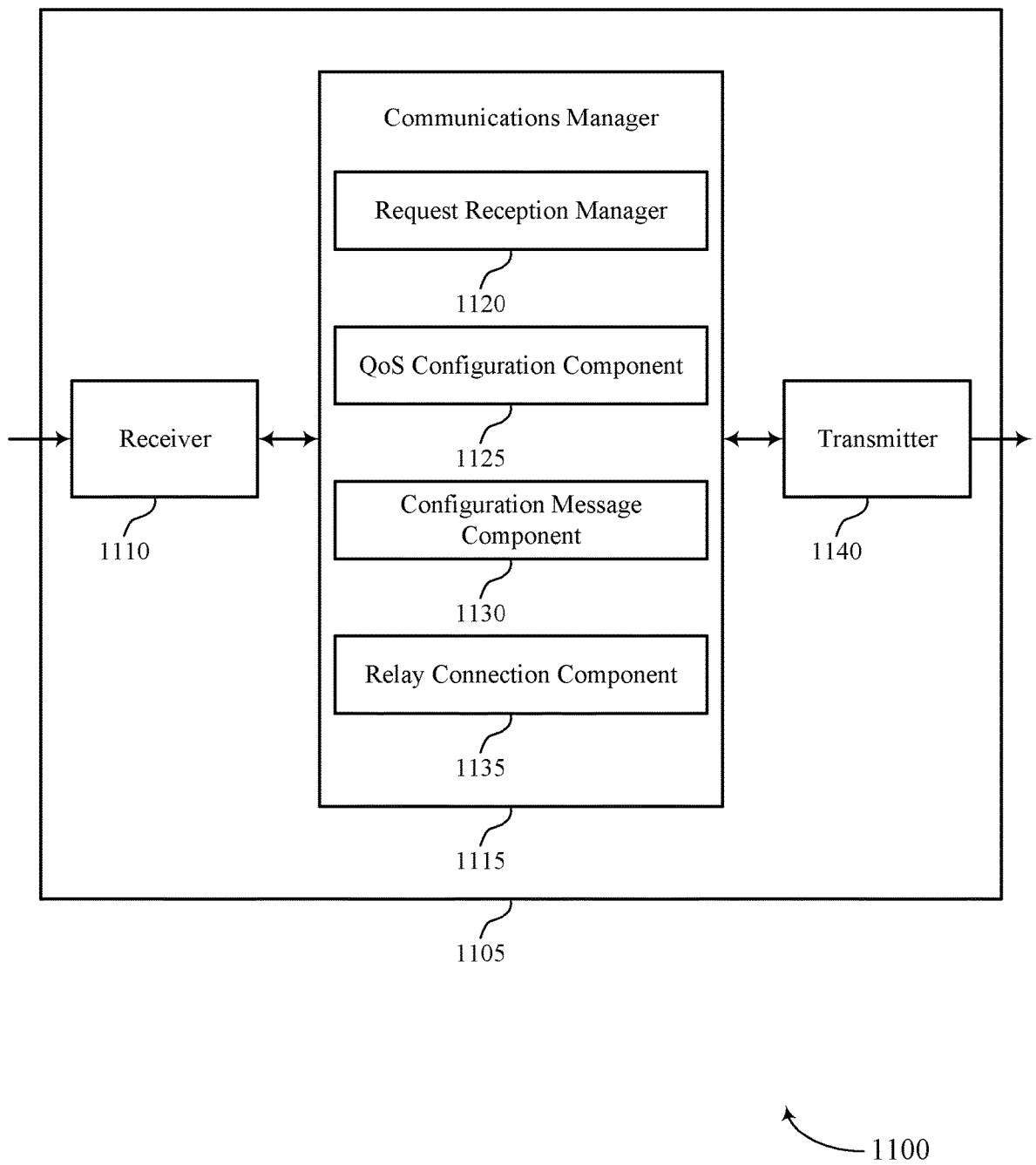

FIG. 11 shows a block diagram 1100 of a device 1105 that supports techniques for QoS support in sidelink communications in accordance with one or more aspects of the present disclosure. The device 1105 may be an example of aspects of a device 1005, or a network entity (e.g., a base station 105 or a network device as part of a core network 130) as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to techniques for QoS support in sidelink communications, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a request reception manager 1120, a QoS configuration component 1125, a configuration message component 1130, and a relay connection component 1135. The communications manager 1115 may be an example of aspects of the communications manager 1310 described herein.

The request reception manager 1120 may receive, from a first UE, a request including a relay service code associated with a first connection between the first UE and a second UE and an indication of a relay connection via the second UE, the relay connection including the first connection between the first UE and the second UE and a second connection between the second UE and the device 1105.

In some examples, the QoS configuration component 1125 may determine a QoS configuration for the relay connection, the QoS configuration including a first configuration associated with a first interface of the first connection and a second configuration associated with a second interface of the first connection.

The configuration message component 1130 may transmit a configuration message based on the QoS configuration for the relay connection, the QoS configuration including a first configuration associated with a first interface of the first connection and a second configuration associated with a second interface of the first connection, and the configuration message including the first configuration, the second configuration, and the QoS configuration.

In some examples, the configuration message may be transmitted to the first UE and the second UE, and the configuration message may configure one or more entities corresponding to one or more layers of the first connection or the second connection of the relay connection.

The relay connection component 1135 may communicate with the first UE via the relay connection based on the QoS configuration.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
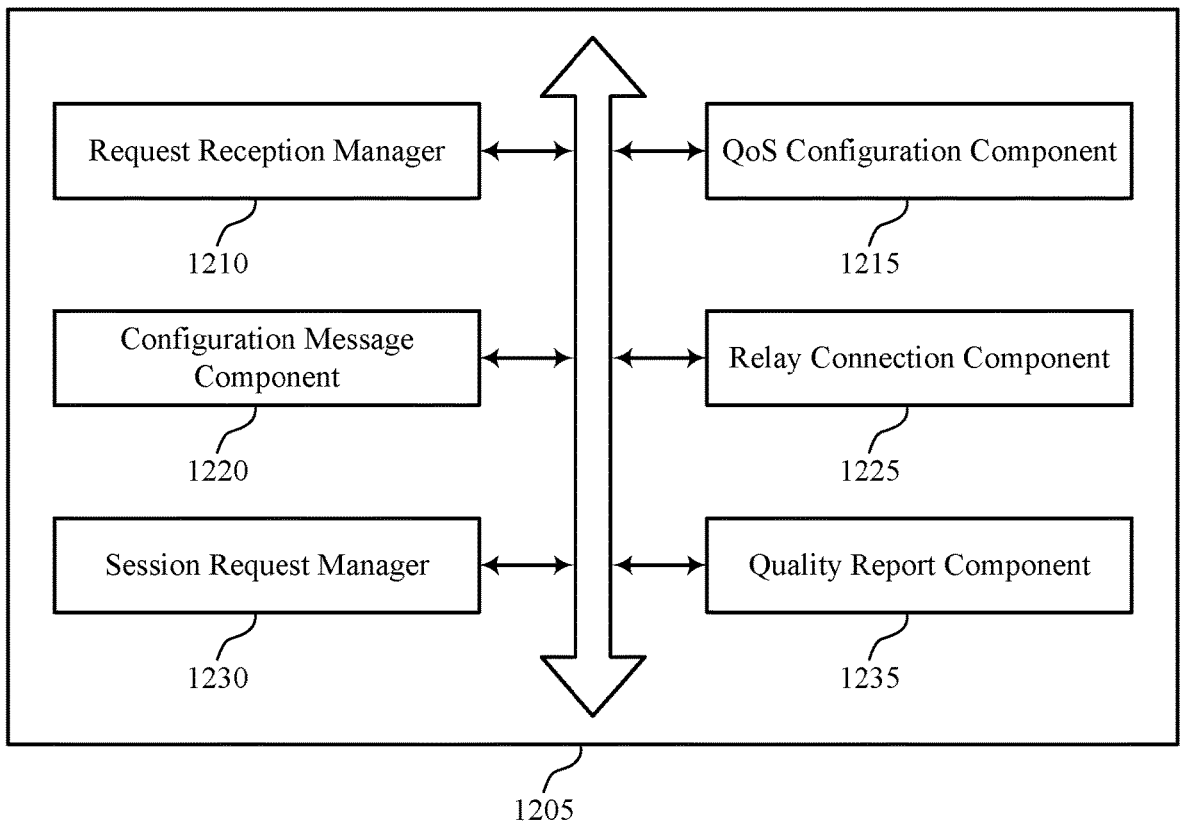
FIG. 12 shows a block diagram of a communications manager that supports techniques for quality of service support in sidelink communications in accordance with one or more aspects of the present disclosure.

FIG. 12 shows a block diagram 1200 of a communications manager 1205 that supports techniques for QoS support in sidelink communications in accordance with one or more aspects of the present disclosure. The communications manager 1205 may be an example of aspects of a communications manager 1015, a communications manager 1115, or a communications manager 1310 described herein. The communications manager 1205 may include a request reception manager 1210, a QoS configuration component 1215, a configuration message component 1220, a relay connection component 1225, a session request manager 1230, and a quality report component 1235. Each of these modules may communicate, directly or indirectly, with one another (e.g., via one or more buses).

The request reception manager 1210 may receive, from a first UE, a request including a relay service code associated with a first connection between the first UE and a second UE and an indication of a relay connection via the second UE, the relay connection including the first connection between the first UE and the second UE and a second connection between the second UE and the network entity. In some examples, the request reception manager 1210 may receive a registration message including a second indication of a non access stratum connection. In some examples, the request reception manager 1210 may determine that the first UE is registered via the relay connection based on the registration message. In some examples, the request reception manager 1210 may establish the non access stratum connection via the relay connection based on the determining, where receiving the request is based on establishing the non access stratum connection. In some cases, the request includes a PDU session establishment request or a PDU session modification request.

The QoS configuration component 1215 may determine a QoS configuration for the relay connection, the QoS configuration including a first configuration associated with a first interface of the first connection and a second configuration associated with a second interface of the first connection. In some examples, the QoS configuration component 1215 may update the QoS configuration for the relay connection, the updated QoS configuration including a third configuration associated with the first connection. In some cases, the first interface includes a PC5 interface. In some cases, the second interface includes a Uu interface.

The configuration message component 1220 may transmit a configuration message based on a QoS configuration for the relay connection, the QoS configuration including a first configuration associated with a first interface of the first connection and a second configuration associated with a second interface of the first connection, and the configuration message including the first configuration, the second configuration, and the QoS configuration. In some examples, the configuration message component 1220 may transmit a second configuration message based on updating the QoS configuration, the second configuration message including the third configuration, where communicating with the first UE is based on the updated QoS configuration. In some examples, the configuration message component 1220 may transmit signaling to the second UE, the signaling including a first activation of the third configuration associated with the first connection, a second activation of a fourth configuration associated with the second connection, and forwarding instructions associated with the first activation. In some cases, the second configuration message further includes a timer associated with an activation of the third configuration. In some cases, the configuration message includes an RRC reconfiguration message.

The relay connection component 1225 may communicate with the first UE via the relay connection based on the QoS configuration.

The session request manager 1230 may transmit one or more messages to an AMF based on receiving the request. In some examples, the session request manager 1230 may receive a session request from the AMF in response to transmitting the messages, where determining the QoS configuration for the relay connection is based on the session request.

The quality report component 1235 may receive a quality report associated with the first connection, the quality report including a first identifier associated with the first interface and a second identifier associated with the second interface. In some cases, the quality report further includes an indication of a change in one or more parameters of the first connection. In some cases, the quality report is received periodically.

In some cases, the quality report is received via the relay connection. In some cases, the quality report is received in a sidelink UE assistance information message. In some cases, the quality report is received in a message associated with the first interface or the second interface. In some cases, the first identifier associated with the first interface includes a PC5 LCID. In some cases, the second identifier associated with the second interface includes a Uu DRB identifier.

Figure 13:
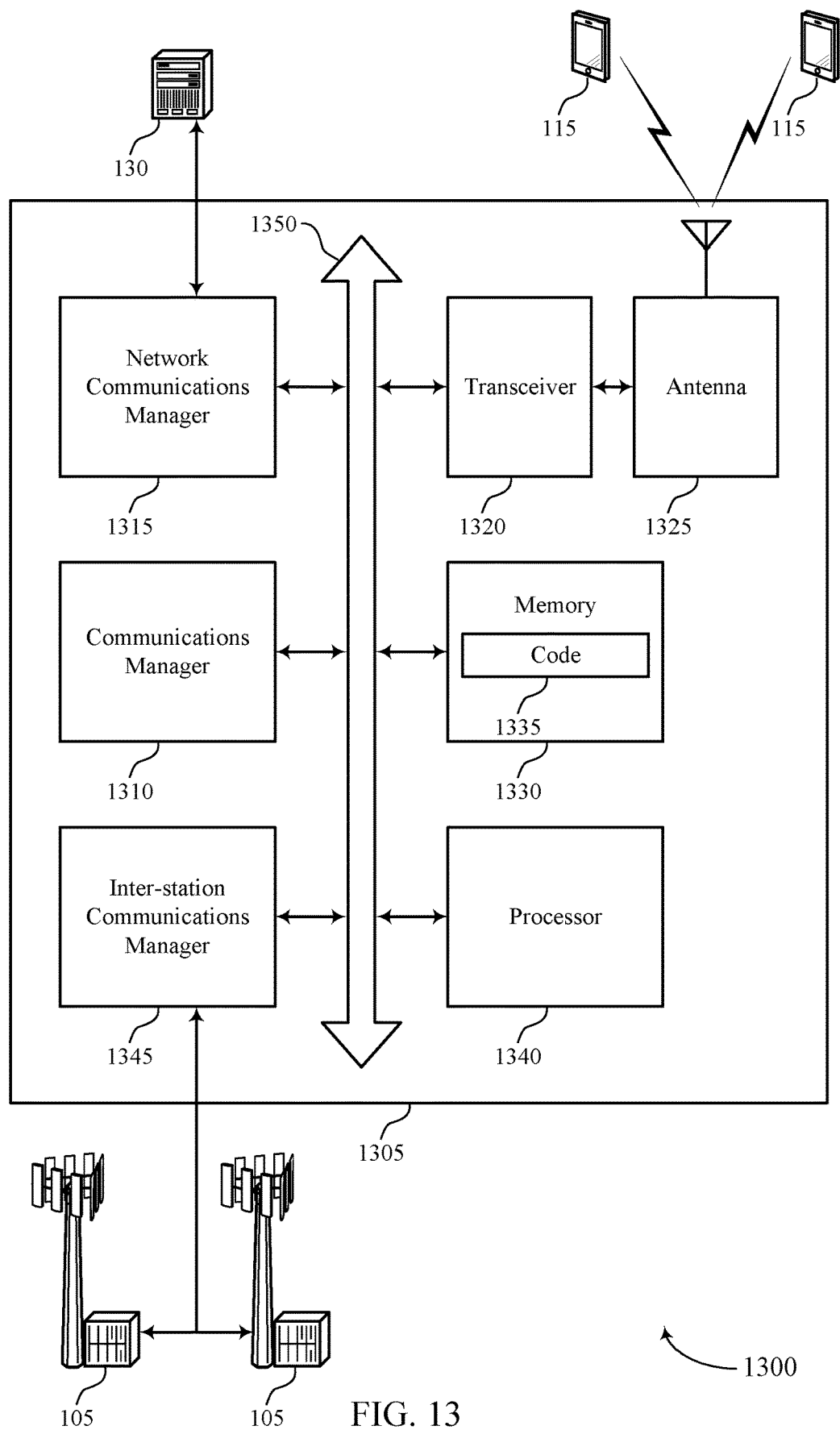
FIG. 13 shows a diagram of a system including a device that supports techniques for quality of service support in sidelink communications in accordance with one or more aspects of the present disclosure.

FIG. 13 shows a diagram of a system 1300 including a device 1305 that supports techniques for QoS support in sidelink communications in accordance with one or more aspects of the present disclosure. The device 1305 may be an example of or include the components of device 1005, device 1105, or a network entity (e.g., a base station 105 or a network device as part of a core network 130) as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may receive, from a first UE, a request including a relay service code associated with a first connection between the first UE and a second UE and an indication of a relay connection via the second UE, the relay connection including the first connection between the first UE and the second UE and a second connection between the second UE and the device 1305. The communications manager 1310 may transmit a configuration message based on a QoS configuration for the relay connection, the QoS configuration including a first configuration associated with a first interface of the first connection and a second configuration associated with a second interface of the first connection, and the configuration message including the first configuration, the second configuration, and the QoS configuration. The communications manager 1310 may communicate with the first UE via the relay connection based on the QoS configuration.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting techniques for QoS support in sidelink communications).

The inter-station communications manager 1345 may manage communications with other network entities or base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
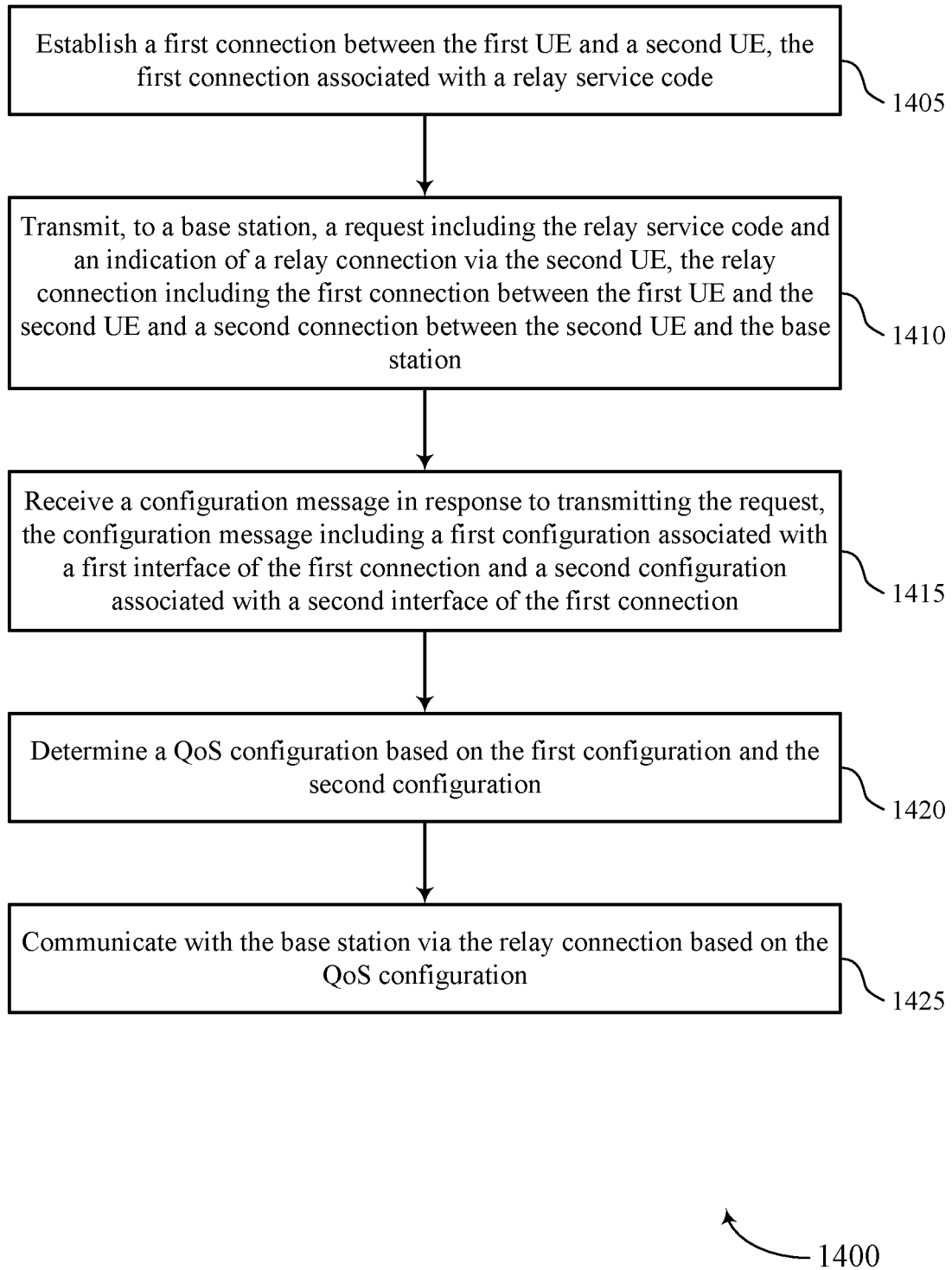
FIGS. 14 through 25 show flowcharts illustrating methods that support techniques for quality of service support in sidelink communications in accordance with one or more aspects of the present disclosure.

FIG. 14 shows a flowchart illustrating a method 1400 that supports techniques for QoS support in sidelink communications in accordance with one or more aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may establish a first connection between the first UE and a second UE, the first connection associated with a relay service code. The operations of 1405 may be performed according to the methods described herein. In some examples, aspects of the operations of 1405 may be performed by a sidelink connection manager as described with reference to FIGS. 6 through 9.

At 1410, the UE may transmit, to a base station, a request including the relay service code and an indication of a relay connection via the second UE, the relay connection including the first connection between the first UE and the second UE and a second connection between the second UE and the base station. The operations of 1410 may be performed according to the methods described herein. In some examples, aspects of the operations of 1410 may be performed by a request manager as described with reference to FIGS. 6 through 9.

At 1415, the UE may receive a configuration message in response to transmitting the request, the configuration message including a first configuration associated with a first interface of the first connection and a second configuration associated with a second interface of the first connection. The operations of 1415 may be performed according to the methods described herein. In some examples, aspects of the operations of 1415 may be performed by a configuration message manager as described with reference to FIGS. 6 through 9.

At 1420, the UE may determine a QoS configuration based on the first configuration and the second configuration. The operations of 1420 may be performed according to the methods described herein. In some examples, aspects of the operations of 1420 may be performed by a QoS configuration manager as described with reference to FIGS. 6 through 9.

At 1425, the UE may communicate with the base station via the relay connection based on the QoS configuration. The operations of 1425 may be performed according to the methods described herein. In some examples, aspects of the operations of 1425 may be performed by a relay connection manager as described with reference to FIGS. 6 through 9.

Figure 15:
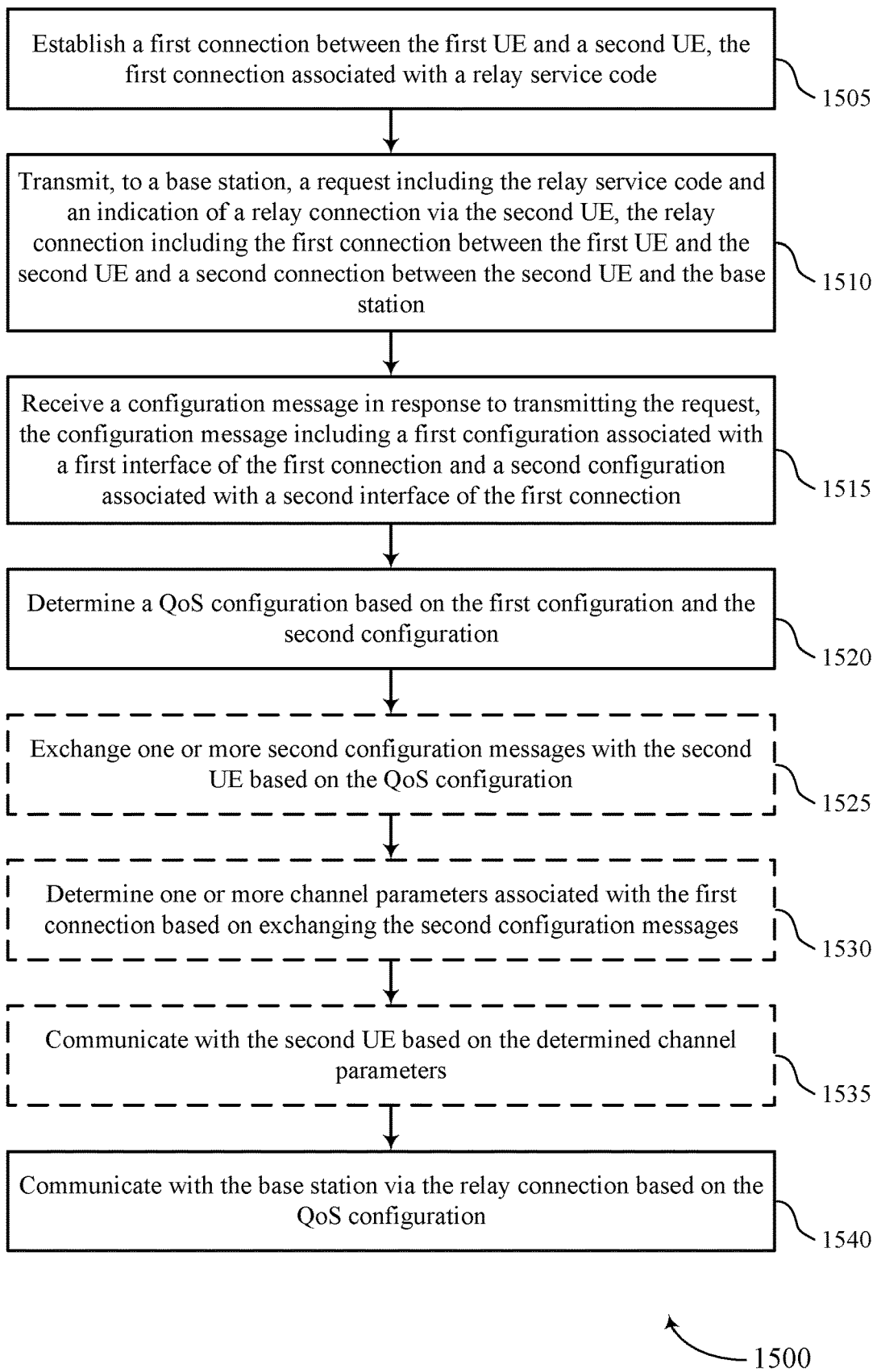

FIG. 15 shows a flowchart illustrating a method 1500 that supports techniques for QoS support in sidelink communications in accordance with one or more aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may establish a first connection between the first UE and a second UE, the first connection associated with a relay service code. The operations of 1505 may be performed according to the methods described herein. In some examples, aspects of the operations of 1505 may be performed by a sidelink connection manager as described with reference to FIGS. 6 through 9.

At 1510, the UE may transmit, to a base station, a request including the relay service code and an indication of a relay connection via the second UE, the relay connection including the first connection between the first UE and the second UE and a second connection between the second UE and the base station. The operations of 1510 may be performed according to the methods described herein. In some examples, aspects of the operations of 1510 may be performed by a request manager as described with reference to FIGS. 6 through 9.

At 1515, the UE may receive a configuration message in response to transmitting the request, the configuration message including a first configuration associated with a first interface of the first connection and a second configuration associated with a second interface of the first connection. The operations of 1515 may be performed according to the methods described herein. In some examples, aspects of the operations of 1515 may be performed by a configuration message manager as described with reference to FIGS. 6 through 9.

At 1520, the UE may determine a QoS configuration based on the first configuration and the second configuration. The operations of 1520 may be performed according to the methods described herein. In some examples, aspects of the operations of 1520 may be performed by a QoS configuration manager as described with reference to FIGS. 6 through 9.

At 1525, the UE may exchange one or more second configuration messages with the second UE based on the QoS configuration. The operations of 1525 may be performed according to the methods described herein. In some examples, aspects of the operations of 1525 may be performed by a sidelink connection manager as described with reference to FIGS. 6 through 9.

At 1530, the UE may determine one or more channel parameters associated with the first connection based on exchanging the second configuration messages. The operations of 1530 may be performed according to the methods described herein. In some examples, aspects of the operations of 1530 may be performed by a sidelink connection manager as described with reference to FIGS. 6 through 9.

At 1535, the UE may communicate with the second UE based on the determined channel parameters. The operations of 1535 may be performed according to the methods described herein. In some examples, aspects of the operations of 1535 may be performed by a sidelink connection manager as described with reference to FIGS. 6 through 9.

At 1540, the UE may communicate with the base station via the relay connection based on the QoS configuration. The operations of 1540 may be performed according to the methods described herein. In some examples, aspects of the operations of 1540 may be performed by a relay connection manager as described with reference to FIGS. 6 through 9.

Figure 16:
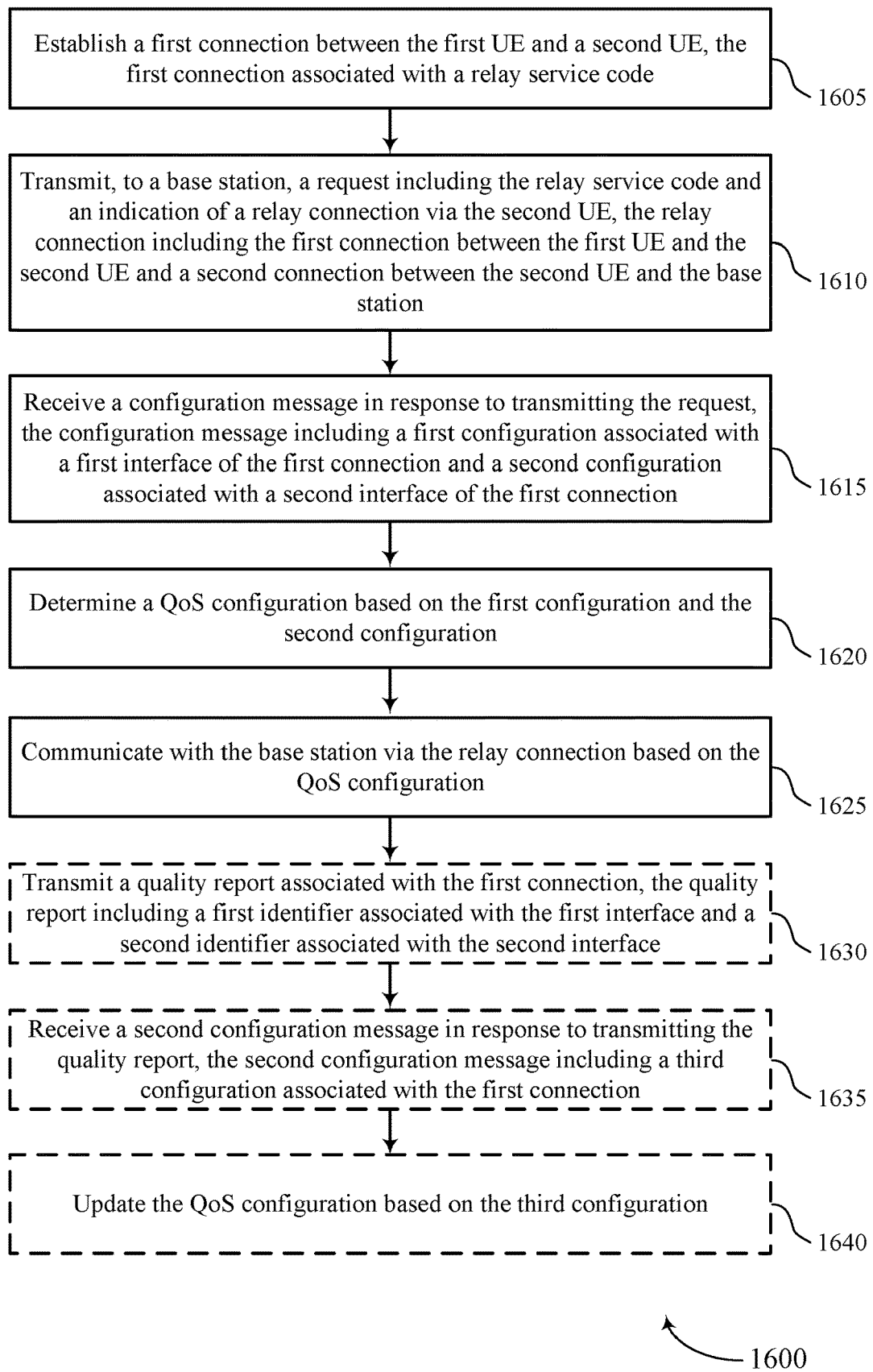

FIG. 16 shows a flowchart illustrating a method 1600 that supports techniques for QoS support in sidelink communications in accordance with one or more aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may establish a first connection between the first UE and a second UE, the first connection associated with a relay service code. The operations of 1605 may be performed according to the methods described herein. In some examples, aspects of the operations of 1605 may be performed by a sidelink connection manager as described with reference to FIGS. 6 through 9.

At 1610, the UE may transmit, to a base station, a request including the relay service code and an indication of a relay connection via the second UE, the relay connection including the first connection between the first UE and the second UE and a second connection between the second UE and the base station. The operations of 1610 may be performed according to the methods described herein. In some examples, aspects of the operations of 1610 may be performed by a request manager as described with reference to FIGS. 6 through 9.

At 1615, the UE may receive a configuration message in response to transmitting the request, the configuration message including a first configuration associated with a first interface of the first connection and a second configuration associated with a second interface of the first connection. The operations of 1615 may be performed according to the methods described herein. In some examples, aspects of the operations of 1615 may be performed by a configuration message manager as described with reference to FIGS. 6 through 9.

At 1620, the UE may determine a QoS configuration based on the first configuration and the second configuration. The operations of 1620 may be performed according to the methods described herein. In some examples, aspects of the operations of 1620 may be performed by a QoS configuration manager as described with reference to FIGS. 6 through 9.

At 1625, the UE may communicate with the base station via the relay connection based on the QoS configuration. The operations of 1625 may be performed according to the methods described herein. In some examples, aspects of the operations of 1625 may be performed by a relay connection manager as described with reference to FIGS. 6 through 9.

At 1630, the UE may transmit a quality report associated with the first connection, the quality report including a first identifier associated with the first interface and a second identifier associated with the second interface. The operations of 1630 may be performed according to the methods described herein. In some examples, aspects of the operations of 1630 may be performed by a quality report manager as described with reference to FIGS. 6 through 9.

At 1635, the UE may receive a second configuration message in response to transmitting the quality report, the second configuration message including a third configuration associated with the first connection. The operations of 1635 may be performed according to the methods described herein. In some examples, aspects of the operations of 1635 may be performed by a configuration message manager as described with reference to FIGS. 6 through 9.

At 1640, the UE may update the QoS configuration based on the third configuration. The operations of 1640 may be performed according to the methods described herein. In some examples, aspects of the operations of 1640 may be performed by a QoS configuration manager as described with reference to FIGS. 6 through 9.

Figure 17:
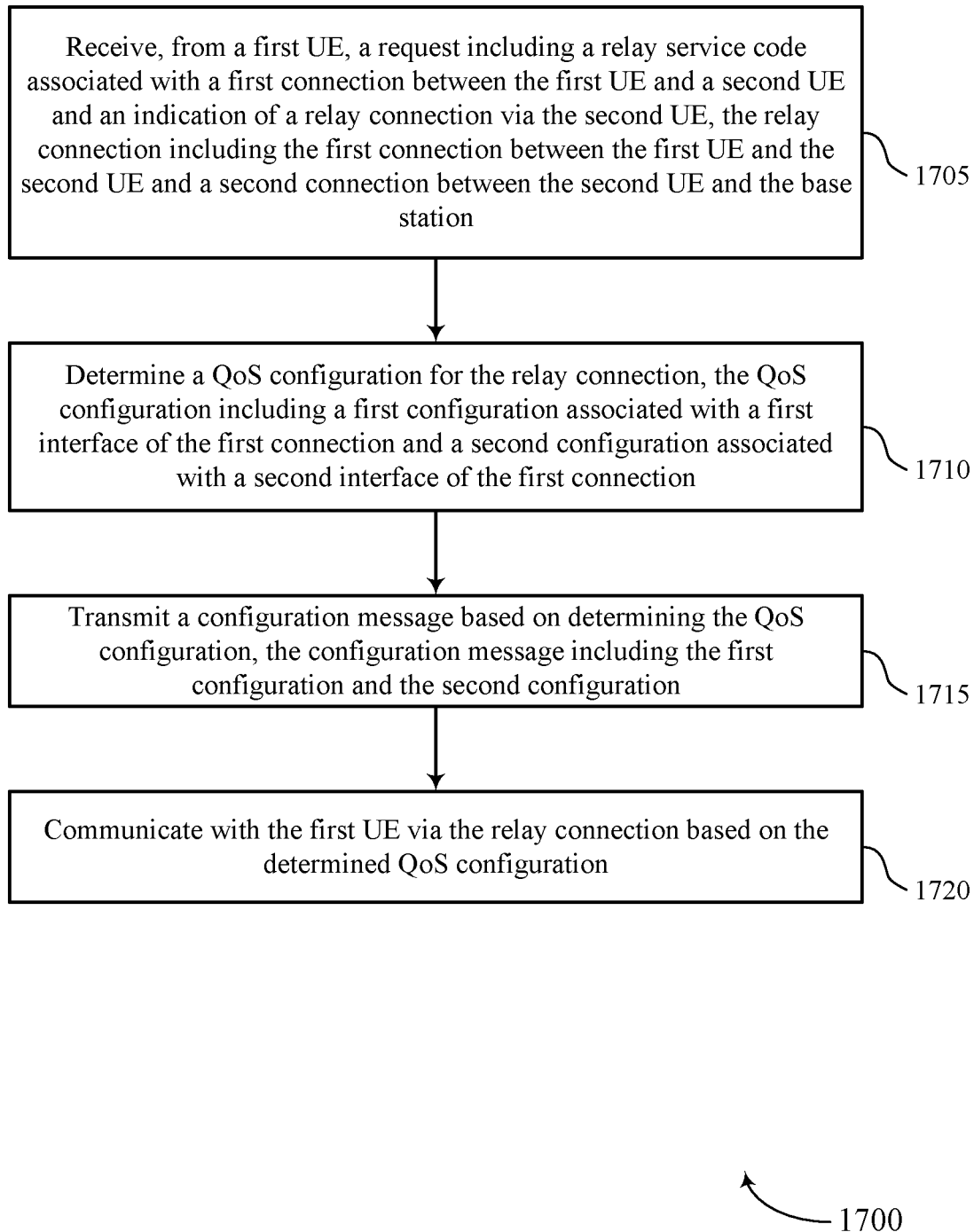

FIG. 17 shows a flowchart illustrating a method 1700 that supports techniques for QoS support in sidelink communications in accordance with one or more aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may receive, from a first UE, a request including a relay service code associated with a first connection between the first UE and a second UE and an indication of a relay connection via the second UE, the relay connection including the first connection between the first UE and the second UE and a second connection between the second UE and the base station. The operations of 1705 may be performed according to the methods described herein. In some examples, aspects of the operations of 1705 may be performed by a request reception manager as described with reference to FIGS. 10 through 13.

At 1710, the base station may determine a QoS configuration for the relay connection, the QoS configuration including a first configuration associated with a first interface of the first connection and a second configuration associated with a second interface of the first connection. The operations of 1710 may be performed according to the methods described herein. In some examples, aspects of the operations of 1710 may be performed by a QoS configuration component as described with reference to FIGS. 10 through 13.

At 1715, the base station may transmit a configuration message based on determining the QoS configuration, the configuration message including the first configuration and the second configuration. The operations of 1715 may be performed according to the methods described herein. In some examples, aspects of the operations of 1715 may be performed by a configuration message component as described with reference to FIGS. 10 through 13.

At 1720, the base station may communicate with the first UE via the relay connection based on the determined QoS configuration. The operations of 1720 may be performed according to the methods described herein. In some examples, aspects of the operations of 1720 may be performed by a relay connection component as described with reference to FIGS. 10 through 13.

Figure 18:
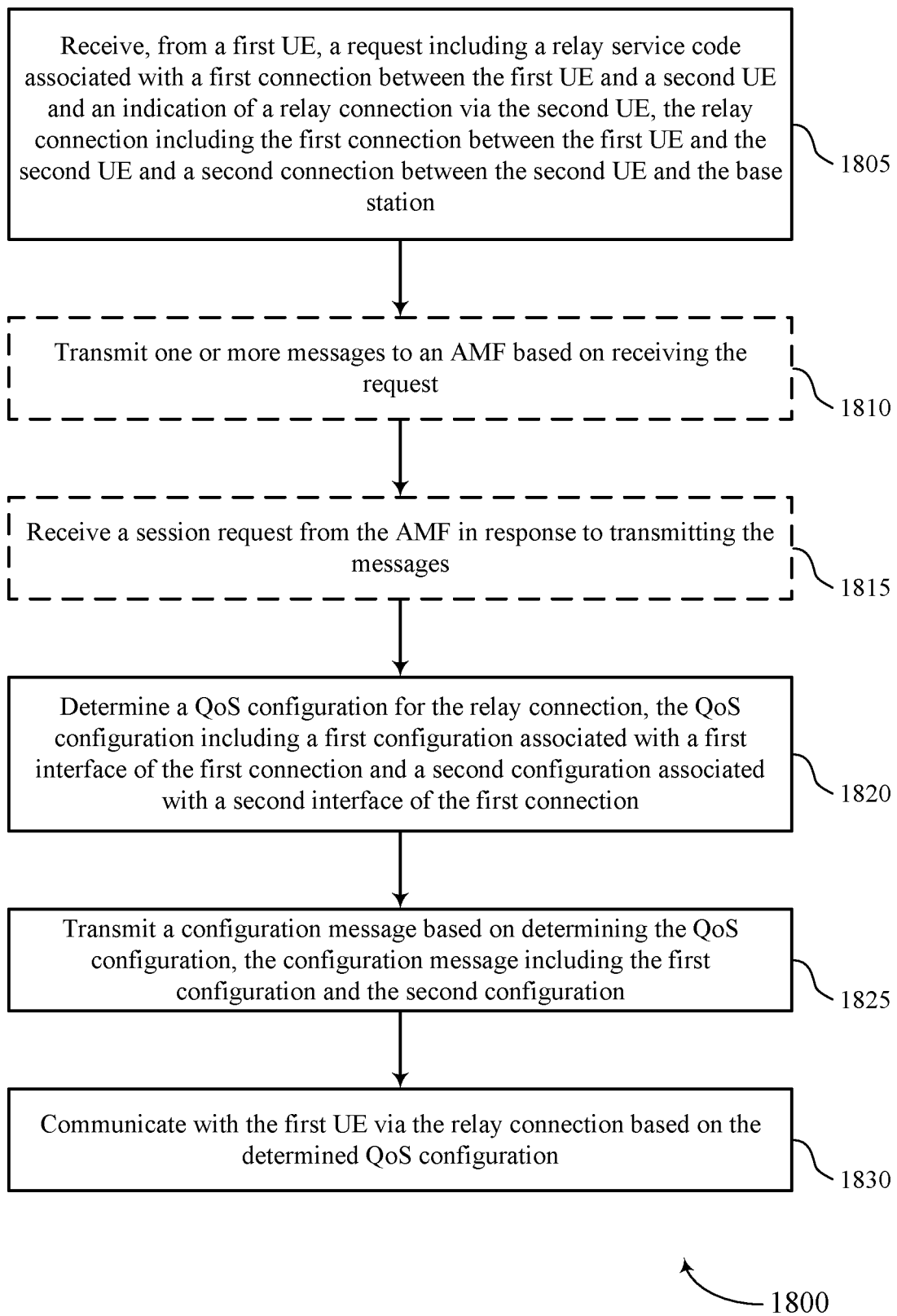

FIG. 18 shows a flowchart illustrating a method 1800 that supports techniques for QoS support in sidelink communications in accordance with one or more aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may receive, from a first UE, a request including a relay service code associated with a first connection between the first UE and a second UE and an indication of a relay connection via the second UE, the relay connection including the first connection between the first UE and the second UE and a second connection between the second UE and the base station. The operations of 1805 may be performed according to the methods described herein. In some examples, aspects of the operations of 1805 may be performed by a request reception manager as described with reference to FIGS. 10 through 13.

At 1810, the base station may transmit one or more messages to an AMF based on receiving the request. The operations of 1810 may be performed according to the methods described herein. In some examples, aspects of the operations of 1810 may be performed by a session request manager as described with reference to FIGS. 10 through 13.

At 1815, the base station may receive a session request from the AMF in response to transmitting the messages. The operations of 1815 may be performed according to the methods described herein. In some examples, aspects of the operations of 1815 may be performed by a session request manager as described with reference to FIGS. 10 through 13.

At 1820, the base station may determine a QoS configuration for the relay connection, the QoS configuration including a first configuration associated with a first interface of the first connection and a second configuration associated with a second interface of the first connection. The operations of 1820 may be performed according to the methods described herein. In some examples, aspects of the operations of 1820 may be performed by a QoS configuration component as described with reference to FIGS. 10 through 13.

At 1825, the base station may transmit a configuration message based on determining the QoS configuration, the configuration message including the first configuration and the second configuration. The operations of 1825 may be performed according to the methods described herein. In some examples, aspects of the operations of 1825 may be performed by a configuration message component as described with reference to FIGS. 10 through 13.

At 1830, the base station may communicate with the first UE via the relay connection based on the determined QoS configuration. The operations of 1830 may be performed according to the methods described herein. In some examples, aspects of the operations of 1830 may be performed by a relay connection component as described with reference to FIGS. 10 through 13.

Figure 19:
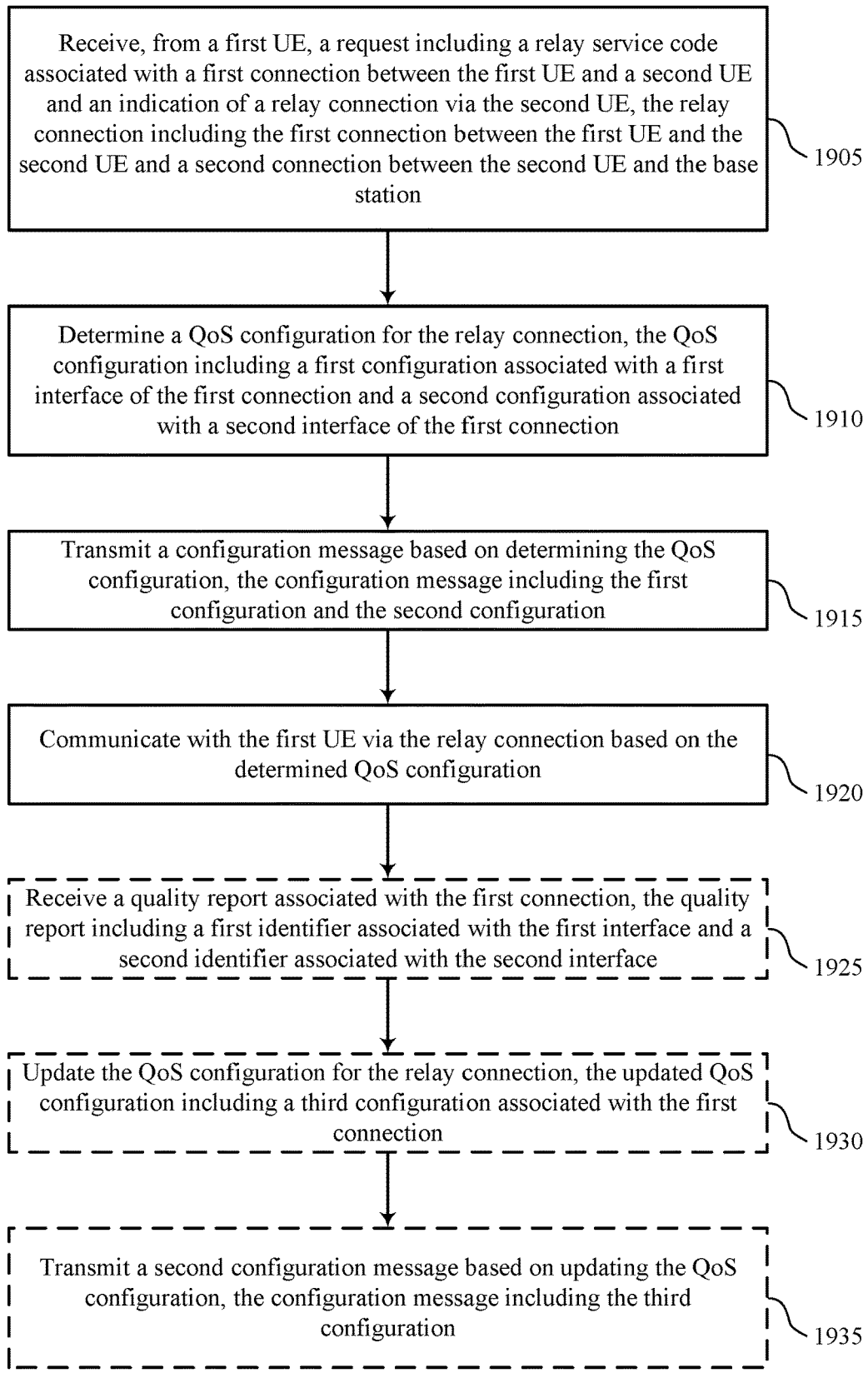

FIG. 19 shows a flowchart illustrating a method 1900 that supports techniques for QoS support in sidelink communications in accordance with one or more aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may receive, from a first UE, a request including a relay service code associated with a first connection between the first UE and a second UE and an indication of a relay connection via the second UE, the relay connection including the first connection between the first UE and the second UE and a second connection between the second UE and the base station. The operations of 1905 may be performed according to the methods described herein. In some examples, aspects of the operations of 1905 may be performed by a request reception manager as described with reference to FIGS. 10 through 13.

At 1910, the base station may determine a QoS configuration for the relay connection, the QoS configuration including a first configuration associated with a first interface of the first connection and a second configuration associated with a second interface of the first connection. The operations of 1910 may be performed according to the methods described herein. In some examples, aspects of the operations of 1910 may be performed by a QoS configuration component as described with reference to FIGS. 10 through 13.

At 1915, the base station may transmit a configuration message based on determining the QoS configuration, the configuration message including the first configuration and the second configuration. The operations of 1915 may be performed according to the methods described herein. In some examples, aspects of the operations of 1915 may be performed by a configuration message component as described with reference to FIGS. 10 through 13.

At 1920, the base station may communicate with the first UE via the relay connection based on the determined QoS configuration. The operations of 1920 may be performed according to the methods described herein. In some examples, aspects of the operations of 1920 may be performed by a relay connection component as described with reference to FIGS. 10 through 13.

At 1925, the base station may receive a quality report associated with the first connection, the quality report including a first identifier associated with the first interface and a second identifier associated with the second interface. The operations of 1925 may be performed according to the methods described herein. In some examples, aspects of the operations of 1925 may be performed by a quality report component as described with reference to FIGS. 10 through 13.

At 1930, the base station may update the QoS configuration for the relay connection, the updated QoS configuration including a third configuration associated with the first connection. The operations of 1930 may be performed according to the methods described herein. In some examples, aspects of the operations of 1930 may be performed by a QoS configuration component as described with reference to FIGS. 10 through 13.

At 1935, the base station may transmit a second configuration message based on updating the QoS configuration, the configuration message including the third configuration. The operations of 1935 may be performed according to the methods described herein. In some examples, aspects of the operations of 1935 may be performed by a configuration message component as described with reference to FIGS. 10 through 13.

Figure 20:
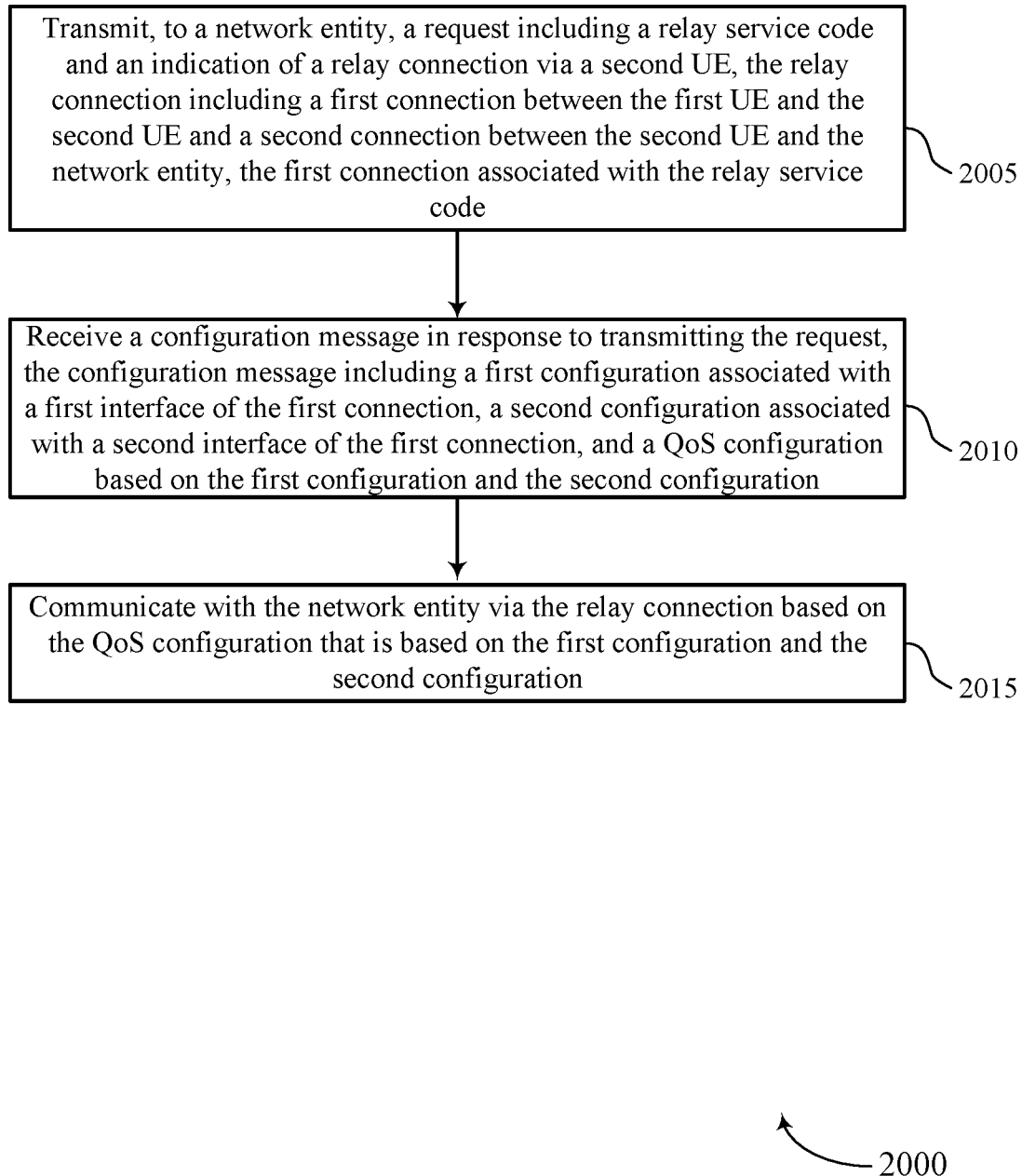

FIG. 20 shows a flowchart illustrating a method 2000 that supports techniques for QoS support in sidelink communications in accordance with one or more aspects of the present disclosure. The operations of method 2000 may be implemented by a UE 115 or its components as described herein. For example, the operations of method 2000 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 2005, the UE may transmit, to a network entity, a request including a relay service code and an indication of a relay connection via a second UE, the relay connection including a first connection between the first UE and the second UE and a second connection between the second UE and the network entity, the first connection associated with the relay service code. The operations of 2005 may be performed according to the methods described herein. In some examples, aspects of the operations of 2005 may be performed by a request manager as described with reference to FIGS. 6 through 9.

At 2010, the UE may receive a configuration message in response to transmitting the request, the configuration message including a first configuration associated with a first interface of the first connection, a second configuration associated with a second interface of the first connection, and a QoS configuration based on the first configuration and the second configuration. The operations of 2010 may be performed according to the methods described herein. In some examples, aspects of the operations of 2010 may be performed by a configuration message manager as described with reference to FIGS. 6 through 9.

At 2015, the UE may communicate with the network entity via the relay connection based on the QoS configuration that is based on the first configuration and the second configuration. The operations of 2015 may be performed according to the methods described herein. In some examples, aspects of the operations of 2015 may be performed by a relay connection manager as described with reference to FIGS. 6 through 9.

Figure 21:
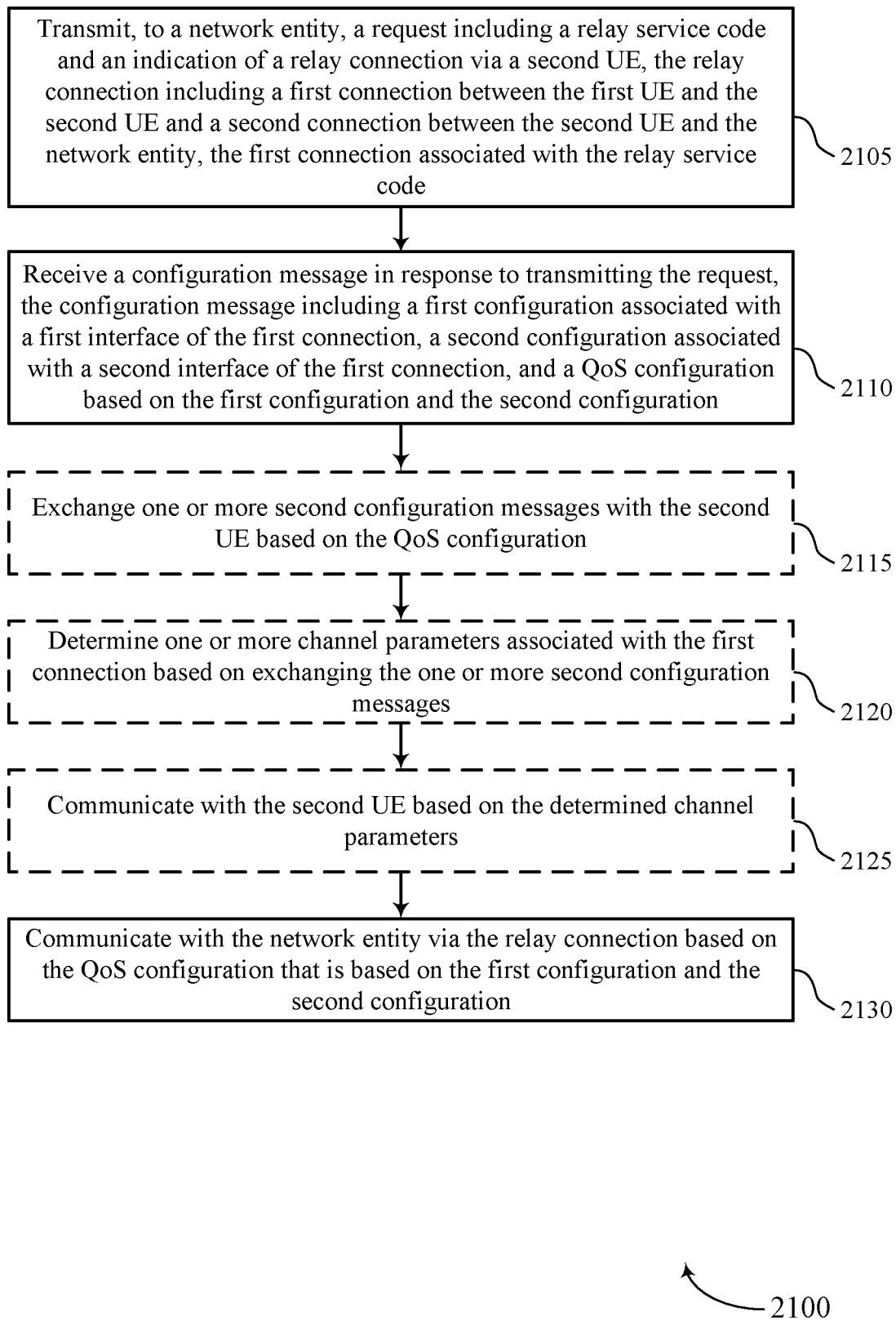

FIG. 21 shows a flowchart illustrating a method 2100 that supports techniques for QoS support in sidelink communications in accordance with one or more aspects of the present disclosure. The operations of method 2100 may be implemented by a UE 115 or its components as described herein. For example, the operations of method 2100 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 2105, the UE may transmit, to a network entity, a request including a relay service code and an indication of a relay connection via a second UE, the relay connection including a first connection between the first UE and the second UE and a second connection between the second UE and the network entity, the first connection associated with the relay service code. The operations of 2105 may be performed according to the methods described herein. In some examples, aspects of the operations of 2105 may be performed by a request manager as described with reference to FIGS. 6 through 9.

At 2110, the UE may receive a configuration message in response to transmitting the request, the configuration message including a first configuration associated with a first interface of the first connection, a second configuration associated with a second interface of the first connection, and a QoS configuration based on the first configuration and the second configuration. The operations of 2110 may be performed according to the methods described herein. In some examples, aspects of the operations of 2110 may be performed by a configuration message manager as described with reference to FIGS. 6 through 9.

At 2115, the UE may exchange one or more second configuration messages with the second UE based on the QoS configuration. The operations of 2115 may be performed according to the methods described herein. In some examples, aspects of the operations of 2115 may be performed by a sidelink connection manager as described with reference to FIGS. 6 through 9.

At 2120, the UE may determine one or more channel parameters associated with the first connection based on exchanging the one or more second configuration messages. The operations of 2120 may be performed according to the methods described herein. In some examples, aspects of the operations of 2120 may be performed by a sidelink connection manager as described with reference to FIGS. 6 through 9.

At 2125, the UE may communicate with the second UE based on the determined channel parameters. The operations of 2125 may be performed according to the methods described herein. In some examples, aspects of the operations of 2125 may be performed by a sidelink connection manager as described with reference to FIGS. 6 through 9.

At 2130, the UE may communicate with the network entity via the relay connection based on the QoS configuration. The operations of 2130 may be performed according to the methods described herein. In some examples, aspects of the operations of 2130 may be performed by a relay connection manager as described with reference to FIGS. 6 through 9.

Figure 22:
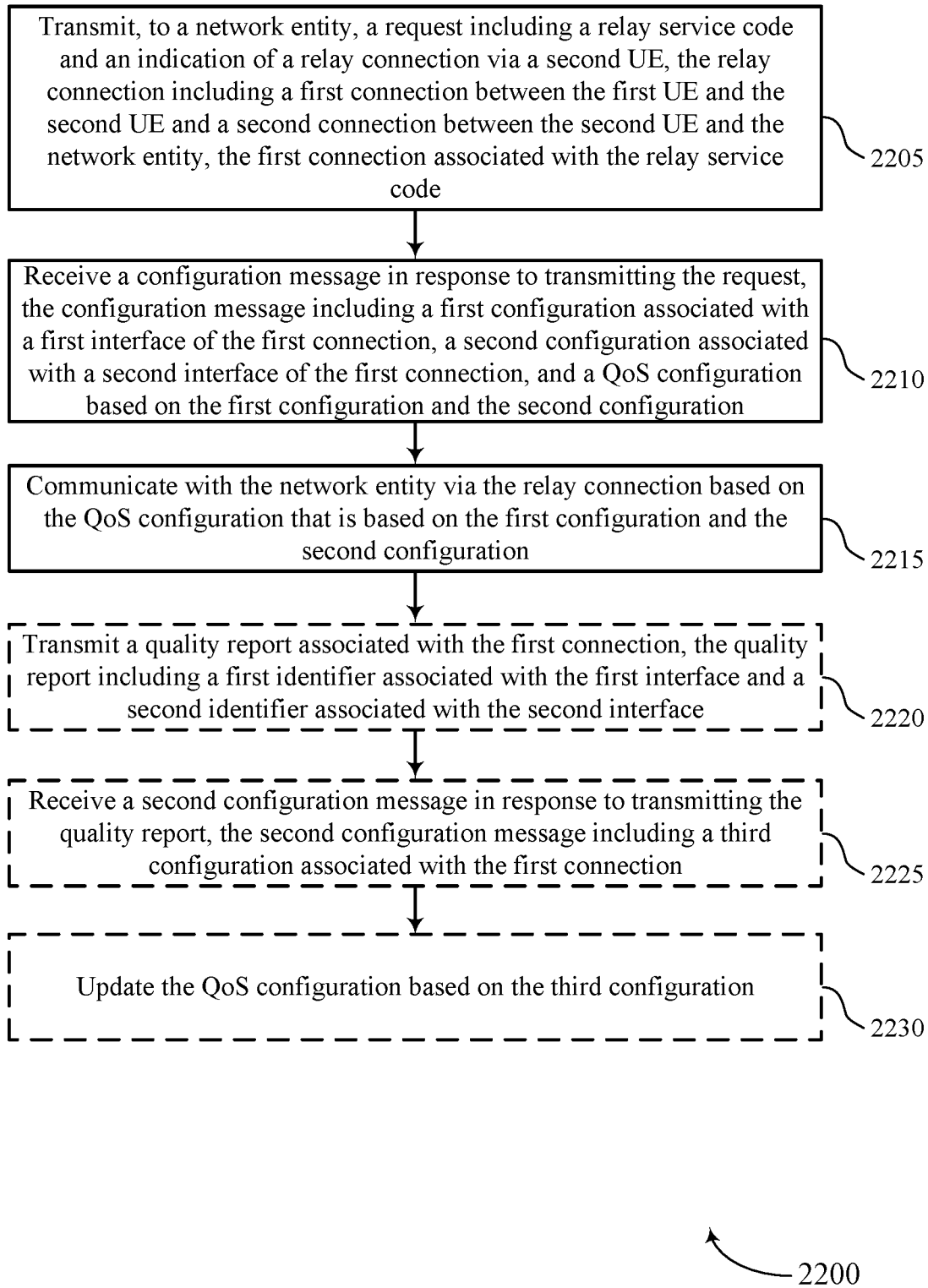

FIG. 22 shows a flowchart illustrating a method 2200 that supports techniques for QoS support in sidelink communications in accordance with one or more aspects of the present disclosure. The operations of method 2200 may be implemented by a UE 115 or its components as described herein. For example, the operations of method 2200 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 2205, the UE may transmit, to a network entity, a request including a relay service code and an indication of a relay connection via a second UE, the relay connection including a first connection between the first UE and the second UE and a second connection between the second UE and the network entity, the first connection associated with the relay service code. The operations of 2205 may be performed according to the methods described herein. In some examples, aspects of the operations of 2205 may be performed by a request manager as described with reference to FIGS. 6 through 9.

At 2210, the UE may receive a configuration message in response to transmitting the request, the configuration message including a first configuration associated with a first interface of the first connection, a second configuration associated with a second interface of the first connection, and a QoS configuration based on the first configuration and the second configuration. The operations of 2210 may be performed according to the methods described herein. In some examples, aspects of the operations of 2210 may be performed by a configuration message manager as described with reference to FIGS. 6 through 9.

At 2215, the UE may communicate with the network entity via the relay connection based on the QoS configuration that is based on the first configuration and the second configuration. The operations of 2215 may be performed according to the methods described herein. In some examples, aspects of the operations of 2215 may be performed by a relay connection manager as described with reference to FIGS. 6 through 9.

At 2220, the UE may transmit a quality report associated with the first connection, the quality report including a first identifier associated with the first interface and a second identifier associated with the second interface. The operations of 2220 may be performed according to the methods described herein. In some examples, aspects of the operations of 2220 may be performed by a quality report manager as described with reference to FIGS. 6 through 9.

At 2225, the UE may receive a second configuration message in response to transmitting the quality report, the second configuration message including a third configuration associated with the first connection. The operations of 2225 may be performed according to the methods described herein. In some examples, aspects of the operations of 2225 may be performed by a configuration message manager as described with reference to FIGS. 6 through 9.

At 2230, the UE may update the QoS configuration based on the third configuration. The operations of 2230 may be performed according to the methods described herein. In some examples, aspects of the operations of 2230 may be performed by a QoS configuration manager as described with reference to FIGS. 6 through 9.

Figure 23:
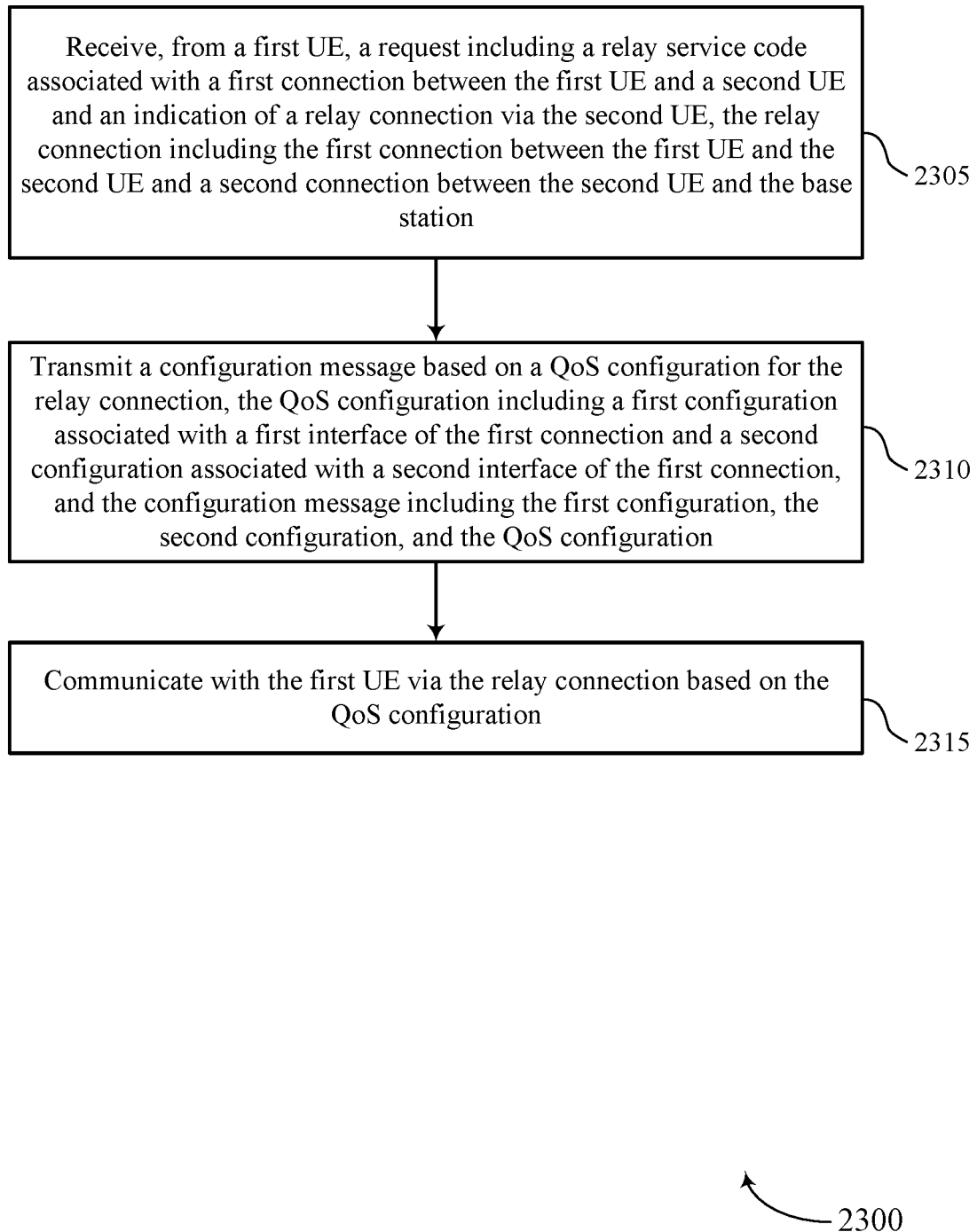

FIG. 23 shows a flowchart illustrating a method 2300 that supports techniques for QoS support in sidelink communications in accordance with one or more aspects of the present disclosure. The operations of method 2300 may be implemented by a network entity (e.g., a base station 105 or a network device as part of a core network 130) or its components as described herein. For example, the operations of method 2300 may be performed by a communications manager as described with reference to FIGS. 10 through 13. In some examples, a network entity may execute a set of instructions to control the functional elements of the network entity to perform the functions described below. Additionally or alternatively, a network entity may perform aspects of the functions described below using special-purpose hardware.

At 2305, the network entity may receive, from a first UE, a request including a relay service code associated with a first connection between the first UE and a second UE and an indication of a relay connection via the second UE, the relay connection including the first connection between the first UE and the second UE and a second connection between the second UE and the network entity. The operations of 2305 may be performed according to the methods described herein. In some examples, aspects of the operations of 2305 may be performed by a request reception manager as described with reference to FIGS. 10 through 13.

At 2310, the network entity may transmit a configuration message based on a QoS configuration for the relay connection, the QoS configuration including a first configuration associated with a first interface of the first connection and a second configuration associated with a second interface of the first connection, and the configuration message including the first configuration, the second configuration, and the QoS configuration. The operations of 2310 may be performed according to the methods described herein. In some examples, aspects of the operations of 2310 may be performed by a configuration message component as described with reference to FIGS. 10 through 13.

At 2315, the network entity may communicate with the first UE via the relay connection based on the QoS configuration. The operations of 2315 may be performed according to the methods described herein. In some examples, aspects of the operations of 2315 may be performed by a relay connection component as described with reference to FIGS. 10 through 13.

Figure 24:
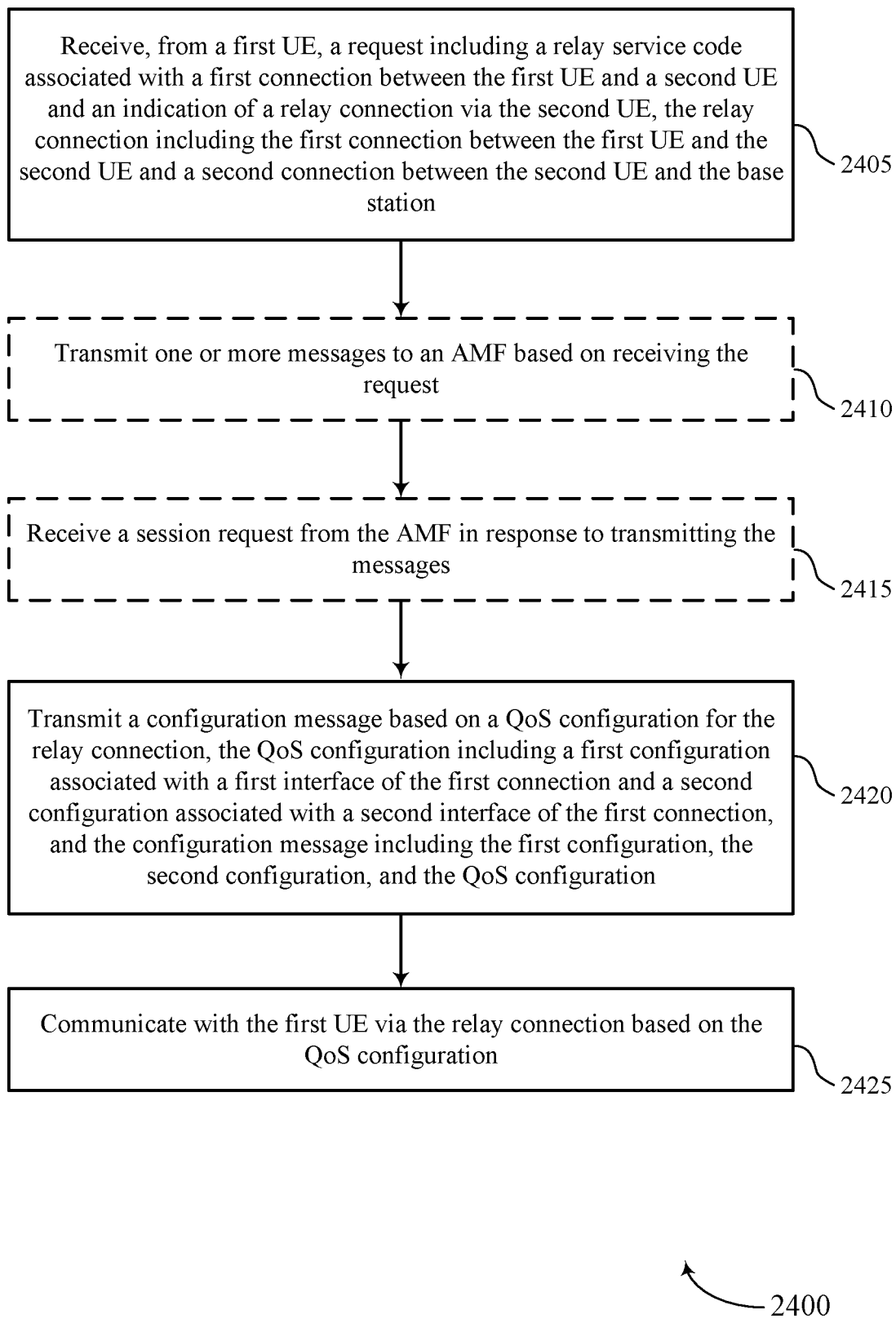

FIG. 24 shows a flowchart illustrating a method 2400 that supports techniques for QoS support in sidelink communications in accordance with one or more aspects of the present disclosure. The operations of method 2400 may be implemented by a network entity (e.g., a base station 105 or a network device as part of a core network 130) or its components as described herein. For example, the operations of method 2400 may be performed by a communications manager as described with reference to FIGS. 10 through 13. In some examples, a network entity may execute a set of instructions to control the functional elements of the network entity to perform the functions described below. Additionally or alternatively, a network entity may perform aspects of the functions described below using special-purpose hardware.

At 2405, the network entity may receive, from a first UE, a request including a relay service code associated with a first connection between the first UE and a second UE and an indication of a relay connection via the second UE, the relay connection including the first connection between the first UE and the second UE and a second connection between the second UE and the network entity. The operations of 2405 may be performed according to the methods described herein. In some examples, aspects of the operations of 2405 may be performed by a request reception manager as described with reference to FIGS. 10 through 13.

At 2410, the network entity may transmit one or more messages to an AMF based on receiving the request. The operations of 2410 may be performed according to the methods described herein. In some examples, aspects of the operations of 2410 may be performed by a session request manager as described with reference to FIGS. 10 through 13.

At 2415, the network entity may receive a session request from the AMF in response to transmitting the messages. The operations of 2415 may be performed according to the methods described herein. In some examples, aspects of the operations of 2415 may be performed by a session request manager as described with reference to FIGS. 10 through 13.

At 2420, the network entity may transmit a configuration message based on a QoS configuration for the relay connection, the QoS configuration including a first configuration associated with a first interface of the first connection and a second configuration associated with a second interface of the first connection, and the configuration message including the first configuration, the second configuration, and the QoS configuration. The operations of 2420 may be performed according to the methods described herein. In some examples, aspects of the operations of 2420 may be performed by a configuration message component as described with reference to FIGS. 10 through 13.

At 2425, the network entity may communicate with the first UE via the relay connection based on the QoS configuration. The operations of 2425 may be performed according to the methods described herein. In some examples, aspects of the operations of 2425 may be performed by a relay connection component as described with reference to FIGS. 10 through 13.

Figure 25:
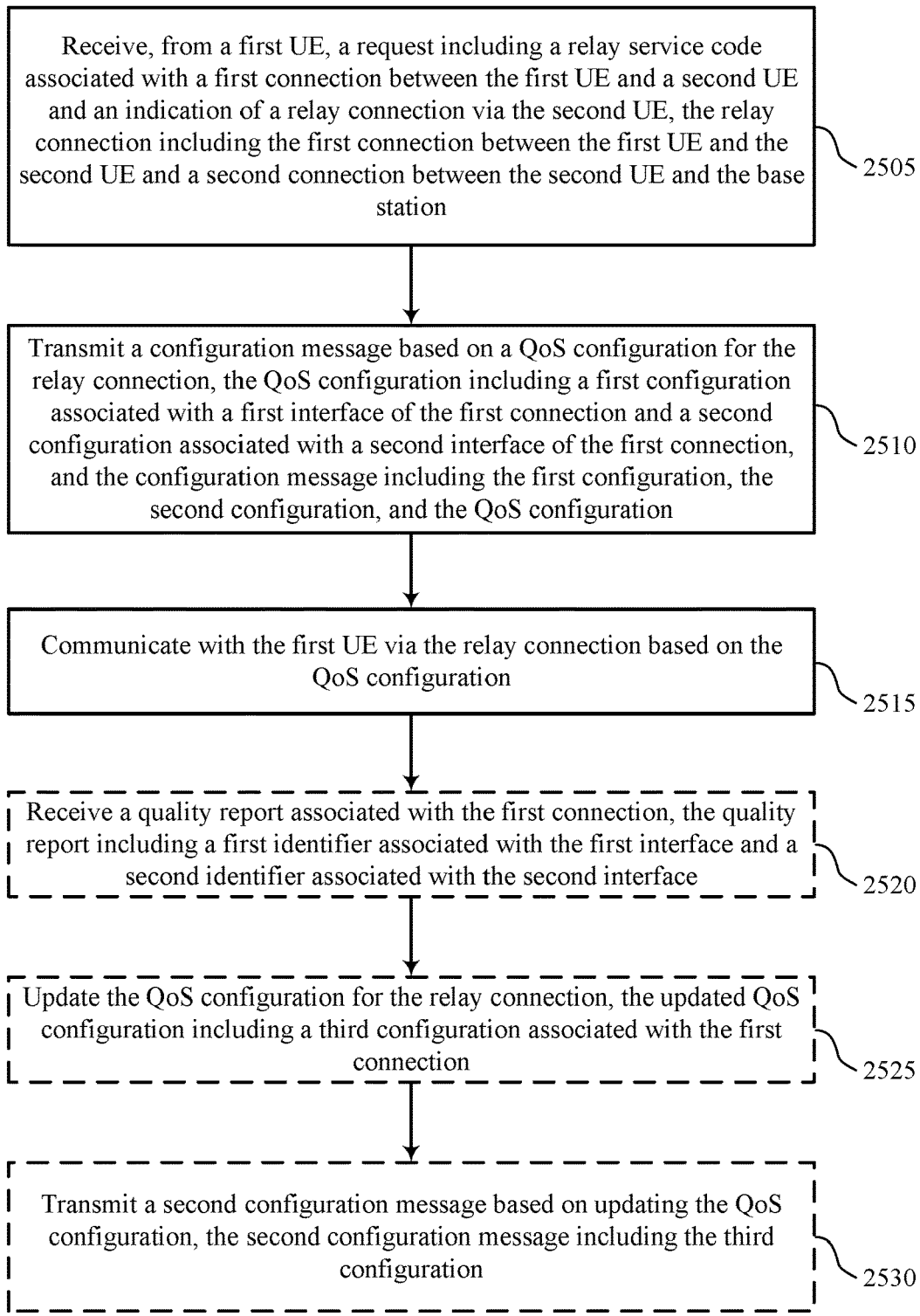

FIG. 25 shows a flowchart illustrating a method 2500 that supports techniques for QoS support in sidelink communications in accordance with one or more aspects of the present disclosure. The operations of method 2500 may be implemented by a network entity (e.g., a base station 105 or a network device as part of a core network 130) or its components as described herein. For example, the operations of method 2500 may be performed by a communications manager as described with reference to FIGS. 10 through 13. In some examples, a network entity may execute a set of instructions to control the functional elements of the network entity to perform the functions described below. Additionally or alternatively, a network entity may perform aspects of the functions described below using special-purpose hardware.

At 2505, the network entity may receive, from a first UE, a request including a relay service code associated with a first connection between the first UE and a second UE and an indication of a relay connection via the second UE, the relay connection including the first connection between the first UE and the second UE and a second connection between the second UE and the network entity. The operations of 2505 may be performed according to the methods described herein. In some examples, aspects of the operations of 2505 may be performed by a request reception manager as described with reference to FIGS. 10 through 13.

At 2510, the network entity may transmit a configuration message based on a QoS configuration for the relay connection, the QoS configuration including a first configuration associated with a first interface of the first connection and a second configuration associated with a second interface of the first connection, and the configuration message including the first configuration, the second configuration, and the QoS configuration. The operations of 2510 may be performed according to the methods described herein. In some examples, aspects of the operations of 2510 may be performed by a configuration message component as described with reference to FIGS. 10 through 13.

At 2515, the network entity may communicate with the first UE via the relay connection based on the QoS configuration. The operations of 2515 may be performed according to the methods described herein. In some examples, aspects of the operations of 2515 may be performed by a relay connection component as described with reference to FIGS. 10 through 13.

At 2520, the network entity may receive a quality report associated with the first connection, the quality report including a first identifier associated with the first interface and a second identifier associated with the second interface. The operations of 2520 may be performed according to the methods described herein. In some examples, aspects of the operations of 2520 may be performed by a quality report component as described with reference to FIGS. 10 through 13.

At 2525, the network entity may update the QoS configuration for the relay connection, the updated QoS configuration including a third configuration associated with the first connection. The operations of 2525 may be performed according to the methods described herein. In some examples, aspects of the operations of 2525 may be performed by a QoS configuration component as described with reference to FIGS. 10 through 13.

At 2530, the network entity may transmit a second configuration message based on updating the QoS configuration, the second configuration message including the third configuration. The operations of 2530 may be performed according to the methods described herein. In some examples, aspects of the operations of 2530 may be performed by a configuration message component as described with reference to FIGS. 10 through 13.

The following provides an overview of aspects of the present disclosure:

Aspect 1: A method for wireless communications at a first user equipment, comprising: establishing a first connection between the first user equipment and a second user equipment, the first connection associated with a relay service code; transmitting, to a base station, a request comprising the relay service code and an indication of a relay connection via the second user equipment, the relay connection comprising the first connection between the first user equipment and the second user equipment and a second connection between the second user equipment and the base station; receiving a configuration message in response to transmitting the request, the configuration message comprising a first configuration associated with a first interface of the first connection and a second configuration associated with a second interface of the first connection; determining a quality of service configuration based at least in part on the first configuration and the second configuration; and communicating with the base station via the relay connection based at least in part on the quality of service configuration.

Aspect 2: The method of aspect 1, further comprising: transmitting, to the base station, a registration message comprising a second indication of a non access stratum connection; and establishing the non access stratum connection via the relay connection based at least in part on the registration message, wherein transmitting the request is based at least in part on establishing the non access stratum connection.

Aspect 3: The method of any of aspects 1 or 2, further comprising: exchanging one or more second configuration messages with the second user equipment based at least in part on the quality of service configuration; determining one or more channel parameters associated with the first connection based at least in part on exchanging the second configuration messages; and communicating with the second user equipment based at least in part on the determined channel parameters.

Aspect 4: The method of any of aspects 1 to 3, further comprising: transmitting a quality report associated with the first connection, the quality report comprising a first identifier associated with the first interface and a second identifier associated with the second interface; receiving a second configuration message in response to transmitting the quality report, the second configuration message comprising a third configuration associated with the first connection; and updating the quality of service configuration based at least in part on the third configuration, wherein communicating with the base station is based at least in part on the updated quality of service configuration.

Aspect 5: The method of any of aspects 1 to 4, further comprising: determining a change in one or more parameters of the first connection, wherein the quality report further comprises an indication of the parameters of the first connection, and wherein the quality report is transmitted based at least in part on determining the change.

Aspect 6: The method of any of aspects 1 to 4, wherein the quality report is transmitted periodically.

Aspect 7: The method of any of aspects 1 to 6, wherein the quality report is transmitted via the relay connection.

Aspect 8: The method of any of aspects 1 to 7, wherein the quality report is transmitted in a sidelink user equipment assistance information message.

Aspect 9: The method of any of aspects 1 to 8, wherein the quality report is transmitted in a message associated with the first interface or the second interface.

Aspect 10: The method of any of aspects 1 to 9, further comprising: identifying, in the second configuration message a timer associated with an activation of the third configuration; and applying the third configuration after the timer expires.

Aspect 11: The method of any of aspects 1 to 9, further comprising: receiving signaling from the second user equipment, the signaling indicating an activation of the third configuration associated with the first connection; applying the third configuration based at least in part on receiving the signaling; determining one or more channel parameters associated with the first connection based at least in part on the third configuration; and communicating with the second user equipment based at least in part on the determined channel parameters.

Aspect 12: The method of any of aspects 1 to 11, wherein: the first identifier associated with the first interface comprises a PC5 logic channel identifier (LCID); and the second identifier associated with the second interface comprises a Uu data radio bearer (DRB) identifier.

Aspect 13: The method of any of aspects 1 to 12, wherein: the first interface comprises a PC5 interface; and the second interface comprises a Uu interface.

Aspect 14: The method of any of aspects 1 to 13, further comprising: refraining from establishing a unicast link with the second user equipment, wherein the relay connection is established based at least in part on refraining from establishing the unicast link.

Aspect 15: The method of any of aspects 1 to 13, further comprising: establishing a unicast link with the second user equipment, wherein the relay connection is established based at least in part on establishing the unicast link.

Aspect 16: The method of any of aspects 1 to 15, wherein the request comprises a protocol data unit (PDU) session establishment request or a PDU session modification request.

Aspect 17: The method of any of aspects 1 to 16, wherein the configuration message comprises a Radio Resource Control (RRC) reconfiguration message.

Aspect 18: An apparatus comprising at least one means for performing a method of any of aspects 1 to 17.

Aspect 19: An apparatus for wireless communications comprising a processor; and memory coupled to the processor, the processor and memory configured to perform a method of any of aspects 1 to 17.

Aspect 20: A non-transitory computer-readable medium storing code for wireless communications, the code comprising instructions executable by a processor to perform a method of any of aspects 1 to 17.

Aspect 21: A method for wireless communications at a base station, comprising: receiving, from a first user equipment, a request comprising a relay service code associated with a first connection between the first user equipment and a second user equipment and an indication of a relay connection via the second user equipment, the relay connection comprising the first connection between the first user equipment and the second user equipment and a second connection between the second user equipment and the base station; determining a quality of service configuration for the relay connection, the quality of service configuration comprising a first configuration associated with a first interface of the first connection and a second configuration associated with a second interface of the first connection; transmitting a configuration message based at least in part on determining the quality of service configuration, the configuration message comprising the first configuration and the second configuration; and communicating with the first user equipment via the relay connection based at least in part on the determined quality of service configuration.

Aspect 22: The method of aspect 21, further comprising: receiving a registration message comprising a second indication of a non access stratum connection; determining that the first user equipment is registered via the relay connection based at least in part on the registration message; and establishing the non access stratum connection via the relay connection based at least in part on the determining, wherein receiving the request is based at least in part on establishing the non access stratum connection.

Aspect 23: The method of any of aspects 21 or 22, further comprising: transmitting one or more messages to an access and mobility management function (AMF) based at least in part on receiving the request; and receiving a session request from the AMF in response to transmitting the messages, wherein determining the quality of service configuration for the relay connection is based at least in part on the session request.

Aspect 24: The method of any of aspects 21 to 23, further comprising: receiving a quality report associated with the first connection, the quality report comprising a first identifier associated with the first interface and a second identifier associated with the second interface; updating the quality of service configuration for the relay connection, the updated quality of service configuration comprising a third configuration associated with the first connection; and transmitting a second configuration message based at least in part on updating the quality of service configuration, the configuration message comprising the third configuration, wherein communicating with the first user equipment is based at least in part on the updated quality of service configuration.

Aspect 25: The method of any of aspects 21 to 24, wherein the quality report further comprises an indication of a change in one or more parameters of the first connection.

Aspect 26: The method of any of aspects 21 to 24, wherein the quality report is received periodically.

Aspect 27: The method of any of aspects 21 to 26, wherein the quality report is received via the relay connection.

Aspect 28: The method of any of aspects 21 to 27, wherein the quality report is received in a sidelink user equipment assistance information message.

Aspect 29: The method of any of aspects 21 to 28, wherein the quality report is received in a message associated with the first interface or the second interface.

Aspect 30: The method of any of aspects 21 to 29, wherein the second configuration message further comprises a timer associated with an activation of the third configuration.

Aspect 31: The method of any of aspects 21 to 29, further comprising: transmitting signaling to the second user equipment, the signaling comprising a first activation of the third configuration associated with the first connection, a second activation of a fourth configuration associated with the second connection, and forwarding instructions associated with the first activation.

Aspect 32: The method of any of aspects 21 to 31, wherein: the first identifier associated with the first interface comprises a PC5 logic channel identifier (LCID); and the second identifier associated with the second interface comprises a Uu data radio bearer (DRB) identifier.

Aspect 33: The method of any of aspects 21 to 32, wherein: the first interface comprises a PC5 interface; and the second interface comprises a Uu interface.

Aspect 34: The method of any of aspects 21 to 33, wherein the request comprises a protocol data unit (PDU) session establishment request or a PDU session modification request.

Aspect 35: The method of any of aspects 21 to 34, wherein the configuration message comprises a Radio Resource Control (RRC) reconfiguration message.

Aspect 36: An apparatus comprising at least one means for performing a method of any of aspects 21 to 35.

Aspect 37: An apparatus for wireless communications comprising a processor; and memory coupled to the processor, the processor and memory configured to perform a method of any of aspects 21 to 35.

Aspect 38: A non-transitory computer-readable medium storing code for wireless communications, the code comprising instructions executable by a processor to perform a method of any of aspects 21 to 35.

Aspect 39: A method for wireless communications at a first user equipment, comprising: transmitting, to a network entity, a request comprising a relay service code and an indication of a relay connection via a second user equipment, the relay connection comprising a first connection between the first user equipment and the second user equipment and a second connection between the second user equipment and the network entity, the first connection associated with the relay service code; receiving a configuration message in response to transmitting the request, the configuration message comprising a first configuration associated with a first interface of the first connection, a second configuration associated with a second interface of the first connection, and a quality of service configuration based at least in part on the first configuration and the second configuration; and communicating with the network entity via the relay connection based at least in part on the quality of service configuration that is based at least in part on the first configuration and the second configuration.

Aspect 40: The method of aspect 39, further comprising: transmitting, to the network entity, a registration message comprising a second indication of a non access stratum connection; and establishing the non access stratum connection via the relay connection based at least in part on the registration message, wherein transmitting the request is based at least in part on establishing the non access stratum connection.

Aspect 41: The method of any of aspects 39 or 40, further comprising: exchanging one or more second configuration messages with the second user equipment based at least in part on the quality of service configuration; determining one or more channel parameters associated with the first connection based at least in part on exchanging the one or more second configuration messages; and communicating with the second user equipment based at least in part on the determined channel parameters.

Aspect 42: The method of any of aspects 39 to 41, further comprising: transmitting a quality report associated with the first connection, the quality report comprising a first identifier associated with the first interface and a second identifier associated with the second interface; receiving a second configuration message in response to transmitting the quality report, the second configuration message comprising a third configuration associated with the first connection; and updating the quality of service configuration based at least in part on the third configuration, wherein communicating with the network entity is based at least in part on the updated quality of service configuration.

Aspect 43: The method of any of aspects 39 to 42, further comprising: determining a change in one or more parameters of the first connection, wherein the quality report further comprises an indication of the parameters of the first connection, and wherein the quality report is transmitted based at least in part on determining the change.

Aspect 44: The method of any of aspects 39 to 42, wherein the quality report is transmitted periodically.

Aspect 45: The method of any of aspects 39 to 44, wherein the quality report is transmitted via the relay connection.

Aspect 46: The method of any of aspects 39 to 45, wherein the quality report is transmitted in a sidelink user equipment assistance information message.

Aspect 47: The method of any of aspects 39 to 46, wherein the quality report is transmitted in a message associated with the first interface or the second interface.

Aspect 48: The method of any of aspects 39 to 47, further comprising: identifying, in the second configuration message a timer associated with an activation of the third configuration; and applying the third configuration after the timer expires.

Aspect 49: The method of any of aspects 39 to 47, further comprising: receiving signaling from the second user equipment, the signaling indicating an activation of the third configuration associated with the first connection; applying the third configuration based at least in part on receiving the signaling; determining one or more channel parameters associated with the first connection based at least in part on the third configuration; and communicating with the second user equipment based at least in part on the determined channel parameters.

Aspect 50: The method of any of aspects 39 to 49, wherein: the first identifier associated with the first interface comprises a PC5 logic channel identifier (LCID); and the second identifier associated with the second interface comprises a Uu data radio bearer (DRB) identifier.

Aspect 51: The method of any of aspects 39 to 50, wherein: the first interface comprises a PC5 interface; and the second interface comprises a Uu interface.

Aspect 52: The method of any of aspects 39 to 51, further comprising: refraining from establishing a unicast link with the second user equipment, wherein the relay connection is established based at least in part on refraining from establishing the unicast link.

Aspect 53: The method of any of aspects 39 to 51, further comprising: establishing a unicast link with the second user equipment, wherein the relay connection is established based at least in part on establishing the unicast link.

Aspect 54: The method of any of aspects 39 to 53, wherein the request comprises a protocol data unit (PDU) session establishment request or a PDU session modification request.

Aspect 55: The method of any of aspects 39 to 54, wherein the configuration message comprises a Radio Resource Control (RRC) reconfiguration message.

Aspect 56: An apparatus comprising at least one means for performing a method of any of aspects 39 to 55.

Aspect 57: An apparatus for wireless communications comprising a processor; and memory coupled to the processor, the processor and memory configured to perform a method of any of aspects 39 to 55.

Aspect 58: A non-transitory computer-readable medium storing code for wireless communications, the code comprising instructions executable by a processor to perform a method of any of aspects 39 to 55.

Aspect 59: A method for wireless communications at a network entity, comprising: receiving, from a first user equipment, a request comprising a relay service code associated with a first connection between the first user equipment and a second user equipment and an indication of a relay connection via the second user equipment, the relay connection comprising the first connection between the first user equipment and the second user equipment and a second connection between the second user equipment and the network entity; transmitting a configuration message based at least in part on a quality of service configuration for the relay connection, the quality of service configuration comprising a first configuration associated with a first interface of the first connection and a second configuration associated with a second interface of the first connection, and the configuration message comprising the first configuration, the second configuration, and the quality of service configuration; and communicating with the first user equipment via the relay connection based at least in part on the quality of service configuration.

Aspect 60: The method of aspect 59, further comprising: receiving a registration message comprising a second indication of a non access stratum connection; determining that the first user equipment is registered via the relay connection based at least in part on the registration message; and establishing the non access stratum connection via the relay connection based at least in part on the determining, wherein receiving the request is based at least in part on establishing the non access stratum connection.

Aspect 61: The method of any of aspects 59 or 60, further comprising: transmitting one or more messages to an access and mobility management function (AMF) based at least in part on receiving the request; and receiving a session request from the AMF in response to transmitting the messages, wherein determining the quality of service configuration for the relay connection is based at least in part on the session request.

Aspect 62: The method of any of aspects 59 to 61, further comprising: receiving a quality report associated with the first connection, the quality report comprising a first identifier associated with the first interface and a second identifier associated with the second interface; updating the quality of service configuration for the relay connection, the updated quality of service configuration comprising a third configuration associated with the first connection; and transmitting a second configuration message based at least in part on updating the quality of service configuration, the second configuration message comprising the third configuration, wherein communicating with the first user equipment is based at least in part on the updated quality of service configuration.

Aspect 63: The method of any of aspects 59 to 62, wherein the quality report further comprises an indication of a change in one or more parameters of the first connection.

Aspect 64: The method of any of aspects 59 to 62, wherein the quality report is received periodically.

Aspect 65: The method of any of aspects 59 to 64, wherein the quality report is received via the relay connection.

Aspect 66: The method of any of aspects 59 to 65, wherein the quality report is received in a sidelink user equipment assistance information message.

Aspect 67: The method of any of aspects 59 to 66, wherein the quality report is received in a message associated with the first interface or the second interface.

Aspect 68: The method of any of aspects 59 to 67, wherein the second configuration message further comprises a timer associated with an activation of the third configuration.

Aspect 69: The method of any of aspects 59 to 67, further comprising: transmitting signaling to the second user equipment, the signaling comprising a first activation of the third configuration associated with the first connection, a second activation of a fourth configuration associated with the second connection, and forwarding instructions associated with the first activation.

Aspect 70: The method of any of aspects 59 to 69, wherein: the first identifier associated with the first interface comprises a PC5 logic channel identifier (LCID); and the second identifier associated with the second interface comprises a Uu data radio bearer (DRB) identifier.

Aspect 71: The method of any of aspects 59 to 70, wherein: the first interface comprises a PC5 interface; and the second interface comprises a Uu interface.

Aspect 72: The method of any of aspects 59 to 71, wherein the request comprises a protocol data unit (PDU) session establishment request or a PDU session modification request.

Aspect 73: The method of any of aspects 59 to 72, wherein the configuration message comprises a Radio Resource Control (RRC) reconfiguration message.

Aspect 74: The method of any of aspects 59 to 73, wherein: configuration message is transmitted to the first user equipment and the second user equipment; and the configuration message configures one or more entities corresponding to one or more layers of the first connection or the second connection of the relay connection.

Aspect 75: An apparatus comprising at least one means for performing a method of any of aspects 59 to 74.

Aspect 76: An apparatus for wireless communications comprising a processor; and memory coupled to the processor, the processor and memory configured to perform a method of any of aspects 59 to 74.

Aspect 77: A non-transitory computer-readable medium storing code for wireless communications, the code comprising instructions executable by a processor to perform a method of any of aspects 59 to 74.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment, comprising:
   transmitting, to a network entity, a request comprising a relay service code and an indication of a relay connection via a second user equipment, the relay connection comprising a first connection between the first user equipment and the second user equipment and a second connection between the second user equipment and the network entity, the first connection associated with the relay service code;
   receiving a configuration message in response to transmitting the request, the configuration message comprising a first configuration associated with a first interface of the first connection, a second configuration associated with a second interface of the first connection, and a quality of service configuration based at least in part on the first configuration and the second configuration; and
   communicating with the network entity via the relay connection based at least in part on the quality of service configuration that is based at least in part on the first configuration and the second configuration.

2. The method of claim 1, further comprising:
   transmitting a quality report associated with the first connection, the quality report comprising a first identifier associated with the first interface and a second identifier associated with the second interface;
   receiving a second configuration message in response to transmitting the quality report, the second configuration message comprising a third configuration associated with the first connection; and
   updating the quality of service configuration based at least in part on the third configuration, wherein communicating with the network entity is based at least in part on the updated quality of service configuration.

3. The method of claim 2, further comprising:
   determining a change in one or more parameters of the first connection, wherein the quality report further comprises an indication of the parameters of the first connection, and wherein the quality report is transmitted based at least in part on determining the change.

4. The method of claim 2, wherein the quality report is transmitted periodically.

5. The method of claim 2, wherein the quality report is transmitted via the relay connection.

6. The method of claim 5, wherein the quality report is transmitted in a sidelink user equipment assistance information message.

7. The method of claim 5, wherein the quality report is transmitted in a message associated with the first interface or the second interface.

8. The method of claim 2, further comprising:
   identifying, in the second configuration message a timer associated with an activation of the third configuration; and
   applying the third configuration after the timer expires.

9. The method of claim 2, further comprising:
   receiving signaling from the second user equipment, the signaling indicating an activation of the third configuration associated with the first connection;
   applying the third configuration based at least in part on receiving the signaling;
   determining one or more channel parameters associated with the first connection based at least in part on the third configuration; and
   communicating with the second user equipment based at least in part on the determined channel parameters.

10. The method of claim 2, wherein:
    the first identifier associated with the first interface comprises a PC5 logic channel identifier (LCD); and
    the second identifier associated with the second interface comprises a Uu data radio bearer (DRB) identifier.

11. The method of claim 1, further comprising:
    transmitting, to the network entity, a registration message comprising a second indication of a non access stratum connection; and
    establishing the non access stratum connection via the relay connection based at least in part on the registration message, wherein transmitting the request is based at least in part on establishing the non access stratum connection.

12. The method of claim 1, further comprising:
    exchanging one or more second configuration messages with the second user equipment based at least in part on the quality of service configuration;
    determining one or more channel parameters associated with the first connection based at least in part on exchanging the one or more second configuration messages; and
    communicating with the second user equipment based at least in part on the determined channel parameters.

13. The method of claim 1, wherein:
    the first interface comprises a PC5 interface; and
    the second interface comprises a Uu interface.

14. The method of claim 1, further comprising:
    refraining from establishing a unicast link with the second user equipment, wherein the relay connection is established based at least in part on refraining from establishing the unicast link.

15. The method of claim 1, further comprising:
    establishing a unicast link with the second user equipment, wherein the relay connection is established based at least in part on establishing the unicast link.

16. The method of claim 1, wherein the request comprises a protocol data unit (PDU) session establishment request or a PDU session modification request.

17. The method of claim 1, wherein the configuration message comprises a Radio Resource Control (RRC) reconfiguration message.

18. A method for wireless communications at a network entity, comprising:
receiving, from a first user equipment, a request comprising a relay service code associated with a first connection between the first user equipment and a second user equipment and an indication of a relay connection via the second user equipment, the relay connection comprising the first connection between the first user equipment and the second user equipment and a second connection between the second user equipment and the network entity;
transmitting a configuration message based at least in part on a quality of service configuration for the relay connection, the quality of service configuration comprising a first configuration associated with a first interface of the first connection and a second configuration associated with a second interface of the first connection, and the configuration message comprising the first configuration, the second configuration, and the quality of service configuration; and
communicating with the first user equipment via the relay connection based at least in part on the quality of service configuration.

19. The method of claim 18, further comprising:
receiving a quality report associated with the first connection, the quality report comprising a first identifier associated with the first interface and a second identifier associated with the second interface;
updating the quality of service configuration for the relay connection, the updated quality of service configuration comprising a third configuration associated with the first connection; and
transmitting a second configuration message based at least in part on updating the quality of service configuration, the second configuration message comprising the third configuration, wherein communicating with the first user equipment is based at least in part on the updated quality of service configuration.

20. The method of claim 19, wherein the quality report further comprises an indication of a change in one or more parameters of the first connection.

21. The method of claim 19, wherein the quality report is received periodically.

22. The method of claim 19, wherein the quality report is received via the relay connection.

23. The method of claim 22, wherein the quality report is received in a sidelink user equipment assistance information message.

24. The method of claim 22, wherein the quality report is received in a message associated with the first interface or the second interface.

25. The method of claim 19, wherein the second configuration message further comprises a timer associated with an activation of the third configuration.

26. The method of claim 19, further comprising:
transmitting signaling to the second user equipment, the signaling comprising a first activation of the third configuration associated with the first connection, a second activation of a fourth configuration associated with the second connection, and forwarding instructions associated with the first activation.

27. The method of claim 18, wherein:
the configuration message is transmitted to the first user equipment and the second user equipment; and
the configuration message configures one or more entities corresponding to one or more layers of the first connection or the second connection of the relay connection.

28. An apparatus for wireless communications at a first user equipment, comprising:
a processor;
memory coupled to the processor, the processor and memory configured to:
transmit, to a network entity, a request comprising a relay service code and an indication of a relay connection via a second user equipment, the relay connection comprising a first connection between the first user equipment and the second user equipment and a second connection between the second user equipment and the network entity, the first connection associated with the relay service code;
receive a configuration message in response to transmitting the request, the configuration message comprising a first configuration associated with a first interface of the first connection, a second configuration associated with a second interface of the first connection, and a quality of service configuration based at least in part on the first configuration and the second configuration; and
communicate with the network entity via the relay connection based at least in part on a quality of service configuration that is based at least in part on the first configuration and the second configuration.

29. The apparatus of claim 28, wherein the processor and memory are further configured to:
transmit a quality report associated with the first connection, the quality report comprising a first identifier associated with the first interface and a second identifier associated with the second interface;
receive a second configuration message in response to transmitting the quality report, the second configuration message comprising a third configuration associated with the first connection; and
update the quality of service configuration based at least in part on the third configuration, wherein communicating with the network entity is based at least in part on the updated quality of service configuration.

30. An apparatus for wireless communications at a network entity, comprising:
a processor;
memory coupled to the processor, the processor and memory configured to:
receive, from a first user equipment, a request comprising a relay service code associated with a first connection between the first user equipment and a second user equipment and an indication of a relay connection via the second user equipment, the relay connection comprising the first connection between the first user equipment and the second user equipment and a second connection between the second user equipment and the network entity;
transmit a configuration message based at least in part on a quality of service configuration for the relay connection, the quality of service configuration comprising a first configuration associated with a first interface of the first connection and a second configuration associated with a second interface of the first connection, and the configuration message comprising the first configuration, the second configuration, and the quality of service configuration; and communicate with the first user equipment via the relay connection based at least in part on the determined quality of service configuration.

* * * * *